(12) United States Patent
Fernández Gutierrez

(10) Patent No.: US 8,064,449 B2
(45) Date of Patent: *Nov. 22, 2011

(54) METHODS AND APPARATUS FOR MANAGING MULTICAST TRAFFIC

(75) Inventor: Alvaro Fernández Gutierrez, Barcelona (ES)

(73) Assignee: Media Patents, S.L., Barcelona (ES)

( * ) Notice: Subject to any disclaimer, the term of this patent is extended or adjusted under 35 U.S.C. 154(b) by 274 days.

This patent is subject to a terminal disclaimer.

(21) Appl. No.: 12/510,949

(22) Filed: Jul. 28, 2009

(65) Prior Publication Data

US 2010/0014519 A1    Jan. 21, 2010

Related U.S. Application Data

(63) Continuation-in-part of application No. 12/440,225, filed as application No. PCT/EP2007/011043 on Dec. 17, 2007.

(30) Foreign Application Priority Data

Oct. 15, 2007  (ES) .................................. 200702687
Dec. 23, 2008  (ES) .................................. 200900034

(51) Int. Cl.
  *H04L 12/28*  (2006.01)
(52) U.S. Cl. ........................................ 370/390; 370/401
(58) Field of Classification Search ........................ None
  See application file for complete search history.

(56) References Cited

U.S. PATENT DOCUMENTS

| | | | |
|---|---|---|---|
| 4,024,505 A | 5/1977 | Sperling | |
| 4,149,238 A | 4/1979 | James et al. | |
| 5,835,370 A | 11/1998 | Nakamura | |
| 6,331,983 B1 | 12/2001 | Haggerty et al. | |
| 6,370,142 B1 | 4/2002 | Pitcher et al. | |
| 6,393,507 B2 | 5/2002 | Klein | |
| 6,434,622 B1 | 8/2002 | Monteiro et al. | |

(Continued)

FOREIGN PATENT DOCUMENTS

EP    1185125  A1    3/2002

(Continued)

OTHER PUBLICATIONS

Fan, Rui et al., WRHMCC: A New Congestion Control Mechanism for Multicast Applications, GLOBECOM 2003, pp. 2845-2849.

(Continued)

*Primary Examiner* — Hong Cho

(74) *Attorney, Agent, or Firm* — Tim L. Kitchen; Peter B. Scull; Berenbaum Weinshienk PC

(57) ABSTRACT

A device, system and method for controlling the flow of multicast data packets from sources sending data to hosts requesting the data. In one implementation, a router is situated in a data network between sources that send multicast data packets directed to a multicast group and hosts requesting to receive the multicast data packets. The router has one or more network interfaces in the direction of the hosts and stores for each network interface, each multicast group address and each host at least one data record arising from one or more data requests made by the hosts which includes multicast group and source information. The router stores executable instructions to receive messages originating from a host, update the status of the data sources for that host and implement the actions according to one or a combination of Tables 3, 4, 5, 6 and 7 disclosed herein.

34 Claims, 12 Drawing Sheets

U.S. PATENT DOCUMENTS

| | | | |
|---|---|---|---|
| 6,457,059 B1 | 9/2002 | Kobayashi | |
| 6,721,318 B1 | 4/2004 | Cai et al. | |
| 6,741,595 B2 | 5/2004 | Maher, III et al. | |
| 6,785,294 B1 | 8/2004 | Ammitz.o.slashed.II et al. | |
| 6,914,907 B1 | 7/2005 | Bhardwaj et al. | |
| 6,977,891 B1 | 12/2005 | Ranjan et al. | |
| 7,068,598 B1 | 6/2006 | Bryson et al. | |
| 7,236,465 B2 * | 6/2007 | Banerjee et al. | 370/312 |
| 7,272,652 B1 | 9/2007 | Keller-Tuberg | |
| 7,283,521 B1 | 10/2007 | Ryan | |
| 7,346,053 B1 | 3/2008 | Leung et al. | |
| 7,355,970 B2 | 4/2008 | Lor | |
| 7,385,977 B2 * | 6/2008 | Wu et al. | 370/389 |
| 7,412,726 B1 | 8/2008 | Viswanath | |
| 7,450,551 B2 | 11/2008 | Lim et al. | |
| 7,477,654 B2 * | 1/2009 | Murray et al. | 370/432 |
| 7,502,474 B2 | 3/2009 | Kaniz et al. | |
| 7,512,146 B1 | 3/2009 | Sivasankaram et al. | |
| 7,599,289 B2 | 10/2009 | Caci | |
| 7,599,393 B1 | 10/2009 | Ho | |
| 7,640,333 B1 | 12/2009 | Fernandez Gutierrez | |
| 2002/0099857 A1 | 7/2002 | Lowe et al. | |
| 2003/0067917 A1 | 4/2003 | Morrison et al. | |
| 2003/0123453 A1 | 7/2003 | Ooghe et al. | |
| 2004/0022244 A1 | 2/2004 | Boers et al. | |
| 2004/0117503 A1 | 6/2004 | Nguyen et al. | |
| 2004/0122890 A1 | 6/2004 | Watkinson | |
| 2004/0158872 A1 | 8/2004 | Kobayashi | |
| 2004/0165709 A1 | 8/2004 | Pence et al. | |
| 2004/0190542 A1 | 9/2004 | Ono et al. | |
| 2004/0202295 A1 | 10/2004 | Shen et al. | |
| 2004/0219911 A1 | 11/2004 | Kouchri et al. | |
| 2004/0252690 A1 * | 12/2004 | Pung et al. | 370/390 |
| 2004/0255126 A1 | 12/2004 | Reith | |
| 2005/0041680 A1 | 2/2005 | Tanaka et al. | |
| 2005/0063544 A1 | 3/2005 | Uusitalo et al. | |
| 2005/0174937 A1 | 8/2005 | Scoggins et al. | |
| 2005/0175156 A1 | 8/2005 | Afshar et al. | |
| 2005/0190765 A1 * | 9/2005 | Gotoh et al. | 370/390 |
| 2005/0207354 A1 | 9/2005 | Nekovee et al. | |
| 2005/0265374 A1 | 12/2005 | Pelt | |
| 2006/0018255 A1 | 1/2006 | Tankhiwale | |
| 2006/0036733 A1 | 2/2006 | Fujimoto et al. | |
| 2006/0050643 A1 | 3/2006 | Yoshimoto et al. | |
| 2006/0059163 A1 | 3/2006 | Frattura et al. | |
| 2006/0088031 A1 | 4/2006 | Nalawade | |
| 2006/0095766 A1 | 5/2006 | Zhu et al. | |
| 2006/0104308 A1 | 5/2006 | Pinkerton et al. | |
| 2006/0114908 A1 | 6/2006 | Kalkunte et al. | |
| 2006/0120368 A1 | 6/2006 | Aboukarr et al. | |
| 2006/0146792 A1 | 7/2006 | Ramachandran et al. | |
| 2006/0146857 A1 | 7/2006 | Naik et al. | |
| 2006/0159092 A1 | 7/2006 | Boers et al. | |
| 2006/0182109 A1 | 8/2006 | Melsen et al. | |
| 2006/0209829 A1 | 9/2006 | Lo et al. | |
| 2006/0221861 A1 | 10/2006 | Previdi et al. | |
| 2006/0221958 A1 * | 10/2006 | Wijnands et al. | 370/389 |
| 2006/0239289 A1 | 10/2006 | Zheng et al. | |
| 2006/0262792 A1 * | 11/2006 | Rokui | 370/390 |
| 2006/0274720 A1 * | 12/2006 | Adams et al. | 370/351 |
| 2007/0011350 A1 | 1/2007 | Lu et al. | |
| 2007/0041558 A1 | 2/2007 | Parayil et al. | |
| 2007/0047545 A1 | 3/2007 | Bou-Diab et al. | |
| 2007/0064695 A1 | 3/2007 | Song et al. | |
| 2007/0124454 A1 | 5/2007 | Watkinson | |
| 2007/0143858 A1 | 6/2007 | Hearty | |
| 2007/0168555 A1 | 7/2007 | Dorenbosch | |
| 2007/0177594 A1 | 8/2007 | Kompella | |
| 2007/0183403 A1 | 8/2007 | Somers | |
| 2007/0211722 A1 | 9/2007 | Subramanian | |
| 2007/0255824 A1 | 11/2007 | Granzer | |
| 2007/0297376 A1 | 12/2007 | Gass | |
| 2007/0297418 A1 | 12/2007 | Lee | |
| 2008/0056243 A1 | 3/2008 | Roy et al. | |
| 2008/0095146 A1 | 4/2008 | Granzer | |
| 2008/0095183 A1 | 4/2008 | Bijwaard et al. | |
| 2008/0123644 A1 | 5/2008 | Storry et al. | |
| 2008/0219237 A1 * | 9/2008 | Thubert et al. | 370/349 |
| 2009/0059911 A1 | 3/2009 | Fine | |
| 2009/0100147 A1 | 4/2009 | Igarashi | |
| 2009/0100194 A1 | 4/2009 | Bhadri et al. | |
| 2009/0190518 A1 | 7/2009 | Kim et al. | |
| 2009/0310609 A1 | 12/2009 | Fernandez Gutierrez | |
| 2009/0319689 A1 | 12/2009 | Fernandez Gutierrez | |
| 2010/0005499 A1 | 1/2010 | Covey | |
| 2010/0014519 A1 | 1/2010 | Fernandez Gutierrez | |
| 2010/0040056 A1 | 2/2010 | Kobayashi | |
| 2010/0046516 A1 | 2/2010 | Fernandez Gutierrez | |
| 2010/0054247 A1 | 3/2010 | Fernandez Gutiérrez | |
| 2010/0054248 A1 | 3/2010 | Fernandez Gutiérrez | |
| 2010/0054249 A1 | 3/2010 | Fernández Guti rrez | |
| 2010/0172351 A1 | 7/2010 | Fernández Gutierrez | |
| 2010/0172352 A1 | 7/2010 | Fernández Gutierrez | |
| 2010/0172353 A1 | 7/2010 | Fernández Gutierrez | |
| 2010/0183008 A1 | 7/2010 | Fernandez Gutierrez | |
| 2010/0254383 A1 | 10/2010 | Fernandez Gutierrez | |
| 2011/0010441 A1 | 1/2011 | Franandez Gutierrez | |
| 2011/0019673 A1 | 1/2011 | Fernandez Gutierrez | |
| 2011/0058548 A1 | 3/2011 | Fernandez Gutierrez | |
| 2011/0058551 A1 | 3/2011 | Fernandez Gutierrez | |

FOREIGN PATENT DOCUMENTS

| | | |
|---|---|---|
| EP | 1318628 A1 | 11/2003 |
| EP | 1389862 A1 | 2/2004 |
| EP | 1429489 A2 | 6/2004 |
| EP | 1432172 A2 | 6/2004 |
| EP | 1734688 A1 | 12/2006 |
| EP | WO2009000306 | 12/2008 |
| EP | WO2009049659 | 4/2009 |
| EP | WO2009056175 | 5/2009 |
| EP | WO2009065526 | 5/2009 |
| EP | WO2009095041 | 8/2009 |
| EP | 2078376 B1 | 12/2010 |
| ES | WO2009109684 | 9/2009 |
| WO | WO2002003614 A2 | 1/2002 |
| WO | WO2006001803 A1 | 1/2006 |
| WO | 2009000306 A1 | 12/2008 |
| WO | WO2009/000306 A1 | 12/2008 |
| WO | 2009049659 A1 | 4/2009 |
| WO | 2009065526 A1 | 5/2009 |
| WO | WO2009095041 A1 | 8/2009 |
| WO | 2009109684 A1 | 9/2009 |
| WO | WO2010072611 A1 | 7/2010 |
| WO | WO2010097288 A1 | 9/2010 |
| WO | WO2011012582 A2 | 2/2011 |

OTHER PUBLICATIONS

Pompili, Dario et al., Multicast Algorithms in Service Overlay Networks, Computer Communications, Feb. 2008, vol. 31, issue 3, pp. 489-505.

El-Derini, M.N. et al., Supporting a Multicast Communication for Large Scale Groups, 2002, IEEE MELECON, pp. 7-11.

Lawson, Stephen., IP Multicast Finds a Role Inside the Firewall, 1996, InfoWorld 18.n41, pp. 51(1).

Cain, B et al., Internet Group Management Protocol, Version 3, 2002, Network Working Group.

Zhang, Beichuan et al., Universal IP Multicast Delivery, Computer Networks, Apr. 13, 2006, pp. 781-806, Elsevier, Amsterdam.

Deering, Stephen et al., An Architecture for Wide-Area Multicast Routing, SIGCOMM 94: Proceedings of the Conference on Communications, Architectures, Protocols and Applications.

Deering, Stephen et al., The PIM Architecture for Wide-Area Multicast Routing, IEEE/ACM Transactions on Networking (TON), 1996, vol. 4, No. 2, IEEE.

Ritvanen, Kaarle., Multicast Routing and Addressing, Seminar on Internetworking, 2004.

Paul, Pragyansmita et al., Survey of Multicast Routing Algorithms and Protocols, Proceedings of the 15th International Conference on Computer Communication, 2002.

Lawful Interception (LI); Handover Interface and Service-Specific Details (SSD) for IP delivery; Part 5: Service-Specific Details for IP Multimedia Services; ETSI TS 102 232-5 ETSI Standards, LIS, Sophia Antipolis Cedex, France, vol. LI, No. V2.3.1, Apr. 1, 2008, XP014041613, ISSN: 0000-0001, p. 6-p. 7, p. 10-p. 15.

M Handley UCL V Jacobson Packet Design C Perkins University of Glasgow: "SDP: Session Description Protocol; rfc4566.txt" IETF Standard, Internet Engineering Task Force, IETF, CH, Jul. 1, 2006, XP015055003, ISSN: 0000-0003, p. 11.

European Patent Office, Transmittal of International Search Report and the Written Opinion of the International Searching Authority for International Application No. PCT/EP2009/061577, Feb. 8, 2010.

Communications Assistance for Law Enforcement Act of 1994, At the Second Session, One Hundred Third Congress of the United States of America, Pub. L. No. 103-414, 108 Stat. 4279; Amendment to Title 18, United States Code.

Cain et al., "Internet Group Management Protocol, Version 3," Internet Engineering Task Force, Network Working Group; Request for Comments: 3376; Oct. 2002.

PCT Application No. PCT/EP2010/060815; Patent Cooperation Treaty International Search Report and Written Opinion issued by the European Patent Office dated Feb. 8, 2011.

K. McCloghrie et al., Internet Engineering Task Force, Request for Comments 2578, "The structure of Management Information Version 2, SMIv2", Apr. 1999; currently available on the Internet at http://www3lools.ietf.org/html/rfc2578.

K. McCloghrie et al., Internet Engineering Task Force, Request for Comments 2579, "Textual Conventions for SMIv2", Apr. 1999; currently available on the Internet at http://www3.tools.ietf.org/html/rfc2579.

D. Harrington et al., Internet Engineering Task Force, Request for Comments 3411, "An Architecture for Describing Simple Network Management Protocol (SNMP) Management Frameworks", Dec. 2002, currently available on the Internet at http://www3.tools.ietf.org/html/rfc3411.

E. Al-Shaer et al., "Toward Integrating IP Multicasting in Internet Network Management Protocols", Computer Communications, vol. 24, No. 5, Mar. 15, 2001, pp. 473-485, Publisher: Elsevier.

R. Vida et al., Engineering Task Force, Network Working Group, Request for Comments 3810, Jun. 2004; currently available at Internet address http://tools.ietf.org/html/rfc3810.

B. Fenner et al., Engineering Task Force, Network Working Group, Request for Comments 4605, Aug. 2006; currently available at Internet address http://tools.ietf.org/html/rfc4605.

B. Fenner et al., Engineering Task Force, Network Working Group, Request for Comments 4601, Aug. 2006; currently available at Internet address http://tools.ietf.org/html/rfc4601.

International Preliminary Report on Patentability for PCT/ES2009/070047 dated Oct. 14, 2010.

European Search Report for European Patent Application No. 10189098.6 issued by the European Patent Office dated Dec. 10, 2010.

* cited by examiner

```
-- The MGMD Router Source list Table
--
mgmdRouterSrcListTable OBJECT-TYPE
    SYNTAX       SEQUENCE OF MgmdRouterSrcListEntry
    MAX-ACCESS   not-accessible
    STATUS       current
    DESCRIPTION
        "The (conceptual) table listing the Source List entries
         corresponding to each interface and multicast group pair on
         a Router."
    ::= { mgmdMIBObjects 8 } mgmdRouterSrcListEntry OBJECT-TYPE
    SYNTAX       MgmdRouterSrcListEntry
    MAX-ACCESS   not-accessible
    STATUS       current
    DESCRIPTION
        "An entry (conceptual row) in the mgmdRouterSrcListTable."
    INDEX      { mgmdRouterSrcListAddressType, mgmdRouterSrcListAddress,
                 mgmdRouterSrcListIfIndex, mgmdRouterSrcListHostAddress }
    ::= { mgmdRouterSrcListTable 1 }

MgmdRouterSrcListEntry ::= SEQUENCE {
    mgmdRouterSrcListAddressType    InetAddressType,
    mgmdRouterSrcListAddress        InetAddress,
    mgmdRouterSrcListIfIndex        InterfaceIndex,
    mgmdRouterSrcListHostAddress    InetAddress,
    mgmdRouterSrcListExpire         TimeTicks
}
```

FIG. 11

METHODS AND APPARATUS FOR MANAGING MULTICAST TRAFFIC

CROSS-REFERENCE TO RELATED APPLICATIONS

This application is continuation-in-part of U.S. patent application Ser. No. 12/440,225, filed Mar. 5, 2009 which relates to and claims the benefit of PCT/EP2007/011043, filed Dec. 17, 2007, which claims priority to and the benefit of Spanish Patent Application No. 200702687, filed Oct. 15, 2007. This application also relates to and claims the benefit of Spanish Patent Application No. 200900034, filed Dec. 23, 2008.

TECHNICAL FIELD

The present invention relates to the field of multi-diffusion or "multicast" technology in data networks.

BACKGROUND

Multicast technology makes it possible to send data from a single source to many recipients through a data network, without having to set up unicast communication, i.e. one-to-one individual communication between the source and each of the recipients. To that end the source sends data, in data packet form, to a single address associated to a multicast group to which the equipment interested in being recipients of the data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

The recipients which receive data in a multicast group are usually equipment connected to the data network by means of a proxy or a router. Hereinafter, the common term host will be used to refer to the recipient equipment. A host can be, for example, a computer or a set-top box (digital signal decoder) connected to a television set.

When a host wants to receive the information sent by one or several sources of a multicast group, it sends to the closest router, or to an intermediate proxy, a subscription message to subscribe to the group so that the router transmits to it the data arriving through the data network and which has been sent by the sources of the multicast group. Likewise, when a host wishes to stop receiving data sending in the multicast group, it sends to the router or to the proxy an unsubscribe message to stop receiving them.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router. Hereinafter, the generic term IGMP proxy will be used to designate a proxy using the IGMP/MLD protocols.

In addition, routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The IGMP protocol version currently being used is IGMPv3, which is described in the RFC 3376 specifications published on line by the IETF (B. Cain et al., Engineering Task Force, Network Working Group, Request for Comments 3376, October 2002).

With regard to the MLD protocol, the version currently being used is MLDv2, which is described in the RFC 3810 specifications published on line by the IETF (R. Vida et al., Engineering Task Force, Network Working Group, Request for Comments 3810, June 2004).

The operation of an IGMP proxy is described in the RFC 4605 specifications Published on line by the IETF (B. Fenner et al., Engineering Task Force, Network Working Group, Request for Comments 4605, August 2006).

The PIM-SM protocol used for the communication between routers is described in the RFC 4601 specifications published on line by the IETF (B. Fenner et al., Engineering Task Force, Network Working Group, Request for Comments 4601, August 2006).

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many recipients. Radio and television via Internet are SSM applications. This is why SSM is currently very interesting.

In earlier IGMP protocol versions, a host could not choose the data sending sources it did not want to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM.

The possibility that the hosts could choose the sources within a multicast group was introduced in the IGMPv3 version of the IGMP protocol to allow SSM. To that end, a host can send IGMP messages containing data blocks referred to as Group Record in which the host defines the sources from which traffic is to be received for each multicast group. These Group Record data blocks in an IGMP message can be of several types:

An INCLUDE type Group Record data block containing information on source IP addresses from which the host wishes to receive data sending. According to the terminology of the RFC 3376 specifications, the sources chosen by means of an IGMP message containing an INCLUDE type Group Record are referred to as INCLUDE sources.

An EXCLUDE type Group Record data block, containing information on source IP addresses from which the host does not wish to receive data sending. In this case, it is interpreted that the host wishes to receive data sent by all the sources of the multicast group except the sources indicated as excluded in the message. According to the terminology of the RFC 3376 specifications, the excluded sources by means of an IGMP message containing an EXCLUDE type Group Record are referred to as EXCLUDE sources.

For clarity's sake, the term INCLUDE message will be used hereinafter to designate an IGMP or MLD type message containing an INCLUDE type record or Group Record, and the term EXCLUDE message will be used hereinafter to designate an IGMP or MLD type message containing an EXCLUDE type record or Group Record.

Each network interface and multicast group has a state record storing the information on the interface and group and the state record contains a field referred to as filter-mode which can only be of the INCLUDE type, containing only INCLUDE sources, or of the EXCLUDE type, containing only EXCLUDE sources. The rules that are transcribed below are applied when the network interface record must result from the combination of different records:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

These rules are applied in a network interface of equipment operating as an IGMP proxy and receiving INCLUDE messages or EXCLUDE messages from different hosts or from different IGMP proxies located downstream from the network interface (i.e. in the direction going from the router to the hosts). These same rules are also applied in a network interface of equipment, such as a personal computer for example, provided with several sockets receiving different INCLUDE source or EXCLUDE source requests from different applications.

Channel (S, G) is used hereinafter, and according to the common nomenclature in SSM technology, to refer to the sending of source S of the multicast group G.

In the current state of the art, routers using the IGMPv3 protocol store only the minimum multicast traffic information that they must transmit. This minimum information consists of storing, for each network interface of the router and multicast group, a state reflecting if, for a specific channel (S,G) or multicast group (*,G) there is at least one host interested in receiving the multicast traffic.

In a multicast system operating with the IGMPv3 protocol, different hosts connected directly to a single network interface of a router through a multiaccess network, such as an Ethernet network for example, can send different IGMP messages with multicast traffic requests referring to a single multicast group. Each of these IGMP messages contains its own INCLUDE type or EXCLUDE type sources. The router receiving these IGMP messages has to decide which multicast traffic it must send for each network interface and for each multicast group such that it meets all the traffic requests it has received through the IGMP messages. This problem is solved in the IGMPv3 protocol as follows: when an IGMPv3 router, which is initially transmitting multicast traffic from specific sources of a multicast group G, receives a new IGMPv3 message referring to the group G, it continues transmitting all the traffic from the sources that it was transmitting plus the traffic from the new sources requested in the new IGMPv3 message. Furthermore, to prevent indefinitely transmitting traffic from sources which no host wishes to receive, in specific cases the IGMPv3 router sends a Source-And-Group Specific Query type message to the multicast address G that all the hosts which are receiving traffic from group G listen to find out if there are still hosts interested in continuing to receive the multicast traffic from specific sources.

This solution adopted in the IGMPv3 protocol is a solution to the problem of managing the different source requests that different hosts make for a single multicast group. However, as will be seen below in the detailed description of the embodiments of the invention, the solution has the drawback that the implementation thereof involves enormous technical complexity, and it further involves rather inefficient multicast traffic management.

Another problem with the IGMPv3 protocol is that a single host can send a high number of requests to the router and even collapse it. The router is not able to detect this situation and therefore is not able to prevent it.

As will be explained below in the detailed description of embodiments of the invention, another problem with the IGMPv3 protocol is that it also causes drawbacks for managing the interconnection between the IGMPv3 protocol (multicast communications between the router and the hosts) and the PIM-SM protocol (multicast communications between routers), specifically for managing the transmission between these two protocols of the information from the sources requested by the hosts.

SUMMARY OF THE DISCLOSURE

One purpose of the present invention is to provide an improved system and method of managing multicast communications in a data network.

An object of the present invention is to increase the efficiency of the routers that receive multicast traffic requests from the hosts.

Another object of the present invention is to prevent the unnecessary consumption of bandwidth that occurs when a router transmits a multicast traffic that no host wants to receive.

Another object of the present invention is to improve the multicast traffic bandwidth management by the routers and the proxies.

For this purpose, according to one implementation, a method for managing multicast traffic in a data network, of the type indicated above, has been developed, in that according to a multicast host-router communications protocol, the router receiving one of the messages sent by a host to request multicast traffic from sources in a multicast group obtains in the message identifying data which identify the host that has sent the message, and the router stores in specific records for each network interface of the router, host and multicast group, information about the sources the traffic of which has been requested by the host in the messages sent to the router.

According to one implementation, when a message sent by a host to request multicast traffic from sources in a multicast group is a change of state message informing about a variation of the sources from which the host wishes to receive traffic, the router receiving the message updates the information contained in its specific record for the host and, based on the information contained in its specific records for the different hosts which have requested multicast traffic, the router adjusts its multicast traffic transmission without requesting confirmation from the hosts.

In one implementation, the identifying data that the router obtains in the messages sent by the hosts to request multicast traffic from sources in a multicast group are the IP (Internet Protocol) address of origin of the IP datagram containing the message. In another advantageous embodiment, the identifying data are the MAC (Media Access Control) address of origin of the data frame that carries the IP (Internet Protocol) datagram containing the message, and the equipment uses the MAC address as the identifying data which identify the host.

In accordance with other implementations, a switch analyzes the IP data packets containing the messages sent by the hosts towards the router to request multicast traffic from sources in a multicast group and the switch creates or updates a table with the multicast traffic information that it must send by each of its ports. In these implementations, according to the multicast communications protocol between the hosts and the router, the switch stores, separately for each host that has requested multicast traffic in the messages, the sources from which the host has requested multicast traffic.

In one implementation, the messages sent by the hosts to request multicast traffic from sources in a multicast group separately contain:
 included source lists of a multicast group, indicating that the host wishes to receive the traffic sent by the included sources;
 excluded source lists of a multicast group, indicating that the host wishes to receive the traffic sent by all the sources of the multicast group except the excluded sources;
and the network equipment receiving the messages separately store for each host the data of the included sources and the data of the excluded sources.

The present invention comprises network equipment compatible with the methods disclosed herein and suitable for acting, in its communications with the hosts, as the router of the method and in one implementation stores executable instructions for:
 when the network equipment receives a message in which a host requests multicast traffic from sources in a multicast group, obtaining from the message identifying data which identify the host that has sent the message, and;
 storing in specific records for each network interface of the router, host and multicast group information about the sources the traffic of which has been requested by the host in the messages sent to the network equipment.

The network equipment according to the present invention can be a router and also intermediate equipment suitable for operating as a proxy between the hosts and the router.

In one implementation, the network equipment stores executable instructions for analyzing the message sent by the host to request multicast traffic from sources in a multicast group and, if the message is a change of state message informing about a variation of the sources from which the host wishes to receive traffic, updating the information contained in its specific record for the host and, based on the information contained in its specific records for the different hosts which have requested multicast traffic, adjusting the multicast traffic transmission without requesting confirmation from the hosts.

In another implementation, the network equipment stores executable instructions for reading, in the message in which a host requests multicast traffic from sources in a multicast group, the IP (Internet Protocol) address of origin of the IP datagram containing the message, and using the IP address as the identifying data which identify the host. In another embodiment, the identifying data which the network equipment reads are the MAC (Media Access Control) address of the data frame that carries the IP (Internet Protocol) datagram containing the message, and the equipment uses the MAC address as the identifying data which identify the host.

In another implementation, the network equipment according to the invention stores executable instructions for analyzing the information contained in the specific records about the sources the multicast traffic of which has been requested by the different hosts and, based on the information, selectively limiting the multicast traffic which the network equipment transmits to each host.

The network equipment according to the present invention preferably stores executable instructions for analyzing the information contained in the specific records about the sources the multicast traffic of which has been requested by the different hosts and, based on the information, balancing the multicast bandwidth which the network equipment has available for distributing it among the various hosts.

In one implementation, the network equipment according to the present invention stores executable instructions for: receiving the messages sent by the hosts to request multicast traffic from sources in a multicast group, when the messages separately contain:
 included source lists of a multicast group, indicating that the host wishes to receive the traffic sent by the included sources;
 excluded source lists of a multicast group, indicating that the host wishes to receive the traffic sent by all the sources of the multicast group except the excluded sources;
and separately storing for each network interface of the network equipment and multicast group the data of the included sources and the data of the excluded sources.

The present invention also relates to network equipment compatible with the methods disclosed herein, in which the network equipment is a switch suitable for analyzing the IP data packets containing the messages sent by the hosts towards the router to request multicast traffic from sources in a multicast group, and creating or updating a table with the multicast traffic information which the switch must send for each of its ports, characterized in that it stores executable instructions for separately storing for each switch port, multicast group and host that has requested multicast traffic in the messages, the sources from which the host has requested multicast traffic.

In accordance with another implementation a router is provided that is situated in a data network between sources that send multicast data packets directed to a multicast group and hosts requesting to receive the multicast data packets, the router having one or more network interfaces in the direction of the hosts, the router storing for each network interface, each multicast group address and each host at least one data record arising from one or more data requests made by the hosts, the at least one record comprising multicast group and source information, the router storing executable instructions to receive messages originating from a host, update the status of the data sources for that host and implement the actions according to one or a combination of Tables 3, 4, 5, 6 and 7, or in according to one or a combination of Tables 3, 4, 5, 6 and 7, or subsets or combination of subsets thereof.

BRIEF DESCRIPTION OF THE DRAWINGS

Other advantages and features of the present invention can be seen in the following description in which, with a nonlimiting character, preferred embodiments are referred to in relation to the attached drawings:

FIG. 11 shows a code fragment that corresponds to a part of the code of the object named 'mgmdRouterSrcListTable'.

DETAILED DESCRIPTION

Figure 1:
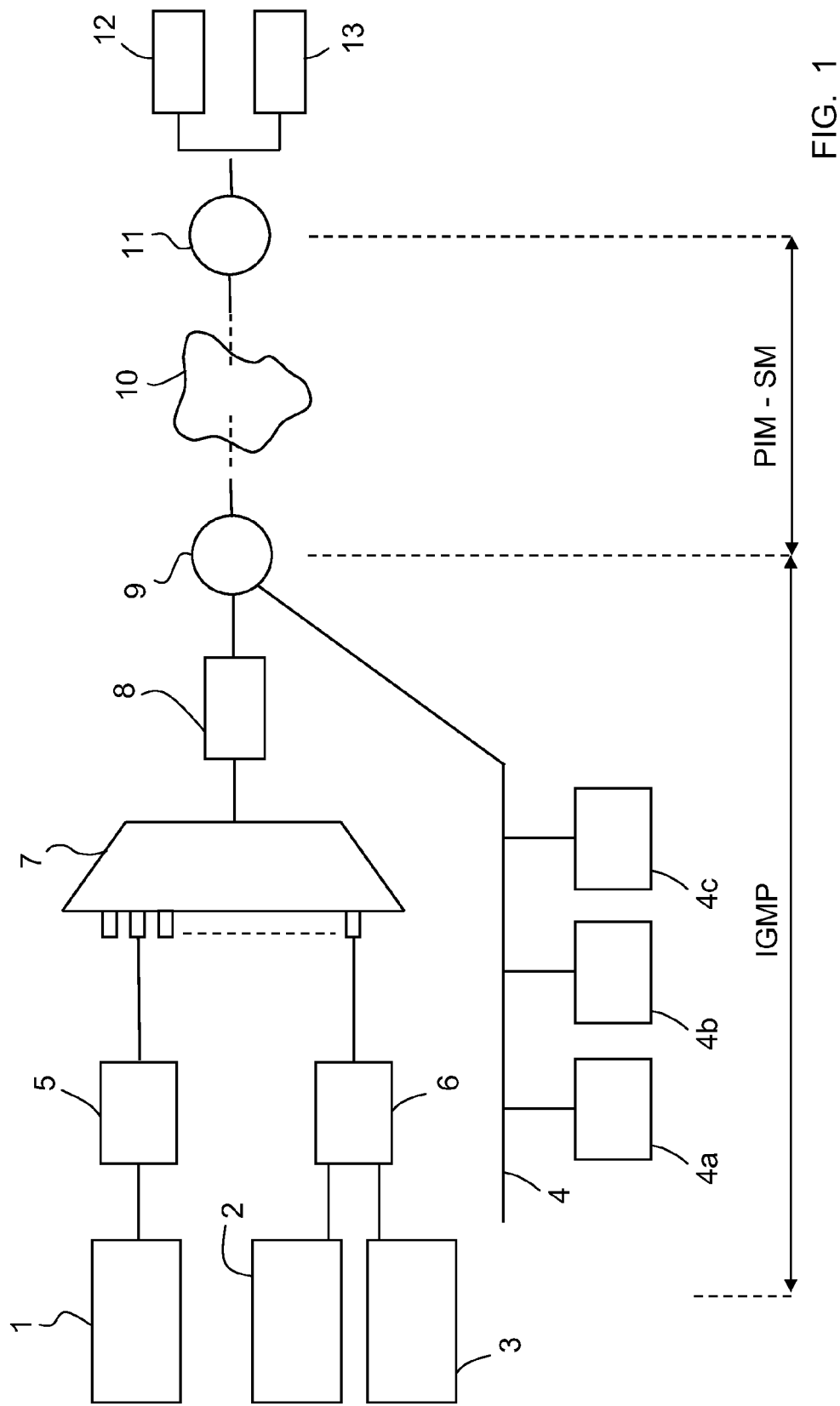
FIG. 1 shows a basic example of a multicast system in a data network in which the present invention is applicable.

FIG. 1 shows a basic example of a multicast system in a data network. In this example, six hosts 1, 2, 3, 4a, 4b, 4c are connected to the data network. Hosts 1, 2 and 3 are connected through several CPE 5 and 6 (CPE: Customer-Premises Equipment). A CPE is a connection terminal to the network that is located on the subscriber access line side, which is communicated for example by means of a DSL (Digital Subscriber Line) modem. The hosts 2 and 3 are both connected to a single CPE 6 of a subscriber line. CPEs 5 and 6 are connected to a DSLAM 7 (DSLAM: Digital Subscriber Line Access Multiplexer) which directs traffic from the different CPEs 5 and 6 through a switch 8 to a router 9 which is in turn connected to an IP network 10. Another router 11, which transmits the data packets sent by sources 12, 13, is connected to another point of the IP network 10. The hosts 4a, 4b, 4c are connected directly to a single network interface of the router 9 through a multiaccess network which in this case is an Ethernet network represented by line 4.

For clarity's sake, FIG. 1 shows a set of hosts formed by hosts 1, 2, 3, 4a, 4b and 4c connected to a router 9, and a set of sources 12 and 13 connected to a router 11. Of course, a multicast system is in reality made up of a large number of these sets.

The particular distribution of the different network equipment in FIG. 1 is also a very simple case the only purpose of which is to illustrate the following explanations. The invention is obviously applied to any other possible distribution.

FIG. 1 also shows the scope of each of the IGMP and PIM-SM protocols: the IGMP protocol is applied to communications between the receiving hosts and the routers, through the CPEs and the DSLAMs, whereas the PIM-SM protocol is applied to communications between different routers through the IP network. The router 9 is located in the border between these two types of communications and uses both protocols. The router 9 treats the information contained in the IGMP messages reaching it from the hosts and sends, towards other routers of the network, such as the router 11 for example, corresponding PIM-SM messages so that the routers transmit to it the channels requested by the hosts in the IGMP messages.

It has been assumed in this example that the routers operate with the IPv4 version of the IP protocol and therefore the system uses the IGMP protocol. However, the reasons set forth are also applied to a system using the MLD protocol (used in the IPv6 version of the IP protocol).

The CPEs and the DSLAMs are equipment that can carry out an IGMP proxy function consisting of receiving several IGMP requests and assembling them to reduce the volume of IGMP messages which are sent to the router. This operation is described in the RFC 4605 specifications of the IETF mentioned above.

The basic operation of the multicast system shown in FIG. 1 is as follows.

Hosts 1, 2 and 3 send IGMPv3 messages to CPEs 5, 6 in which they identify the multicast address of a multicast group and the source addresses of the multicast group from which they wish to receive data. These IGMP messages are INCLUDE type or EXCLUDE type. The CPEs receiving several IGMP messages from different hosts, as is the case of CPE 6 in the example of FIG. 1, assemble these IGMP messages to send DSLAM 8 a single IGMP message. For its part, DSLAM 7 receives IGMP messages from different CPEs, in this case CPEs 5 and 6, and assembles them to send to router 9, through a switch 8, an IGMP message in which only the INCLUDE or EXCLUDE sources are indicated for each multicast group. Hosts 4a, 4b and 4c are connected directly to router 9 through the multiaccess network 4, whereby they send directly to the router 9 their IGMP messages.

CPE 6 and DSLAM 7 operate as an IGMP proxy, i.e. as intermediate equipment between the host and the IGMP router receiving IGMP traffic requests through its network interfaces connected to the host or to other IGMP proxies, assembling the information and sending a summarized IGMP message through the network interface connecting the IGMP proxy with the IGMP router. An IGMP proxy behaves like an IGMP router in its communications with the host and behaves like a host in its communication with an IGMP router. Therefore, as seen from DSLAM 7 CPE 6 is equivalent to a host. Likewise, as seen from router 9, DSLAM 7 is equivalent to a host.

CPE 5, however, is connected to a single host 1 and transmits towards the router 9 IGMP messages corresponding to the IGMP messages sent by the host.

DSLAM 7 therefore receives IGMP messages from the host 1 which pass through CPE 5 and IGMP messages from CPE 6 which, as seen from DSLAM 7, behaves like a host. For its part, router 9 receives IGMP messages directly from hosts 4a, 4b and 4c and IGMP messages from DSLAM 7 which, as seen from the 9, behaves like a host.

Router 9 receives IGMP messages sent by DSLAM 7 through switch 8 and by hosts 4a, 4b and 4c directly and communicates with other IP network routers using the PIM-SM protocol for communicating with router 11 and setting up routing through the IP network making the data sent by the sources specified in the IGMP message received by router 9 reach router 9 from router 11.

1) Operation of Network Equipment Belonging to the Prior State of the Art Using the IGMPv3 Protocol To show the features and advantages of the invention, the operation of network equipment applying the IGMPv3 protocol according to the state of the art is first described.

To explain the way of assembling messages in a proxy using the IGMPv3 protocol, the RFC 4605 specifications, defining the operation of the IGMP proxy, refer to section 3.2 of RFC 3376 defining the IGMPv3 protocol. The rules are the same as those which have been explained above to deduce the state of a network interface of a host based on several records.

These rules adapted to the operation in an IGMP proxy are reproduced below:

Rule 1. For a specific network interface and multicast group, if any of the data sources of the received messages of the group is EXCLUDE, then an EXCLUDE type message is sent for the group and the source list of the message is the intersection of the EXCLUDE source lists minus the sources of the INCLUDE messages.

Rule 2. For a specific network interface and multicast group, if all the data sources of the received messages of the group are of the INCLUDE type, then an INCLUDE type message is sent for the group and the source list of the network interface is the union of all the INCLUDE sources.

Therefore, the method applied by an IGMP proxy consists of assembling the sources of the different messages of each multicast group received in each proxy network interface without taking into account which host sends the message: the proxy stores in which network interface the IGMP message has been received, but it does not store the identification of the host that has requested each source.

The same occurs in an IGMP router, the operation of which is explained in section 6 of RFC 3376. For each network interface of the IGMP router and for each multicast group, the IGMP router stores the information of the channels and multicast groups requested but it does not store the identification of the host requesting each channel or each multicast group.

The IGMP routers periodically send to the hosts messages referred to as Membership Query messages so that the hosts reply informing about the groups and sources from which they wish to receive multicast traffic. The hosts can also send messages to the router to request multicast traffic without waiting for the router to send a Membership Query message.

The routers execute the IGMP protocol in all the networks they are directly connected to. If a multicast router has more than one network interface connected to the same network it only needs to execute the protocol in one of the network interfaces.

For each network card or network interface, and for each multicast group, the IGMP routers store the information of the INCLUDE and EXCLUDE multicast sources in one record:

Record: (multicast-address, group-timer, filter-mode, {(source-address, source-timer)})

wherein multicast-address is the multicast group;

{(Source-address, source-timer)} is a list of elements (source-address, source-timer), source-address being the source IP address and source-timer being a timer associated to the source;

filter-mode can be INCLUDE or EXCLUDE and it has the same operation as that described in RFC 3376: to indicate if the sources of the source list and timers are INCLUDE sources or EXCLUDE sources;

group-timer is a timer used as a mechanism for the transition of the filter-mode of a state record of the router from EXCLUDE mode to INCLUDE mode. When the group-timer of a specific multicast group and network interface reaches zero, the router assumes that there are no longer hosts with EXCLUDE filter-mode connected to the network interface and it switches to the INCLUDE mode.

The value of the timers gradually drops over time and if the router receives a Membership Report message from a host the router reinitiates the corresponding timers.

If the record has an INCLUDE filter-mode, the timers operate in the following manner: for a specific network interface, a specific multicast group and a specific included source-address, as long as the source-timer is greater than zero the router will continue transmitting through the network interface the multicast traffic from the channel (source, multicast group); when the source-timer reaches zero, the router will stop transmitting the traffic and will eliminate the source from the INCLUDE source list of that multicast group.

If the record has a EXCLUDE filter-mode the timers operate in a similar manner, but with the difference that the EXCLUDE sources are classified in two lists: a first list referred to as Requested List containing the sources the source-timer of which has a value greater than zero and a second list referred to as Exclude List containing the sources the source-timer of which has a value zero.

If a record has an EXCLUDE filter-mode for a specific multicast group, the router transmits all the traffic from all the sources of the multicast group except the EXCLUDE sources of the Exclude List.

The router also uses the timers to make sure that, after having sent a Group Specific Query message or a Group and Source Specific Query message, all the hosts have had enough time to reply to the message.

There are several reasons for the existence of a Requested List in IGMPv3. One of them is that in a network with several hosts sending messages to an IGMP router, it is possible that there could be a conflict between the requests of the different hosts. This occurs, for example, when a host requests traffic from a specific source and another host requests traffic excluding the source. For example, a host 4a sends a first EXCLUDE({S1},G1) message and another host 4b in the same Ethernet network then sends a second EXCLUDE({S1, S2,S3},G1) message to the same router. Upon receiving the second message, if the router places the sources {S1,S2,S3} of the second message in the Exclude List, the host 4a would stop receiving traffic from sources S2 and S3 that it wanted to receive because it wanted to receive all the traffic except the traffic from source S1. To avoid this problem, the IGMP router places in the Exclude List only the intersection of the set of sources of the new message with the set of sources that there were in the Exclude List before receiving the message. The remaining EXCLUDE sources go to the Requested List and, optionally, the router sends a Group-And-Source-Specific Query message to the hosts to ask if there is any host that is still interested in receiving traffic from sources S2 and S3 of group G1.

Table 1 (at the end of this document), extracted from the RFC 3376, summarizes the operation of a router according to the IGMPv3 protocol.

In Table 1, the first column "Status 1" shows the initial state of the record of the IGMP router; the second column "Message" shows the content of a Membership Report message received by the IGMP router; the third column "Status 2" shows the state of the record of the IGMP router after having received the Membership Report message; the fourth and last column "Actions" shows the actions that the IGMP router carries out after having received the Membership Report message. Table 1 contains 12 rows respectively corresponding to 12 processes which each illustrates the operation of the router according to its initial state (column 1) and according to the messages it has received (column 2). Each row of Table 1 is separated from another row by a dotted line.

Table 1 relates to a specific network interface of the IGMP router executing the IGMPv3 protocol and a specific multicast group G. Each network interface and multicast group G will have their own state records which will be affected by the messages that the IGMP router receives through the network interface referring to the group G. The following nomenclature has been used in Table 1:

(A+B) means the union of the sets of sources A and B.

(A*B) means the intersection of the sets of sources A and B.

(A−B) means the set of sources A minus the sources of A that are also found in B.

INCLUDE (A) indicates that the IGMP router has a record with INCLUDE filter-mode with a set of sources A.

EXCLUDE (X,Y) indicates that the IGMP router has a record with EXCLUDE filter-mode because there are EXCLUDE sources, wherein:
  X is the Requested List of EXCLUDE sources
  Y is the Exclude List of EXCLUDE sources.

GMI is a parameter referred to as Group Membership Interval containing a value of time. A value of 260 seconds is used by default.

T (S) is the source timer of source S.

GT is the Group Timer, i.e. the timer of the record for switching from EXCLUDE mode to INCLUDE mode.

SEND Q(G, S) means that the IGMP router sends a Group-And-Source-Specific Query message to the hosts to check if there is still a host interested in receiving the sendings from sources S of multicast group G. When this action is carried out, the IGMP router also reduces the timers of the sources S to the LMQT value. If the IGMP router receives in response a message showing interest in any of the sources S, it then initializes the value of the timers of the sources, for which there is an interested host, to an initial value equal to GMI.

DEL(A) means that the IGMP router deletes from the record the sources of list A.

LMQT is a parameter referred to as Last Member Query Time containing a time value. It is the time a host has to reply to a Group-And-Source-Specific Query type message which has been sent by the IGMP routers. After this time, if no host replies that it is interested in receiving the channels specified in the message, the IGMP router stops transmitting them. The value of LMQT in the IGMPv3 protocol is 20 seconds by default.

The messages in column 2 of Table 1 are the six types of IGMP messages defined in the IGMPv3 protocol for indicating to the router the sources from which it wishes to obtain multicast traffic. The meaning of these six IGMP messages is described in RFC 3376 (chapter 4.2.12) and is as follows:

IS_IN (Z), IS_EX (Z) indicate that the network interface of the host that has sent the message has an INCLUDE or EXCLUDE filter-mode, respectively, for the sources of list Z.

TO_IN (Z), TO_EX (Z) indicate that the network interface of the host that has sent the message has switched the filter-mode from EXCLUDE mode to INCLUDE mode, or from INCLUDE mode to EXCLUDE mode, respectively, for the sources of list Z.

ALLOW (Z) indicates that the network interface of the host that has sent the message wishes to receive the traffic from the new sources of list Z. These sources are the sources that the network interface will add to its INCLUDE source list or they are the sources that it will delete from its EXCLUDE source list.

BLOCK (Z) indicates that the network interface of the host that has sent the message no longer wishes to receive traffic from the sources of list Z. These sources are the sources that the network interface will delete from its INCLUDE source list or they are the sources that it will add to its EXCLUDE source list.

It can be seen that the 12 rows of Table 1 correspond to the 12 possible combinations of an initial state record of the router (column 1) and of a type of IGMP message received (column 2).

The router consults the hosts by means of a Group-And-Source-Specific Query message (SEND messages in column 4 of Table 1) for checking if there is a host interested in receiving multicast data from those sources, the traffic of which was being initially transmitted (column 1 of Table 1) and no longer wishes to receive according to the sources indicated in the last received IGMPv3 message (column 2 of Table 1). This operation is inefficient because unnecessary Group-And-Source-Specific Query type messages are sent, and furthermore traffic is transmitted from sources that no host wishes to receive. Managing these situations in the twelve cases of Table 1 further involves enormous technical complexity.

It is also common for users of a multicast system, who act through the hosts, to have a behavior known as zapping, which consists of quickly and successively changing channels. When a host requests a new channel, the IGMP router initiates the transmission of the channel but it does not stop it when the host changes the channel again, but rather the router sends a Group-And-Source-Specific Query message and maintains the transmission during the LMQT time. If this occurs repeatedly in a short time frame, the IGMP router has to manage all these messages and it will further be uselessly sending the entire series of channels through which the user has passed by zapping.

Table 2 (at the end of this document) shows a specific example illustrating these inefficiencies. The example of Table 2 relates to the case of a host which changes channels within a multicast group G. Column 1 of the table shows the successive IGMP messages sent by the host, column 2 shows the source list the traffic of which the router sends after having received the IGMP message, and column 3 shows the actions performed by the router after having received the IGMP message. The two messages SEND Q(G, S1) and SEND Q(G, S2) (Group-And-Source-Specific Query messages sent by the router) in column 3 of Table 2 are unnecessary because the host no longer wishes to receive the traffic sent by sources S1 and S2 indicated respectively in the messages. It is also unnecessary for the router to transmit channels (S1, G) and (S2, G) during the LMQT time.

The management of unnecessary messages by the router involves considerable consumption of calculation capacity that could be avoided. Furthermore, unwanted traffic transmission unnecessarily consumes bandwidth. These inefficiencies are multiplied in the router when there are thousands of hosts changing channels.

2) First Embodiments of the Present Invention

The operation of the network equipment applying the IGMP or IGMP type protocol according to the invention is typically similar to that of the network equipment of the state of the art applying the IGMPv3 and MLDv2 protocols. To that end, to aid in understanding, the same nomenclature has been used below as what is used in the RFC 3376 (IGMPv3 protocol) and RFC 3810 (MLDv2 protocol) specifications mentioned above.

Furthermore, since the operation of the communications protocol of the present invention may be based on the IGMP and is similar to the operation of the IGMPv3 protocol, all the features that are common to IGMPv3 are not explained.

A feature of the invention consists of the fact that the network equipment receiving state or change of state messages (e.g., IGMP type or IGMPv3 messages) by means of which the hosts request multicast traffic, such as an IGMPv3 router, a switch (e.g., snooping switch) and an IGMPv3 proxy, store in a table or database the separate information of the sources which each host sending the state or change of state messages (e.g., IGMP type or IGMPv3 messages) requests, requesting multicast traffic along with a unique identifier of the host that has sent each message.

To that end, the router, switch or proxy maintains a state record for each network interface or port, multicast group and host sending the message, thereby knowing exactly which multicast traffic sources are requested by each host independently.

Upon storing the information separately, identifying the requests of each host, there are no longer conflicts between the sources requested in the messages from different hosts, because when a host sends a message to stop receiving a specific channel (S,G) to a network interface of, for example, an IGMP router, the router knows exactly if there is another host connected at that same network interface and interested in receiving that same channel (S,G). If there is another interested host, the IGMP router continues transmitting the channel (S,G), but if there is no other interested host, it may stop sending the channel (S,G) in the very moment it receives the message asking it to stop transmitting it, without needing to send a Group-And-Source-Specific Query type message and waiting for the reply.

As indicated in RFC 3376, at the beginning of section 4, the IGMP messages are encapsulated in IPv4 datagrams, with protocol number 2. An IPv4 datagram contains a field indicating the IP address of the equipment sending the datagram.

A particularly effective way of implementing the present invention consists of using, as an identifier of the equipment sending each state or change of state message (e.g., IGMP message), the IP address of the equipment. It is possible that some equipment sending the state or change of state message (e.g., IGMP messages) does not have its own IP. This occurs, for example, in some types of DSLAM sending the IGMP messages using IP 0.0.0.0. In these cases, it is possible to assign an IP address to the DSLAM and the latter will use it in its IGMP or similar type messages.

The MAC (Media Access Control) address of the data frame encapsulating the IP data packet carrying the state or change of state message (e.g., IGMP message) sent by the host can also be used as an identifier of the host. The use of this identifier is particularly useful in switches implementing the present invention since switches are level 2 equipment knowing in which port each equipment is connected, identifying it by its MAC address and not by its IP address.

The operation of the communications protocol (e.g., IGMP or IGMP type protocol) according to the invention in each network equipment: the improved IGMP or IGMP like router, the improved IGMP or IGMP like proxy and an improved switch performing the IGMP or similar type snooping function, is described in detail below. For descriptive and discussion purposes, the operation of the numerous embodiments that follow will be described as improved IGMP and/or MLD protocol operations or equipment. It is appreciated, however, that the scope of the present invention is not limited to the IGMP and/or MLD protocols but may encompass any communications protocol and equipment capable of implementing the concepts and improvements disclosed herein. Moreover, it is appreciated that the preceding text is in a like manner not limited to improved IGMP and/or MLD protocol operations or equipment.

2.1) Operation of Improved Routers According to the Present Invention

The main difference with regard to IGMP routers of the state of the art applying the IGMPv3 and MLDv2 protocols is that an improved IGMP or IGMP like router according to the invention has a state record for each network interface, multicast group and host of origin, in which it stores the sources requested by each host:

Record: (interface, multicast-address, hostID, group-timer, filter-mode {(source-address, source-timer)})

wherein interface indicates the network interface of the router through which the IGMP router has received the IGMP message;

multicast-address is the multicast group;

hostID is an identifier of the host that has sent the IGMP message;

{(source-address, source-timer)} is a list of elements (source-address, source-timer), where source-address is the source IP address and where source-timer is a timer associated to the source;

filter-mode can be INCLUDE or EXCLUDE and has the same operation as that described in RFC 3376: to indicate if the sources of the source list and timers are INCLUDE sources or EXCLUDE sources.

In the state records having an EXCLUDE filter-mode the EXCLUDE sources are classified in two lists: a first list referred to as Requested List containing the sources the source-timer of which has a value greater than zero and a second list referred to as Exclude List containing the sources the source-timer of which has value zero.

The principle for classifying the EXCLUDE sources into two lists, Requested List and Exclude List, according to the value of the source-timer is similar to the one applied in the IGMPv3 and MLDv2 protocols. The RFC 3810 specifications (MLDv2 protocol) mentioned above contain an explanation of this principle.

Each message that the IGMP router receives through a specific network interface, from a specific host and referring to a specific multicast group, affects only the state record of the network interface, host and multicast group.

Because the improved IGMP router identifies the origin of each IGMP message, it can behave in a deterministic manner for each host, i.e. the messages from each host determine the state of the router records associated with the host and it is not necessary to consult other hosts or take other hosts into account.

This deterministic behavior of the IGMP router is clearly shown in Table 3 (at the end of this document), which is similar to Table 1 but for an improved IGMP router according to the invention.

Table 1 relates to a specific network interface of the router and multicast group, whereas Table 3 relates to a specific network interface of the router, a specific multicast group and a specific host sending IGMP messages.

Both tables show the same combinations of initial states (column 1) and received IGMP messages (column 2), but as can be seen, the final states (column 3) and the actions of the IGMP router (column 4) are different. It can particularly be seen that in Table 3, column 4 (actions performed by the IGMP router) contains no SEND Q(G,S) message, since the improved IGMP router according to the invention does not need to send Group-And-Source-Specific Query messages to check if there is any host interested in receiving channel (S,G).

When the improved IGMP router has to decide if it must transmit a specific channel through a specific network interface, the algorithm of the router takes into account the different state records of the host referring to the multicast group and the network interface.

For a specific network interface, a specific multicast group G, and a specific INCLUDE source S, as long as there is a state record of a host referring to the network interface and the multicast group G the filter-mode of which is INCLUDE and the source-timer of which associated to the INCLUDE source S is greater than zero, the improved IGMP router will transmit through the network interface the multicast traffic of channel (S,G). Furthermore, if for the network interface and multicast group G there are state records the filter-mode of which is EXCLUDE, the improved IGMP router will further transmit through the network interface the multicast traffic from all the sources except the sources of the set resulting from the intersection of all the Exclude Lists of the state records with EXCLUDE filter-mode for the network interface and multicast group G.

When the timer associated to a specific INCLUDE source S of a state record with INCLUDE filter-mode reaches zero, the source S is eliminated from the INCLUDE source list of the state record.

When a state record with INCLUDE filter-mode does not contain any source in its INCLUDE list, the state record is eliminated.

The Requested List may be used in the improved IGMP router for switching a state record from EXCLUDE filter-mode to INCLUDE filter-mode, as explained in section 3 of Appendix A of RFC 3376.

Another advantage of maintaining the Requested List is that it allows effectively managing the situation occurring when the improved IGMP router has a record with an EXCLUDE filter-mode for a specific network interface of the router, a specific multicast group and a specific host, and the router receives from that same host a second message indicating to it that it wishes to receive traffic from a specific source S1, for example an ALLOW (S1) message. In this case if the router eliminates the source S1 from the Exclude List, and if the Requested List did not exist, the router would lose the IP address information for source S1 and would have to use ASM-type routing algorithms to receive the traffic from source S1. Upon maintaining the information of S1 in the Requested List, the information is not lost and can be used by the router to directly access source S1.

2.2) Operation of Improved Proxies According to the Present Invention

As explained above, an IGMP proxy is intermediate equipment between the host and the IGMP router receiving IGMP traffic requests through its network interfaces connected to the hosts or to other IGMP proxies, assembles the information and sends a summarized IGMP message through the network interface connecting the IGMP proxy with the IGMP router.

The network interfaces connecting the IGMP proxy with the host are referred to as downstream interfaces and there may be hundreds or thousands of them in a single IGMP proxy. In each downstream interface the IGMP proxy performs the function of an IGMP router.

However, there is only one network interface connecting the IGMP proxy with the IGMP router and is referred to as the upstream network interface.

An IGMP proxy behaves like an IGMP router in its communications with the host connected to its downstream interfaces and behaves like a host in its communication with the IGMP router through its upstream interface.

This can all be applied both to an IGMP proxy of the prior state of the art and to an improved IGMP proxy according to the invention.

The main difference between the improved IGMP proxy or IGMP like proxy according to the present invention with regard to an IGMPv3/MLDv2 proxy of the prior state of the art described in RFC 4605 is that since the improved IGMP proxy behaves like an improved IGMP router in each downstream interface, it has a state record storing the sources requested for each multicast group, host of origin and downstream network interface connected to the host of origin from which the proxy receives IGMP messages requesting multicast traffic.

An IGMP proxy of the prior state of the art stores the sources requested for each multicast group and downstream network interface. However, it does not store the information of the sources that each host requests and it cannot have a deterministic behavior such as that explained above for the improved IGMP router. This occurs even when there is only one host connected to each downstream interface because, since the IGMP proxy does not identify each host, it does not know how many hosts are sending IGMP messages to each network interface and does not detect that there is only one host.

However, in an improved IGMP proxy the information of the host of origin sending each IGMP message is identified and stored, and a separate record is maintained for each host of origin storing the sources that each host requests.

This difference allows the improved IGMP proxy to have a deterministic behavior similar to that which has been previously described for the improved IGMP router and, as in the case of the improved IGMP router, it allows the Group-And-Source-Specific Query messages to be eliminated and permits immediately stopping the sending of multicast channels that no host requires.

In a preferred embodiment, the identification of the host of origin is carried out in the same manner as for the improved IGMP router, as explained previously: using the IP address of the host of origin or the MAC address that the host uses for sending IGMP messages to the proxy.

2.3) Operation of Improved Switches According to the Present Invention Performing IGMP or IGMP Like Snooping The RFC 4541 specifications edited on line by the IETF (M. Christensen et al., Engineering Task Force, Network Working Group, Request for Comments 4541, May 2006) describe the operation of a switch performing a function referred to as IGMP snooping, which prevents all the multicast data packets having to be sent to all the switch ports (this is what occurs by default when the IGMP snooping function is not performed).

By means of the technique referred to as snooping, the switch, which in theory is level 2 equipment in the OSI (Open Systems Interconnection) model, neither knows nor uses level 3 protocols such as IP protocol, analyzes the IP data packets containing IGMP messages and creates or updates a table with the information of the groups or multicast channels that must be sent by each switch port. The switch thus sends for each of its ports only the multicast channels which the hosts connected to the port have requested.

An improved switch according to the present invention differs from a switch of the prior state of the art in that the information it obtains by means of snooping is stored such that the sources requested by each host of origin sending an IGMP message are stored for each switch port.

When the improved switch receives an IGMP message or IGMP like message through a specific port, referring to a specific multicast group and coming from a specific host, it updates the corresponding status table and/or record in the same or similar manner as an improved IGMP router according to the invention, as previously explained. The improved switch thus keeps the information in the updated status table and/or record.

The improved switch knows the improved IGMP protocol operation of the present invention using the improved IGMP router and the improved IGMP proxy and makes its decision to send or not send the traffic from a specific multicast channel to a specific network interface taking into account if the IGMP router and the IGMP proxy are using the normal IGMP protocol or the IGMP or like protocol improved by the present invention.

Therefore, for example, an improved switch does not wait for an improved IGMP router to send a Group-And-Source-Specific Query type message in response to an IGMP BLOCK(B) type message coming from a specific host and referring to a specific multicast group G, and nor does it wait for the hosts to reply to the message. The improved switch is able to decide in the very moment in which it receives the BLOCK(B) message through a port whether or not it should continue to transmit through the port the traffic from source B of multicast group G1 by analyzing its table or records containing the information extracted by snooping of the received IGMP messages for each switch port and can instantly check if there is any other host connected to the port which is still interested in receiving the traffic from source B of the multicast group.

In order to differentiate if the IGMP routers and the IGMP proxies are of the standard type or of the improved type according to the present invention, an improved switch according to the present invention may have a table which allows the information to be manually configured. The improved switch can alternatively detect if the router is an improved router by checking if the latter sends Group-And-Source-Specific Query messages. If the improved switch detects that the router sends such messages, it then deduces from this that it is a normal router (i.e. it is not an improved router).

2.4) Operation of Routers or of Proxies According to the Present Invention Regarding Bandwidth Limitation and Denial of Service Type Attacks An additional advantage of an improved IGMP router and of an improved IGMP proxy according to the present invention is that, since they identify the host of origin of each IGMP message and store this information, they can establish traffic limitations for each host to prevent that a single host can request a high number of multicast channels. They can also balance the available bandwidth among the various hosts.

Limiting the multicast traffic to each host allows preventing the problem of IT security referred to as denial of service attack occurring when an attacker sends a high number of traffic requests to an equipment until collapsing it.

The improved IGMP proxy according to the present invention can establish a multicast traffic limit for each host of origin such that when a host exceeds the multicast traffic level, the proxy stops transmitting to the host the new multicast channels that it requests. The improved IGMP proxy can optionally send an error message to the host of origin when this occurs.

The improved IGMP proxy allows configuring the multicast traffic level allowed in each downstream interface independently, to thus offer each user a multicast traffic level adapted to his or her needs.

The IGMP proxy improved by the present invention can also balance the available multicast bandwidth for distributing it among the various users, further taking into account in the distribution the multicast traffic limit that each user has contracted.

Therefore, for example, an improved IGMP proxy having 1 Gbit/s of multicast bandwidth and having 100 users requesting multicast traffic at a specific time establishes a traffic limitation for each user in a manner that is proportional to the bandwidth such user has contracted. If 75 users have contracted 10 Mbit/s and 25 users have contracted 50 Mbit/s, the proxy calculates the sum: $(75 \times 10)+(25 \times 50)=2000$ Mbit/s=2 Gbit/s and, since the total bandwidth of the proxy is 1 Gbit/s, the proxy establishes a consistent limitation, for example, in that each user can only use 50% of the contracted multicast traffic at that time.

The improved IGMP router can also establish the same limitations and functions that have just been explained for the improved IGMP proxy.

3) Second Embodiments of the Present Invention

The inefficiencies that have been explained in the previous example referring to the IGMP protocol also exist, though in a different manner, in PIM-SM communications between routers, i.e. in communications between routers using the PIM-SM protocol for transmitting multicast traffic between one another.

The PIM-SM protocol uses a timer referred to as Prune Pending Timer or PPT timer which introduces a delay when the PIM-SM routers receive a PRUNE message, for the purpose of giving time for the possible JOIN messages to arrive from other routers interested in continuing to receive traffic which, according to the PRUNE message, the router should stop transmitting. If these JOIN messages arrive, they cancel out the effect of the PRUNE message. As long as PPT timer has not reached zero, the router does not cut off traffic transmission. This PIM-SM communications operation generates problems similar to those which have been previously explained for IGMP communications: a PIM-SM router has to manage a complicated system to be sure that it does not erroneously cut off multicast traffic transmission and it must furthermore be transmitting multicast traffic even though there is no router interested in receiving the traffic.

The applicant has investigated solutions to overcome these problems in PIM-SM communications between routers. By associating these solutions with the present invention, which is applied to IGMP communications or IGMP like communications between hosts and an IGMP router or an IGMP like router, a much more efficient system is obtained in the whole of multicast communications between hosts and sources. The investigation conducted by the applicant has shown that there is a technical problem in relation to the structure of the IGMP protocol making it difficult to overcome these problems when both IGMP and PIM-SM protocols are integrated.

An example illustrating what the technical problem consists of and how it is possible to overcome it is described below. Some basic aspects of the PIM-SM protocol operation are first explained (for a complete description refer to RFC 4601 specifications mentioned above).

The name PIM-SM router will be used hereinafter to designate a router using the PIM-SM protocol for communicating with other routers. The names RP router and RP tree will also be used. The RP (Rendezvous Point) router is a PIM-SM router which has been designated as responsible for knowing all the sources of a single multicast domain (set of routers using a single RP router) for a multicast group. An RP (Rendezvous Point) tree is a routing tree for routing traffic through the RP router.

A PIM-SM router can send four types of messages with traffic requests to another PIM-SM router. These four types of requests are not alternatives, i.e. a single PIM-SM router can simultaneously send requests of the four different types to another PIM-SM router. The four types of requests are as follows:

1. JOIN/PRUNE (*,*,RP)

When a PIM-SM router sends a JOIN message of this type to another PIM-SM router, it is indicating that it wishes to receive the multicast traffic from all the multicast groups managed by the Rendezvous Point router indicated in the RP parameter.

2. JOIN/PRUNE (*,G)

This is used to receive (JOIN) or to stop receiving (PRUNE) all the traffic from a specific multicast group G, i.e. the traffic from all channels (S,G) having the group G as multicast group.

3. JOIN/PRUNE (S,G).

This is used to receive or to stop receiving the multicast traffic from group G coming from source S.

4. JOIN/PRUNE (S,G,rpt)

This is used together with (*, G) to stop receiving (PRUNE) the traffic from a certain source S of the multicast group G even though the interface of the router has a JOIN (*,G) state. The JOIN (S,G,rpt) message is used to receive traffic from the source again.

A PIM-SM router which wishes to receive, or to stop receiving, specific multicast traffic indicates to another PIM-SM router if it should transmit the traffic or not. To that end, it basically uses two types of PIM-SM messages: a JOIN message for indicating that it wishes to receive specific multicast traffic and a PRUNE message for indicating that it does not wish to receive it. For example, a JOIN(Si, Gj) message indicates that the router wishes to receive the traffic sent by source Si in group Gj. A PRUNE(*, Gi) message indicates that the PIM-SM router wishes to stop receiving the traffic sent by all the sources in group Gi.

Each PIM-SM router stores the information of the messages it receives in state records which allow it to know which traffic it should transmit to the other routers.

PIM-SM uses different state records for storing the four different types of multicast traffic requests that have previously been explained. Each of these four state records in a PIM-SM router is updated when the PIM-SM router receives a JOIN or PRUNE message which has been sent by another PIM-SM router and which relates to the same type of multicast traffic and the same multicast group as that of the state record.

Figure 2:
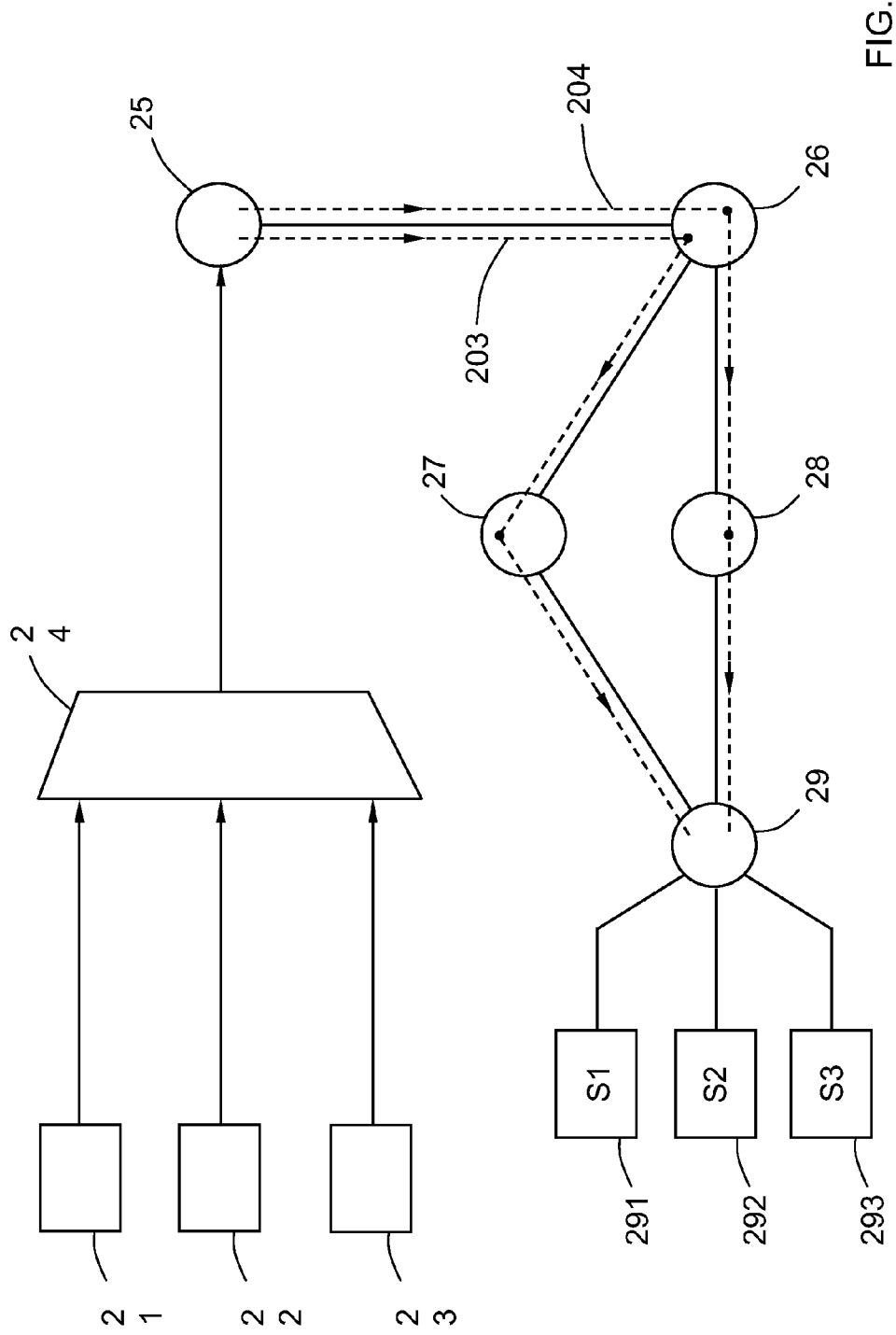
FIG. 2 shows another basic example of a multicast system in a data network which illustrates the problem solved by various implementations of the present invention.

FIG. 2 shows a basic example of a multicast system in a data network. In this example, three hosts 21, 22, 23 are connected to router 25 through a DSLAM 24 performing the functions of an IGMP proxy. Multicast communications between hosts 21, 22, 23 and router 25 use the IGMPv3 protocol. Router 25 is an IGMP/PIM-SM router which is connected to other PIM-SM routers 26, 27, 28 and 29 of an IP network, as shown in the figure. Router 27 is an RP router for multicast group G1. Router 29 is connected to three sources S1, S2, S3 sending multicast traffic in group G1. Sources S1, S2, S3 have reference numbers 291, 292 and 293. Routers 26 and 28 are intermediate routers between router 25 and router 29. As can be seen in the figure, multicast traffic between router 25 and router 29 can travel through two different paths: path 203 through routers 26 and 27, and path 204 through routers 26 and 28. The question of which path the traffic follows in each moment goes beyond this basic explanation and for that reason is not herein detailed (for a complete description refer to the RFC 4601 specifications mentioned above).

Figure 3:
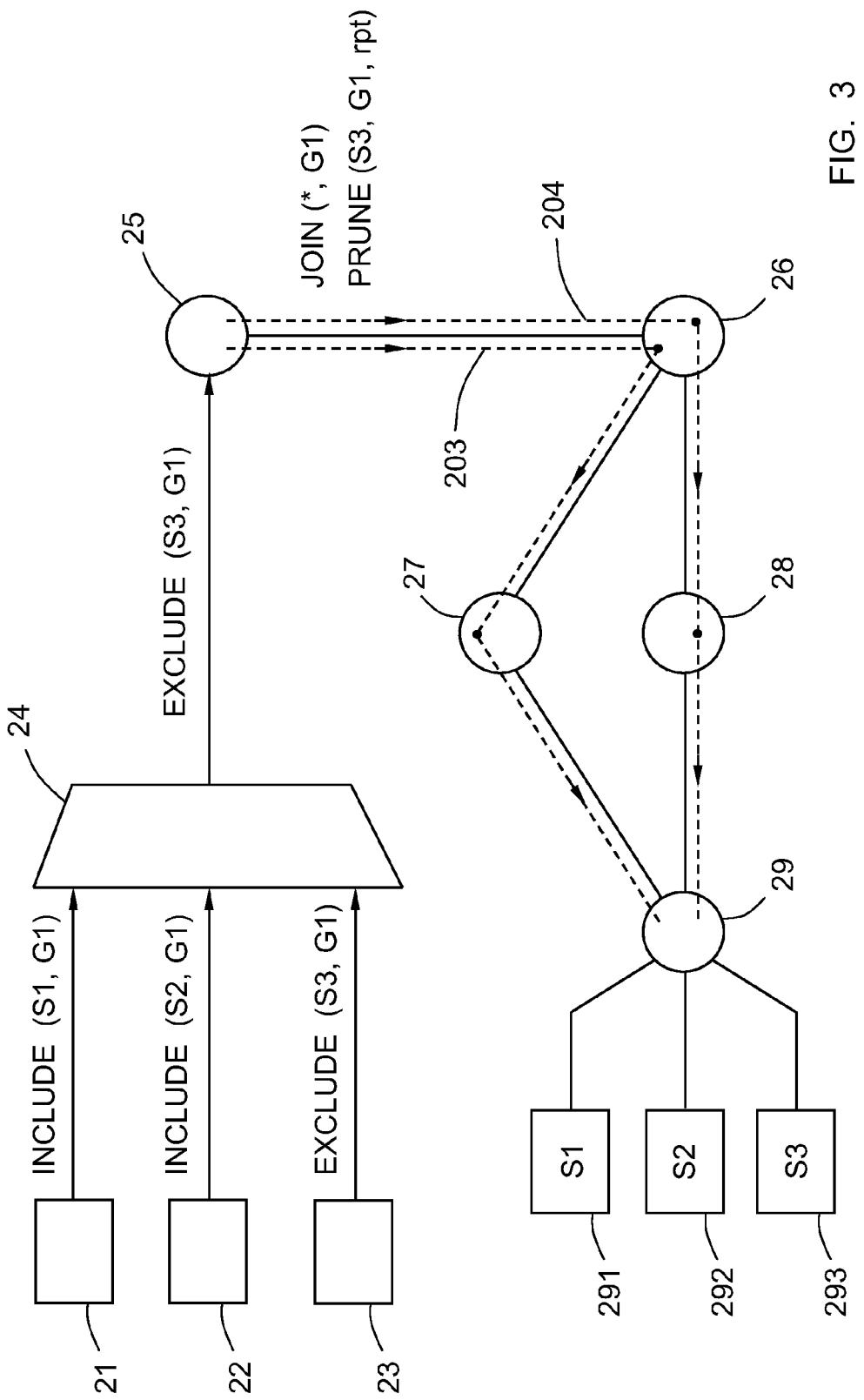
FIGS. 3 and 4 show two specific situations in the system of FIG. 2, according to the prior state of the art.

FIG. 3 illustrates a first situation in the system of FIG. 2 when the IGMPv3 protocol according to the prior state of the art is applied. Hosts 21, 22, 23 send to DSLAM 24 traffic requests with the following messages, respectively: INCLUDE(S1, G1), INCLUDE(S2, G1) and EXCLUDE(S3, G1). DSLAM 24 acts as an IGMP proxy and applies the rules of combining IGMP messages which were explained above, whereby sending to router 25 a single request with an EXCLUDE(S3, G1) message. Router 25 translates this request into two PIM-SM messages which it sends to the next router 26: a JOIN (*, G1) message to receive all the traffic from group G1 and a PRUNE (S3, G1, rpt) message for not receiving the traffic from group G1 coming from source S3. When the router 26 receives these messages, it updates its state records and transmits the messages to RP router 27, which in turn updates its state records and transmits the same messages to router 29, which also updates its state records. Since the router 29 is in direct communication with data sources S1, S2 and S3, multicast traffic is transmitted from router 29 to router 25 following the same way 203 the PIM-SM messages have followed but in the opposite direction.

Figure 4:
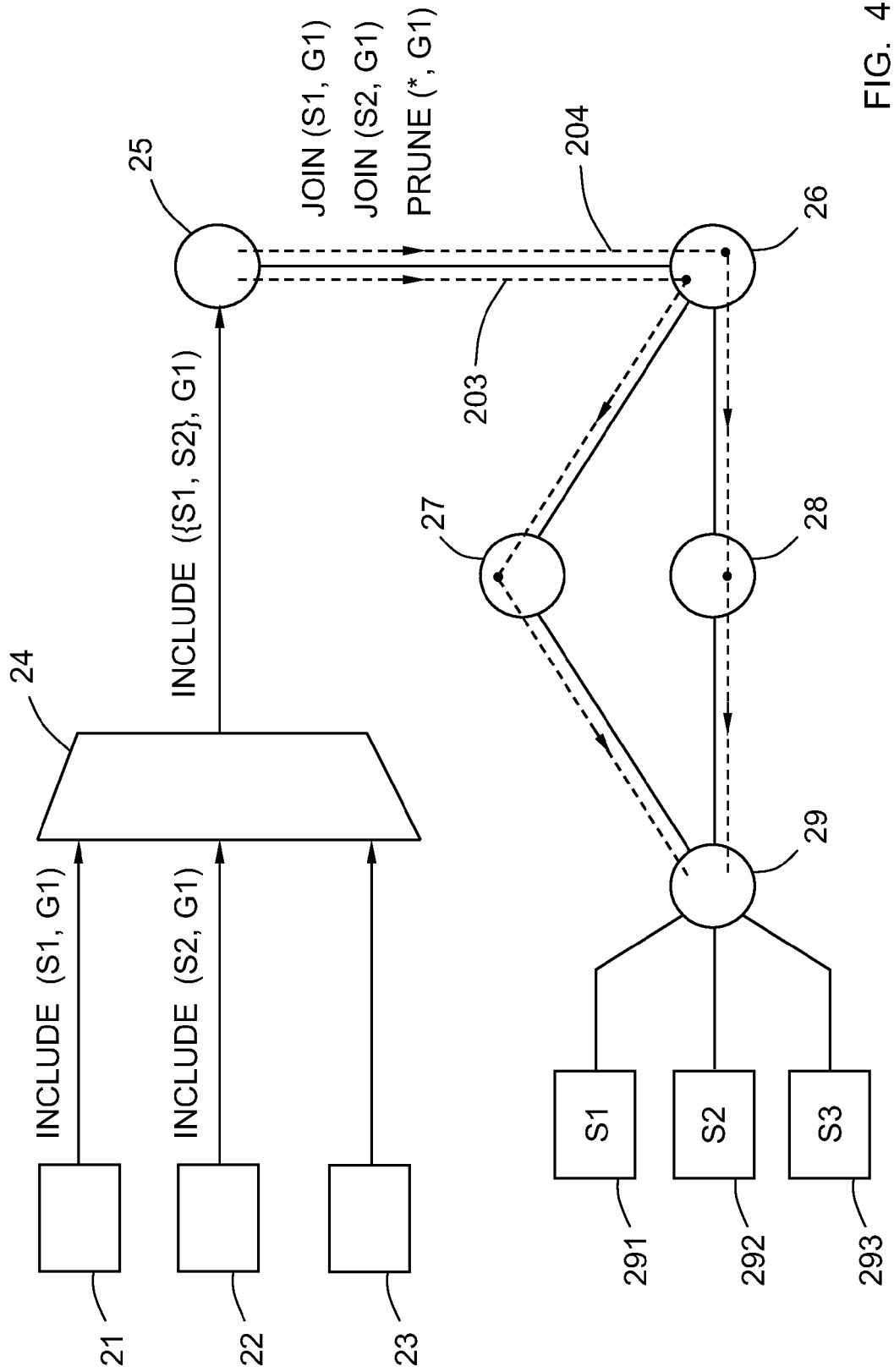

FIG. 4 illustrates a second situation which takes place after the first situation of FIG. 3. Host 23 stops sending the EXCLUDE(S3, G1) message, whereas hosts 21 and 22 continue to send the same INCLUDE(S1, G1) and INCLUDE (S2, G1) messages. DSLAM 24, acting as an IGMP proxy and applying the rules of combining IGMP messages which were explained above, sends to the router 25 a single request with an INCLUDE({S1, S2}, G1) message. Router 25 translates this request into three PIM-SM messages which it sends to the next router 26: two JOIN(S1, G1) and JOIN(S2,G1) messages to receive the traffic from channels (S1, G1) and (S2, G1) and a PRUNE(*, G1) message to stop receiving all the traffic from group G1. These PIM-SM messages are transmitted from router to router until router 29. As in the previous case, each router updates its corresponding state records when it receives PIM-SM messages. When router 29 has received the three messages, its state records have been updated: the state records associated to the JOIN(S1, G1) and JOIN(S2, G1) messages are in JOIN state, indicating that it must transmit the traffic from channels (S1, G1) and (S2, G1), and the state record associated to the PRUNE(*, G1) message is in PRUNE state, indicating that it must not transmit all the traffic from group G1. Router 29 therefore correctly transmits the multicast traffic that router 25 had requested. The same occurs in the intermediate routers. The PRUNE(*, G1) message must pass through RP router 27, and therefore follows path 203, whereas JOIN(SL, G1) and JOIN(S2, G1) messages can follow direct path 204 without passing through RP router 27, since they know source addresses S1 and S2.

In a system formed by routers using improved IGMP and PIM-SM protocols, or the like, it is possible for the PRUNE (*, G1) message to reach the router 29 before the JOIN(S1, G1) and JOIN(S2, G1) messages. If this occurs, until the JOIN messages arrive, router 29 will cut off traffic transmission (*, G1) of the entire multicast group G1 and will therefore also stop transmitting channels (S1, G1) and (S2, G1), whereby an unwanted interruption of traffic from these channels will have occurred.

This problem was concealed by the delay system in the two IGMP and PIM-SM protocols of the prior state of the art which delay the propagation of PRUNE messages. Since in addition to the delay of the IGMP protocol each PIM-SM router delays the transmission of a PRUNE message for 3 seconds, the PRUNE messages never arrived before the JOIN messages. However, if the intention is to eliminate these complicated delay systems in the IGMP and PIM-SM protocols, this new problem occurs.

The embodiment of the invention described below implements a modification of the IGMP protocol which allows a router or an IGMP proxy to not be obliged to combine traffic requests it receives referring to a single multicast group in a single INCLUDE type or EXCLUDE type IGMP message, as is currently required in the IGMPv3 protocol, but rather it can combine them in an INCLUDE type message and in an EXCLUDE type message and send both messages. As is shown in the following example, this particular operation of the routers and IGMP proxies eliminates the technical problem of the unwanted interruption of multicast traffic.

Figure 5:
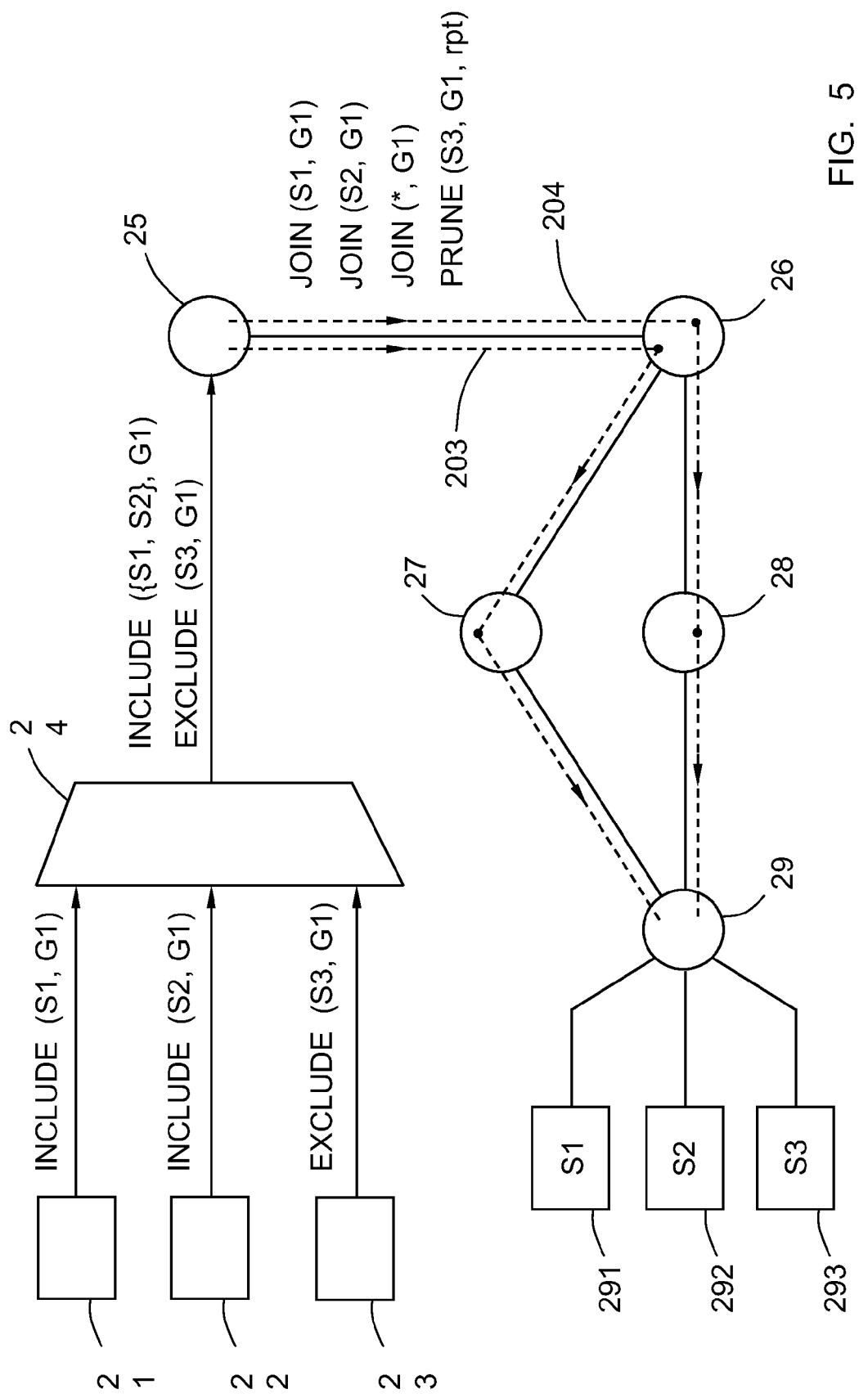
FIG. 5 shows a specific analogue situation compared to FIG. 3, but according to an advantageous execution of the present invention.

FIG. 5 shows the same situation as in FIG. 3, but in this case applying the improved IGMP protocol according to the present embodiment of the invention. DSLAM 24 receives the INCLUDE(S1, G1), INCLUDE(S2, G1) and EXCLUDE (S3, G1) messages and, instead of assembling them in a single EXCLUDE (S3, G1) message as required in the IGMPv3 protocol, it assembles them into an IGMP INCLUDE({S1, S2}, G1) message and an IGMP EXCLUDE(S3, G1) message. Router 25 receives these two INCLUDE({S1, S2}, G1) and EXCLUDE(S3, G1) messages, separately stores the information of the INCLUDE and EXCLUDE sources of group G1 and sends JOIN(S1, G1) and JOIN(S2, G1) messages and two JOIN(*,G1) and PRUNE(S3, G1, rpt) messages. The difference with regard to the situation of FIG. 3 is that now router 25 is separately storing and managing IGMP requests with INCLUDE filter-mode and IGMP requests with EXCLUDE filter-mode, and sending the corresponding PIM-SM messages separately for each type of filter-mode.

When host 23 stops sending the EXCLUDE(S3, G1) message DSLAM 24 stops sending the EXCLUDE(S3, G1) message towards router 25 and only sends the INCLUDE({S1, S2}, G1) message. Router 25 will transmit the PRUNE(*,G1) message but the difference is that now router 29 can cut off traffic (*, G1) immediately after receiving the PRUNE(*, G1) message since traffic from multicast channels (S1,G1) and (S2,G1) continues to flow thanks to the PIM-SM JOIN(S1, G1) and JOIN(S2,G1) messages which have reached router 29 separately from the JOIN(*,G1) message.

For IGMP routers and IGMP proxies to be able to function in this manner, i.e. separately assembling the INCLUDE messages and the EXCLUDE messages and sending independent PIM-SM messages for each multicast group and filter-mode of the IGMP protocol, additional modifications to the IGMP protocol besides those explained in the first embodiment have been developed.

A modified IGMP protocol according to the invention differs from the previously explained protocol in that, in addition to performing an individual follow-up on the sources that each host of origin sending each message requests, the network interfaces can operate in dual mode: they can separately store and transmit the information of the sources contained in the IGMP INCLUDE type messages and the information of the sources contained in the IGMP EXCLUDE type messages.

To that end, the modified IGMP protocol saves two records: one for the EXCLUDE filter-mode and another one for the INCLUDE filter-mode for each network interface and multicast group. Therefore, an IGMP proxy or router using the modified IGMP protocol can save, for each network interface and multicast group, two separate records:

INCLUDE Record: (interface, multicast-address, hostID, group-timer, filter-mode
=INCLUDE, {(source-address, source-timer)})
EXCLUDE Record: (interface, multicast-address, hostID, group-timer, filter-mode=EXCLUDE, {(source-address, source-timer)})
wherein
interface indicates the network interface of the router through which the IGMP router has received the IGMP message;
multicast-address is the multicast group;
hostID is an identifier of the host that has sent the IGMP message.
{(source-address, source-timer)} is a list of elements (source-address, source-timer), where source-address is the source IP address and where source-timer is a timer associated with the source;
filter-mode can be INCLUDE or EXCLUDE and has the same operation as that described in RFC 3376: to indicate if the sources of the source list and timers are INCLUDE sources or EXCLUDE sources.

When the improved IGMP router or proxy has to decide if it must transmit a specific channel through a specific network interface, the algorithm of the router or proxy takes into account the different state records of the host referring to the multicast group and the network interface, but with the different that now the hosts can have two state records with different INCLUDE and EXCLUDE filter-mode for a single multicast group. The algorithm applies the following rules:

For a specific network interface, a specific multicast group G, and a specific INCLUDE source S, as long as there is a state record of a host referring to the network interface and the multicast group G the filter-mode of which is INCLUDE and the source-timer of which associated with the INCLUDE source S is greater than zero, the improved IGMP router will transmit through the network interface the multicast traffic of channel (S,G).

Furthermore, if for the network interface and multicast group G there are state records the filter-mode of which is EXCLUDE, the improved IGMP router will further transmit through the network interface the multicast traffic from all the sources except those of the set resulting from the intersection of all the Exclude Lists of the state records with EXCLUDE filter-mode for the network interface and multicast group G.

Table 4 (at the end of this document) shows the operation of an improved router applying the IGMP protocol modified according to the invention. In its initial state, the router has, for a specific network interface, a specific multicast group G and a specific host two state records for the multicast group G because it has INCLUDE sources as well as EXCLUDE sources.

As in Table 3, Table 4 relates to a specific network interface of the router, a specific multicast group and a specific host sending IGMP messages.

As can be seen in Table 4, the use of two separate records for storing the INCLUDE and EXCLUDE sources together with the individual follow-up of the traffic requests of each host allows eliminating the Requested-List which is no longer necessary. The EXCLUDE(Y) lists represent the Exclude List, and the EXCLUDE sources no longer need timers, simplifying their operation.

The Group-Timer or GT continues to be used to eliminate the EXCLUDE record when the timer reaches zero.

It can also be seen in Table 4 that four new IGMP messages have been defined. The first two ALLOWIN (B) and BLOCKIN (B) modify the sources of the INCLUDE record and the last two ALLOWEX (B) and BLOCKEX (B) modify the sources of the EXCLUDE record.

In the same manner, the IS_IN(B) message only affects the INCLUDE record and the IS_EX(B) message only affects the EXCLUDE record. This separation of messages affecting the INCLUDE and EXCLUDE records provides enormous simplicity. When comparing Table 4 with Table 1, it is obvious that Table 4 is much simpler than Table 1. In addition to having simplified the management of timers and having eliminated the sending of Group-And-Source-Specific Query messages, it has been achieved that the IGMP router only has to manage the six cases corresponding to the six rows of Table 4, instead of the twelve cases appearing in Table 1. The comparison between Tables 1 and 4 shows that the improved IGMP protocol considerably aids in implementing and programming the algorithms in the routers, as well as solving the aforementioned inefficiency problems.

In the example of FIG. 5, DSLAM 24 has applied these rules for assembling the INCLUDE(S1, G1), INCLUDE(S2, G1) and EXCLUDE(S3, G1) messages in an IGMP INCLUDE({S1, S2}, G1) message and another IGMP EXCLUDE(S3, G1) message.

For communications between a host and an IGMP router, a modified IGMP protocol in one embodiment of the present invention uses the same messages as the IGMPv3 protocol, which are described in section 4 of RFC 3376. One difference is in the internal format of the data blocks referred to as Group Record which are contained in each Membership Report message: in this embodiment of a modified IGMP protocol, when there are INCLUDE sources and also EXCLUDE sources for the same multicast group, two Group Records are included in the Membership Report message: one for INCLUDE sources and another one for EXCLUDE sources.

In all of the examples of execution explained the IGMP protocol has been used, corresponding to protocol Internet Protocol Version 4 (IPv4). The same examples of execution can be applied to the MLD protocol that uses the Internet Protocol Version 6 (IPv6) protocol, which are not explained because they are easy to understand by one skilled in the art from the examples already explained, based on the IGMP. Moreover, it is important to understand that the spirit and scope of the present invention is not limited to only improvements in the IGMP and MLD protocols but may be applied to newly developed protocols and equipment that are configured to be compatible with the teachings of the present invention. Therefore, as previously noted, although certain specific terminology and examples have been used to describe the various embodiments with respect to the IGMP, MLD and PIM protocols, the description and appended claims (unless otherwise indicated) are not so limited.

4. Third Embodiments of the Present Invention

Alternative embodiments of the invention may be used to simplify the operation of a router which tracks the multicast traffic requested by each host. This simplification involves eliminating the "requested list", this way all of the timers of the sources that have a filter mode EXCLUDE have a zero value, which also does not make it necessary to store the value of these timers which always have a zero value.

Table 3, which explains the operation of an improved router previously disclosed, shows that the "requested list", meaning the group of sources from the EXCLUDE record that have a timer associated with a higher value than zero, is an empty group in status 2 of lines 2, 4, 7 and 11. Again, Table 3 refers to a specific network interface of a router for a specific multicast group and a specific host that sends messages requesting multicast traffic.

Also, remember that the "requested list" is shown by the left part of the group of sources, EXCLUDE:
    EXCLUDE (X, Y)=EXCLUDE ({Requested list}, {Exclude list})

These empty groups are shown with the symbol "{ }" in column "STATUS 2" of lines 2, 4, 7 and 11 of Table 3 reproduced below:

| STATUS 1 | MESSAGE | STATUS 2 | ACTIONS |
|---|---|---|---|
| 2. INCLUDE (A) | IS_EX (B) | EXCLUDE ({ }, B) | T(B) = 0<br>DEL (A − B)<br>GT = GMI |
| 4. INCLUDE (X, Y) | IS_EX (B) | EXCLUDE ({ }, A) | T(A) = 0<br>OF (X + Y) − A<br>GT = GMI |
| 7. INCLUDE (A) | TO_EX (B) | EXCLUDE ({ }, B) | T(B) = 0<br>OF (A − B)<br>GT = GMI |
| 11. EXCLUDE (X, Y) | TO_EX (A) | EXCLUDE ({ }, A) | T(A) = 0<br>OF (X + Y) − A<br>GT = GMI |

However, in Table 3 we can see that there are two cases, lines 9 and 10 in which, in STATUS 2, the router does not have an empty requested list:

| STATUS 1 | MESSAGE | STATUS 2 | ACTIONS |
|---|---|---|---|
| 9. EXCLUDE (X, Y) | ALLOW (A) | EXCLUDE (X + A, Y − A) | T(A) = GMI |
| 10. EXCLUDE (X, Y) | BLOCK (A) | EXCLUDE (X − A, Y + A) | T(A) = 0 |

In line 9, the "requested list" has the (X+A) value and line 10 has the (X−A) value.

However, the reason for which in lines 9 and 10 the requested list does not have an empty group is because STATUS1 of both line 9 and 10 has an initial EXCLUDE (X,Y) status that assumes that the requested list has an initial group of X sources which is not an empty group.

However, in order for the router to create a status record with filter mode EXCLUDE it is first necessary that the router receives one of the two IS_EX or TO_EX messages, the operation of which is indicated in lines 2, 4, 7 and 11 above. As explained, in all four cases, the requested list of STATUS 2 is an empty group. Therefore, the assumption that in lines 9 and 10 of Table 3 STATUS1 of the router can have a requested list not empty comes from Table 1 of the prior state of the art. The sources of the requested list in the first embodiment of the invention in the initial status of lines 9 and 10 always have an empty requested list because this EXCLUDE record was created with one of the four processes presented by lines 2, 4, 7, 11 of Table 3. We can therefore show lines 9 and 10 of Table 3 as follows:

| STATUS 1 | MESSAGE | STATUS 2 | ACTIONS |
|---|---|---|---|
| 9. EXCLUDE {{ }, Y) | ALLOW (A) | EXCLUDE (A, Y − A) | T(A) = GMI |
| 10. EXCLUDE ({ }, Y) | BLOCK (A) | EXCLUDE ({ }, Y + A) | T(A) = 0 |

Table 5, at the end of the text, describes an operation of an improved version of an IGMP or like router in which the requested list no longer exists and all sources of the EXCLUDE record are sources of the exclude list which has a timer associated to every source that has a value of zero. When the Group Timer reaches zero it deletes the record with filter mode EXCLUDE.

5. Fourth Embodiments of the Present Invention

In the discussion that follows, alternative embodiments of the present invention are disclosed that involve individual tracking of the multicast traffic requests of each host while deleting the timers associated with all of the data sources, both sources with filter mode INCLUDE and sources with filter mode EXCLUDE.

In an embodiment that implements the operation of Table 4, the requested list is also deleted, although the INCLUDE and EXCLUDE sources are not stored separately.

Routers that use the protocol IGMPv3 use variables named "timers" to track from the moment in which each router receives the multicast traffic requests from each host from a specific multicast group and a specific network interface of the router and to be able to decide how to manage traffic requests that include different sources from the same multicast group. Table 1 summarises the operation of protocol IGMPv3, which is similar to protocol MLD, and it shows the operation of the timers.

The GMI parameter used in Table 1 as an initial value of the timers is a parameter called "Group Membership Interval" that uses a default value of 260 seconds.

Below is a detailed explanation of the operation of this GMI parameter and how its value is calculated. The GMI value is calculated using three other parameters, also mentioned in section 8 of RFC 3376, using the following formula:

$$GMI=[(\text{Robustness Variable})\times(\text{Query Interval})]+(\text{Query Response Interval})$$

The default values of these three parameters in the IGMPv3 protocol are:
Robustness Variable=2
Query Interval=125 seconds
Query Response Interval=10 seconds
This way, the default value of the GMI parameter is $$GMI=(2\times125)+10=250+10=260 \text{ seconds}$$

Below is an explanation of these three parameters that establish the GMI value.

The Robustness Variable parameter allows the adjustment of the GMI value according to the expected number of lost IP packages. This parameter uses the value 2 as default and it is sent from the router to the hosts with the QRV field of the "Query" messages that the router sends to the hosts to ask them for the multicast traffic they wish to receive. QRV is an abbreviation of "Queries Robustness Variable". Its use in Queries is explained in section 4.1.6 of RFC 3376.

In the hosts, the Robustness Variable value received through the QRV parameter indicates the number of times that a host must re-transmit messages to the router when there is a change in the multicast traffic that this host wants to receive.

The "Query Interval" parameter is the time interval that passes between two "General Query" messages sent through the router to the hosts. By default, it takes the value of 125 seconds. A General Query is a message sent from the router to the hosts so that all of the hosts respond with messages that detail the multicast traffic that each host wants to receive. This way, the IGMPv3 routers update all of the traffic information that the hosts want to receive every 125 seconds by default.

The "Query Response Interval" parameter indicates the maximum time that the hosts have to respond to a query from the IGMPv3 router. By default, it takes the 10 second value and it is transmitted to the hosts in the parameter called "Max Resp Code" from the queries, as explained in section 4.1.1 of RFC 3376.

When a host receives a query, the host does not respond immediately to the router, but it delays its response message during a random calculated time between 0 seconds and the "Query Response Interval", for example 10 seconds. This way, if there are thousands of hosts connected to one router, the router does not receive thousands responses at the same time; rather, it receives the responses from the thousands of hosts in a 10-second time interval and this way the router has more time to process the responses.

In Table 1 the GMI value is used as a starting value in the timers in all of the cases in which the router receives a multicast traffic request that includes or may include a new multicast data source.

This happens in all cases shown in Table 1 except in cases 6 and 10 that correspond to the BLOCK (B) and BLOCK (A) messages, respectively, and that notify the router to stop transmitting multicast traffic from sources B and A respectively from a specific multicast group.

In other cases in Table 1 the GMI parameter is used as a starting value for the timers for the new data sources from which the hosts want to receive multicast traffic from a specific multicast group.

Table 6 explains the operation of an improved router in accordance with one embodiment of the present invention. In the implementation and examples of Table 6 there are no timers associated to sources since the router does not need to associate a timer to each of the data sources and it also no longer needs the requested list.

The entries in Table 6 explain the operation of a router when it receives messages through a specific interface and from a specific host related to a specific multicast group.

As shown in Table 6, the deletion of the timers associated with the sources simplifies the processes that the router needs to make since it does not need to dedicate storage and processing resources to the timers. An improved router that operates in accordance with the principles and processes of Table 6 does not need timers or the requested list, for two reasons: The first reason is that the router no longer needs to combine messages from different hosts since for each multicast traffic router network interface, each host and each multicast group, separate records are stored. Each message sent by the hosts to the router indicates the multicast traffic that this host wants to receive and there is no need to mix the traffic requested by different hosts into one memory record, which is one of the functions for which timers and the requested list are used in protocol IGMPv3. The second reason is that the same formula that is used to calculate the GMI parameter ensures that the router will receive the multicast traffic information again wanted by each host before the timers that initialise with the GMI value reach zero since the GMI parameter will always be greater than or equal to the Query Interval parameter.

Again, the GMI value in IGMPv3 is calculated as follows:

$$GMI=[(\text{Robustness Variable})\times(\text{Query Interval})]+(\text{Query Response Interval})$$

The default values of these three parameters were:
Robustness variable=2
Query Interval=125 seconds
Query Response Interval=10 seconds This way, the default value of the GMI parameter is $GMI=(2\times125)+10=250+10=260$ seconds Where Query Interval is the time that passes between two General Query messages sent by the router to the hosts and according to the above mentioned formula, the GMI cannot be less than the Query Interval value.

In the most critical case, assigning a value of 1 to the Robustness Variable parameter and a value of zero to the Query Response Interval, the GMI value would be the same as the Query Interval value but never less. However, it is enough to maintain the default value of 10 seconds in the Query Response Interval parameter so that GMI is greater than the Query Interval. For example, using the default values, there is no need to assign a 260-second timer to a multicast data source when the information of the sources is updated completely every 125 seconds, unless they lose the IP packages that carry this information. It is impossible for this timer to reach zero, with the initial value of 260 seconds, before the router receives the information from the host again at 125 seconds where the host notifies the router whether to receive the multicast traffic from each source or not. The timer is unnecessary when the IP packages are not lost. Therefore, if the traffic sources from each multicast group requested by each host are stored, it is no longer necessary to assign timers to multicast data sources and this helps to greatly simplify the process since the router only needs to store the data sources that are requested from each host.

As shown in Table 6 if the filter mode of the record is INCLUDE, the router transmits the traffic from the INCLUDE sources for the record. If the filter mode is EXCLUDE, the router transmits the traffic from all of the sources, except those from the EXCLUDE list. If the router has different records associated to different hosts referring to a same router network interface and a same multicast group, the router transmits through that network interface the multicast traffic that comes from all of the sources of the records with filter mode INCLUDE. If there are records referring to this multicast group and network interface with filter mode EXCLUDE, then the router also transmits all of the traffic for this multicast group that comes from all of the sources, except those sources from the group formed by the intersection of source lists of these records with filter mode EXCLUDE.

For accounting or control purposes, for example to invoice a user for internet television services that uses multicast technology, it is possible to store information in the router memory from the initial moment in which the user begins to receive a specific multicast channel (S, G) and the moment in which this user stops receiving this multicast channel. However, this accounting or controlling method does not depend on a timer that is related to the algorithms used by the router to decide whether to transmit a specific multicast traffic or not through a specific network interface.

The operation of the router may be further simplified as shown in Table 7. Table 7 shows how making an individual tracking of the multicast traffic requested by each host and deleting the timers and the requested list simplifies the operation of the router since in lines 1, 2, 7 and 8 of Table 7 the router doesn't need to take into account which is STATUS1 to establish STATUS 2. When a host sends an IS_IN, IS_EX, TO_IN or TO_EX message, the router establishes which is STATUS 2 from the router record for that host, despite the initial status of that record.

In alternative embodiments, an improved router or proxy is provided that operates according to a combination of one or more processes of Tables 6 and 7, a subset of the processes of Table 6 or Table 7, or according to one or more combination of subsets of Table 6 and/or Table 7.

In some instances an IGMP message or IGMP like message sent from a host to the IGMP router or IGMP like router may get lost which could result in the router to continue transmitting the multicast traffic to a host indefinitely in the operation described in Tables 6 and 7. For example, if one host sends a message INCLUDE (A) from a specific multicast group to the router, the router will transmit the traffic of source A to the host. Later, if the host wants to stop receiving multicast traffic from the source A, it sends a message IS_IN({ }) with an empty set of sources, the router receives this message and stops transmitting traffic from the source A. However, if that second IS_IN({ }) IGMP message gets lost, there is a risk that the router continues forwarding traffic from source A indefinitely to the host which had requested it because in this implementation no timers are associated to each multicast source. To solve this problem, an improved router of the present invention may use, for example, the algorithm illustrated in the flow chart of FIG. 12, or a version thereof.

Figure 12:
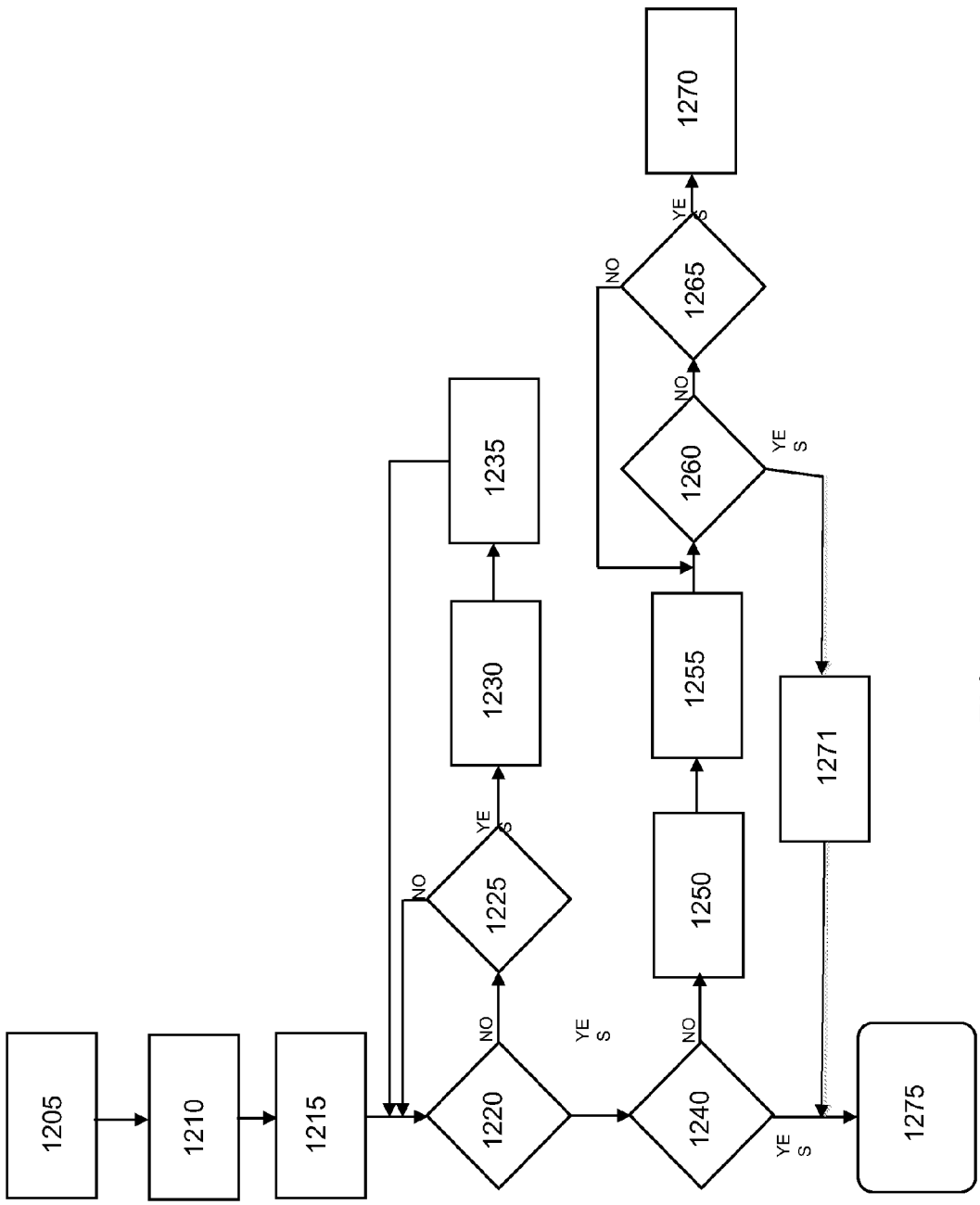
FIG. 12 is a flowchart of a method for querying hosts in one implementation of the present invention.

With reference to FIG. 12, in 1205 the router prepares or accesses a list of all the hosts that are receiving multicast traffic from the router. In 1210 the router sends a "General Query" type message, or the like, to all hosts or just those receiving multicast traffic from the router, prompting the hosts to respond with an IS_IN(B) or IS_EX(B) IGMP type message, as explained in Tables 6 and 7, to tell the router which multicast traffic the hosts want to receive. To send a query to all of the hosts, the query may be sent to the multicast address 224.0.0.1 called "All Systems Multicast Address" in IGMPv3. The router may send a general query type message to the hosts at given time intervals. In IGMPv3 this time interval is known by the parameter "Query Interval" and has a default value of 125 seconds which means the router sends a message to all the hosts through the multicast address 224.0.0.1 called "All Systems Multicast Address" every 125 seconds. It is important to note that a time value other than 125 seconds may be used and that the IGMPv3 type messages and parameters used in the example of FIG. 12 are only one way of implementing an algorithm that solves the aforementioned problem of a message from a host being lost. In 1215 the router starts a timer that establishes the amount of time the router will wait for responses from the hosts. As explained before, in IGMPv3 when the hosts receive a General Query message, each host waits a random time between 0 seconds and usually 10 seconds (the time specified in the Query Response Interval parameter of the query) before sending a response message to the router. In 1220 the router waits until the timer expires (e.g., 10 seconds). In 1225 the router determines if one or more of the hosts have responded with an IS_IN(B) or IS_EX(B) message type. Upon receiving one or more response messages from one or more hosts, the router in 1230 processes the response messages received from the responding hosts by reading data which identifies the hosts. Then in 1235 the router updates the corresponding host records according to one of the processes of Table 6 and/or Table 7.

As explained before, the router may identify the host, for example, by means of the source IP address of the IP packet that carries the IGMP message, using the source MAC address of the data frame that carries the IP packet that carries the IGMP message or by using any other data that identifies the host.

When the timer of step 1220 expires, the router goes to step 1240 where it determines if all the hosts in the list that were receiving multicast traffic from the router have responded to the general query. If all the hosts in the list have responded, the process ends in 1275.

If one or more hosts receiving multicast traffic have not sent a message in response to the first general query, the router in 1250 starts another timer and in 1255 the router sends a second general query message or host specific messages to only the hosts that have not responded to the first general query. To send a second general query only to some hosts, the router can send the messages in IP packets that have the destination IP address of the non-responding host. Another possibility is to send the general query using as destination IP address in the packets that carry the general queries the multicast addresses of multicast traffic that the router is sending and for which the routers hasn't received a response message.

In 1260 the router waits for response messages from the hosts until the timer expires. The amount of time the router waits for a response from the host may be equal to the first time interval (e.g., 10 seconds), less than the first time interval, or greater than the first time interval. In 1265 each time the router receives a response message from a host, it determines in 1270 the identity data of the host sending the response message and updates the corresponding host record according to one of the processes of Table 6 and/or Table 7. When the timer of 1260 expires, the router goes to 1271 where it deletes the records of the hosts that hasn't sent a IGMP message and then the process ends in 1275 and the router terminates the transmission of multicast traffic to the non-responding hosts.

In alternative embodiments, one or more additional query trees (e.g., 1240-1270) may be implemented to further elicit response messages from non-responding hosts before terminating the process in 1275. In such implementations, the time interval between the queries may remain the same or be incrementally decreased or increased after each query. Incrementally decreasing the time interval between subsequent queries can provide efficiency by terminating the transmission at an earlier point in time, whereas increasing the time interval may give a non-responding host sufficient time to respond in the event that there is a bandwidth or other problem associated with the non-responding host's network.

In one implementation of the process of FIG. 12, or alternatives thereof, instead of using a list of hosts that are receiving multicast traffic from the router, the router may use a field in the host record to add information that designates whether a host has responded to a router query. For example, each host could have a field named "updated" and in step 1205 all these fields are changed to the value "0" and in steps 1235 or 1270 the value of the "updated" field is changed to, for example, the value "1" when the host records are updated. In this way the router knows which hosts have responded to the queries and which have not.

Algorithms and methods other than that illustrated and described in conjunction with FIG. 12 may also be used to solve the problem of a lost message sent from a host. For example, in the embodiment of FIG. 12 and in the preceding description Query Interval and Query Response Interval time values have been described and used. It is appreciated that the present invention is in no way limited to these values. Other values consistent with the successful operation of an improved router that operates in accordance with the principles and processes of Table 6 and/or Table 7, or according to one or a combination of one or more of the various processes of Table 6 and/or Table 7, may also be used.

Figure 6:
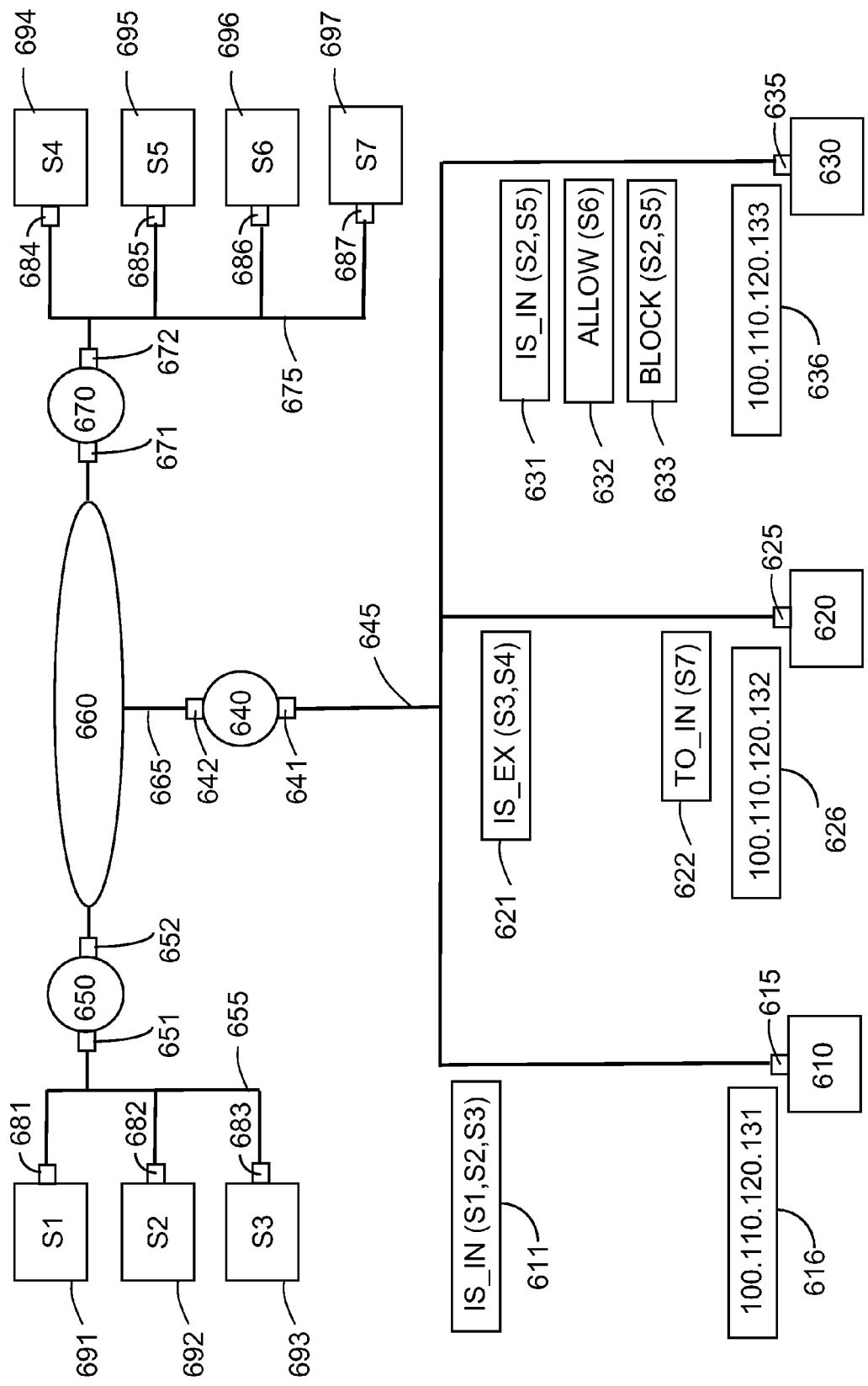
FIG. 6 shows a basic example of a multicast system in a data network, which illustrates the problem solved by various implementations of the present invention.

By way of example, and with reference to FIG. 6, a router that receives messages from three different hosts is explained. In the example of FIG. 6, three hosts 610, 620 and 630 are connected by a data network 645 to the network interface 641 of a router 640. The hosts request traffic from a specific multicast group, which we will call G, to a router 640 through a series of messages 611, 621, 631, 632, 633 and 622 that may use the same or similar formats as messages from protocol IGMPv3. Each of the three hosts 610, 620 and 630 has a network interface 615, 625 and 635 respectively, connected to the data network 645. The IP addresses of these network interfaces of the three hosts are shown in FIG. 6 through elements 616, 626 and 636, respectively. Router 640 has another network interface 642 connected through network 665 to a data network 660 that can contain many routers, like the Internet network for example.

FIG. 6 also shows seven multicast traffic emitting sources that use the same multicast group address G mentioned above. Data sources are represented with elements 691, 692, 693, 694, 695, 696 and 697 although, for more clarification on the following explanations, FIG. 6 also refers to these data sources with labels S1, S2, S3, S4, S5, S6 and S7, respectively. Sources S1, S2 and S3 all have a network interface 681, 682 and 683, respectively, connected to the data network 655. The router 650 has the first network interface 651 also connected to this data network 655 and the second network interface 652 connected to the data network 660. Sources S4, S5, S6 and S7 all have a network interface 684, 685, 686 and 687 respectively, connected to the data network 675. Router 670 has the first network interface 672 also connected to this data network 675 and the second network interface 671 connected to data network 660. There can also be other multicast data sources connected to network 660 that transmit multicast traffic using the same multicast group G as the S1 to S7 sources in the figure.

Using the different messages that are sent by hosts 610, 620 and 630 to router 640, the hosts request multicast traffic from router 640, which they transmit in multicast group G.

Router 640 can request multicast traffic from routers 650 and 670 from the different sources that transmit multicast traffic in group G using different multicast routing protocols between routers, such as, for example protocols PIM-SM or PIM-DM.

Table 8 indicates the order in which different messages from the hosts may reach network interface 641 of router 640, the host that sends each message, the type of message and the element of FIG. 6 that the message represents.

By example, messages have been shown in FIG. 6 using elements 611, 621, 631, 632, 633 and 622 so that the order in which messages are transmitted is shown in the figure in its vertical position: first message 611, then message 621, etc.

To see the difference in a router's operation pursuant to an embodiment of the present invention according to Tables 6 or 7 and the IGMPv3 router from the prior state of the art used in Table 1, below is an explanation of both cases, starting with an explanation of the present invention.

Table 9 illustrates an operation of router 640 from FIG. 6 which operates according to Tables 6 or 7. The operation is as follows: router 640 stores for each router interface, each multicast group and each host a separate record and does this without using source timers, requested lists or a Group Timer. Therefore, when router 640 receives the first message IS_IN (S1, S2, S3) from host 610 through its network interface 641, the router creates a status record that stores an identification of that host 610, like its IP address 100.110.120.131 and containing an INCLUDE filter mode and the list of sources {S1, S2, S3}. For example, the status record may contain the following information:

100.110.120.131, INCLUDE, {S1, S2, S3}

Router 640 begins to transmit the multicast traffic from group G through its network interface 641 from sources S1, S2 and S3, meaning multicast channels (S1,G), (S2,G) and (S3,G).

When router 640 receives the second message IS_EX (S3, S4) coming from host 620, it creates a status record that identifies host 620, with its IP address for example, with an EXCLUDE filter mode and the list of sources {S3, S4}. For example, the record may contain the following information:

100.110.120.132, EXCLUDE, {S3, S4}

Router 640 now has two status records for the same multicast group G. The first record with INCLUDE filter mode associated with host 610 and a second record with EXCLUDE filter mode associated with host 620.

100.110.120.131, INCLUDE, {S1, S2, S3}
100.110.120.132, EXCLUDE, {S3, S4}

Through its network interface 641, the router transmits the multicast traffic from group G that comes from all of the sources included in the INCLUDE records {S1, S2, S3} as well as the multicast traffic from group G that comes from all of the sources, except those from the group formed by the intersection of the exclude lists. In this case there is only one exclude list and the intersection group is the exclude list itself {S3, S4}; therefore, the router transmits sources S1, S2 S3 and all other sources except for source S4, which means that the router transmits the traffic of sources S1, S2, S3, S5, S6 and S7 and all other possible sources that are connected to the network 660 and transmit multicast traffic in group G, except source S4.

When router 640 receives the message IS_IN (S2, S5) from host 630 through its network interface 641, the router creates a status record that stores an identification of that host 630, like its IP address 100.110.120.133 for example, that also has an INCLUDE filter mode and the list of sources {S2, S5}. For example, the status record may contain the following information:

100.110.120.133, INCLUDE, {S2, S5}.

This way the router has three status records, one associated with each host:

100.110.120.131, INCLUDE, {S1, S2, S3}
100.110.120.132, EXCLUDE, {S3, S4}
100.110.120.133, INCLUDE, {S2, S5}.

As the router receives the following messages of Table 8, the router only modifies the status record that corresponds to each host that sends a message to it and then establishes the traffic that has to transmit the network interface 641 taking into account the different status records of the different hosts.

That way, when the router receives the fourth message ALLOW (S6) from host 630 with IP address 100.110.120.133 it simply modifies the third record:

100.110.120.131, INCLUDE, {S1, S2, S3}
100.110.120.132, EXCLUDE, {S3, S4}
100.110.120.133, INCLUDE, {S2, S5, S6}.

When the router receives the fifth message BLOCK (S2, S5) from host 630 it modifies the third record again:

100.110.120.131, INCLUDE, {S1, S2, S3}
100.110.120.132, EXCLUDE, {S3, S4}
100.110.120.133, INCLUDE, {S6}.

And when the router receives the sixth message TO_IN (S7) from host 620 that has the IP address 100.110.120.132, it modifies the second record:

100.110.120.131, INCLUDE, {S1.S2, S3}
100.110.120.132, INCLUDE, {S7}
100.110.120.133, INCLUDE, {S6}.

This way, through its network interface 641, the router may only transmit multicast traffic from group G that the hosts want to receive, applying the rule mentioned above and which is repeated below.

If the router has different records associated to different hosts referring to a same router network interface and a same multicast group, the router transmits through that network interface the multicast traffic that comes from all of the sources of the records with filter mode INCLUDE. If there are records referring to this multicast group and network interface with filter mode EXCLUDE, then the router also transmits all of the traffic for this multicast group that comes from all of the sources, except those sources that belong to the group formed by the intersection of source lists of these records with filter mode EXCLUDE.

In addition to transmitting only the traffic that the hosts want to receive, the present invention has other advantages, like simplicity and deletion of Q(G) and Q(S,G) queries (Group-specific-query and Group-and-source-specific-query) or the like that the router sends to the hosts to find out if there are hosts interested in receiving specific multicast traffic.

In order to compare the improvements of this invention against the prior state of the art, Table 10 explains the operation of the router 640 from FIG. 6 when it is a router from the prior state of the art applied by standard protocol IGMPv3 established in RFC 3376.

Before explaining Table 10, cases 9 and 10 of Table 1 of standard protocol IGMPv3 are described below, using figures to make the use of the requested list and exclude list easier to understand, as well as the operation of the router in the mentioned cases 9 and 10 that are used as an example in Table 6.

Figure 7:
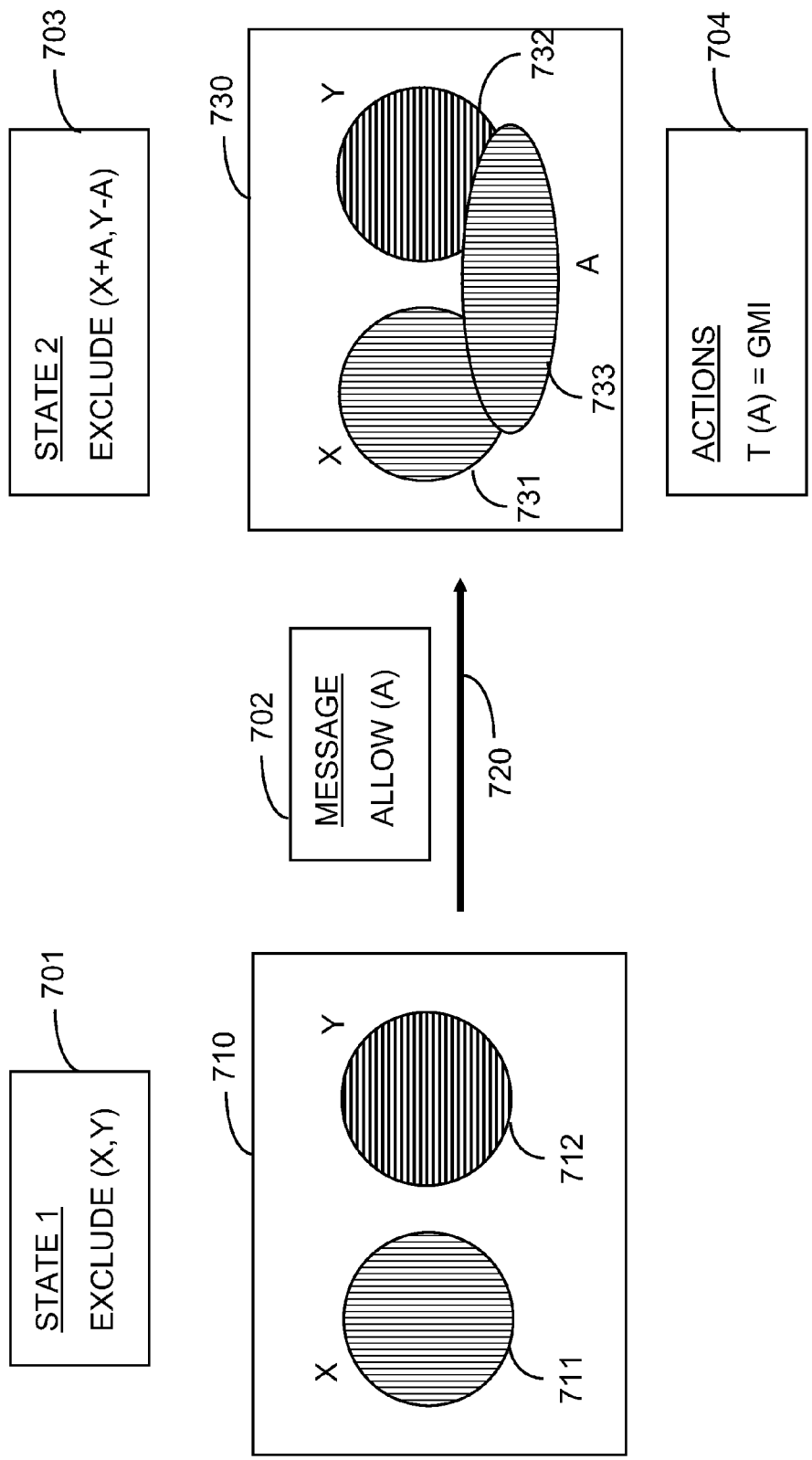
FIGS. 7 and 8 illustrate the operation of specific cases of the operating table for protocol IGMPv3 in the prior state of the art.

FIG. 7 illustrates the operation of case 9 of Table 1:

| STATUS 1 | MESSAGE | STATUS 2 | ACTIONS |
| --- | --- | --- | --- |
| 9. EXCLUDE (X, Y) | ALLOW (A) | EXCLUDE (X + A, Y − A) | T(A) = GMI |

FIG. 7 uses groups in a circular or elliptical form to represent groups of sources. The squares 710 and 730 represent the group of all possible S data sources, meaning the group of, for example, all IPv4 (or IPv6 in the case of protocol MLD) addresses that can be used as an origin IP address to transmit a multicast channel (S,G).

Initially, the router is in status 1 shown graphically using areas 710, 711 and 712. Circle 711 with a section formed by vertical lines represents the group of sources X from status 1, meaning the "requested list" X formed by EXCLUDE data sources that have a timer with a value higher than zero. Circle 712 with a section formed by horizontal lines represents the group of sources Y from status 1, meaning the "exclude list" Y formed by EXCLUDE data sources that have a timer with a value of zero.

When an IGMPv3 router has an EXCLUDE filter mode for a specific multicast G group in a specific network interface for the router, the multicast traffic that the router transmits from this group G is the one that comes from all data sources, except the sources from the exclude list. In status 1, the multicast traffic transmitted by the router is the traffic that comes from all sources (area 710) except sources from the exclude list (circle 712). When the router receives the message ALLOW (A) 702, the router changes to status 2 represented by areas 730, 731, 732 and 733. The requested list of status 2 is formed by joining (X+A) groups X and A represented through elements 731 and 733 in FIG. 7 with a vertical section. The exclude list of status 2 is formed by (Y−A) which is group Y less sources Y also found in group A. FIG. 7 shows the exclude list through area 732 with a horizontal section. In status 2, the multicast traffic transmitted by the router is from all sources of area 730 except data sources from exclude list 732.

Also, the router assigns the GMI value (default of 260 seconds) to all data sources included in group A, which therefore remain in the requested list, for at least the time indicated in parameter GMI. This way, the router will transmit the multicast traffic of the Group A sources during the time indicated in parameter GMI.

Figure 8:
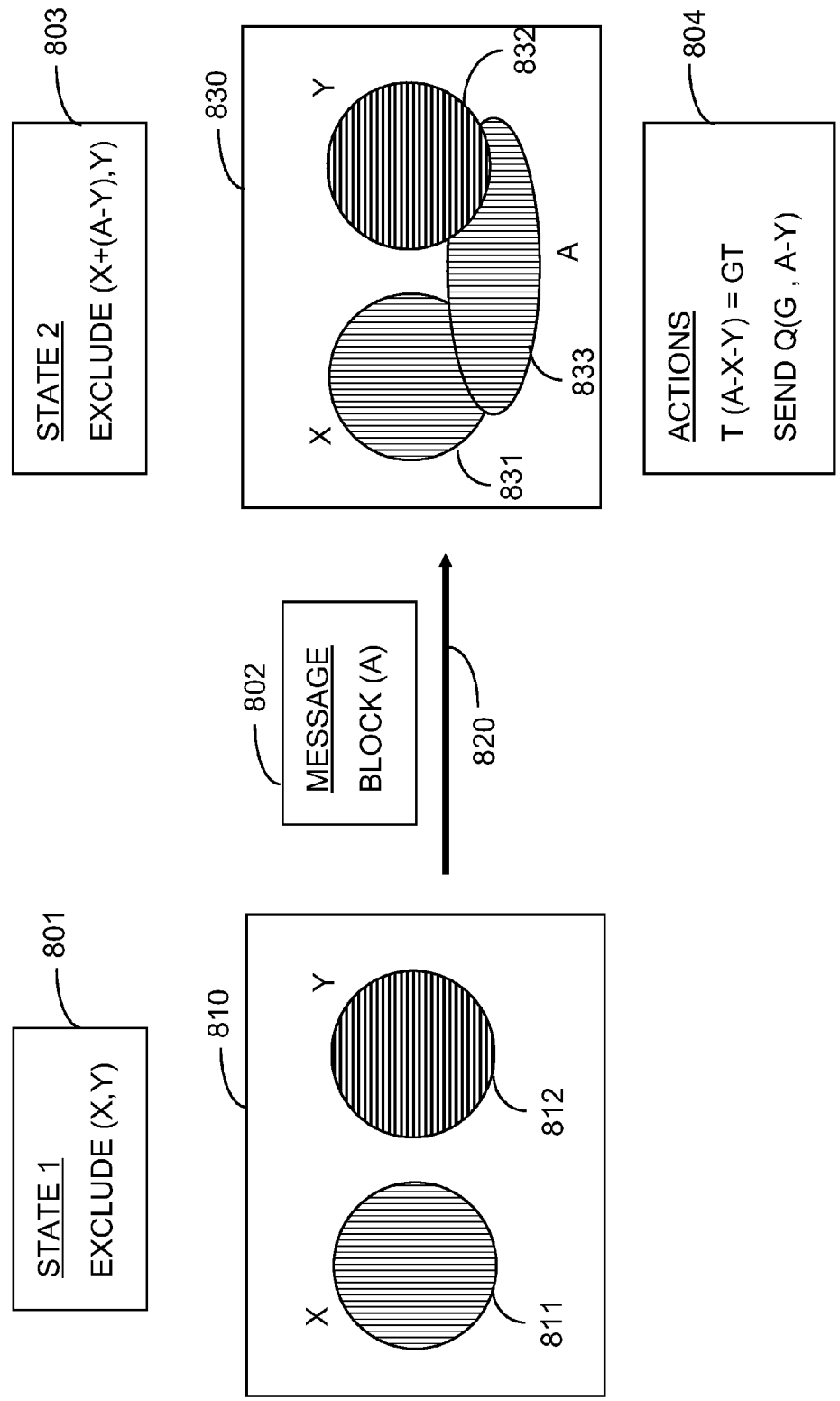

FIG. 8 illustrates the operation of case 10 of Table 1:

| STATUS 1 | MESSAGE | STATUS 2 | ACTIONS |
| --- | --- | --- | --- |
| 10. EXCLUDE (X, Y) | BLOCK (A) | EXCLUDE (X + (A − Y), Y) | T(A − X − Y) = GT SEND Q (G, A − Y) |

Initially, the router is in status 1 shown graphically using areas 810, 811 and 812.

Circle 811 with a section formed by vertical lines represents the group of sources X from status 1, meaning the "requested list" X formed by EXCLUDE data sources that have a timer with a value higher than zero. Circle 812 with a section formed by horizontal lines represents the group of sources Y from status 1, meaning the "exclude list" Y formed by EXCLUDE data sources that have a timer with a value of zero.

In status 1, the multicast traffic transmitted by the router is the traffic that comes from all sources (area 810) except sources from the exclude list (circle 812). When the router receives the message BLOCK (A) 802, the router changes to status 2 represented by areas 830, 831, 832 and 833.

The requested list of status 2 is made up by joining (X+ (A−Y)) from groups X and (A−Y), where (A−Y) is the group of A sources less those A sources that are also found in Y. The requested list is shown in FIG. 8 through areas 831 and 833 that have a vertical section.

The exclude list of status 2 is formed by the Y group. FIG. 8 shows the exclude list through area 832 with a horizontal section.

In status 2, the multicast traffic transmitted by the router is from all sources of area 830 except data sources from exclude list 832.

Also, the router assigns the value that the GT group timer has to all data sources (A-X-Y), meaning the sources included in group A that were not in groups X or Y, and which therefore, will remain in the requested list for at least the time indicated in the GT parameter.

Having explained the operation of a router IGMPv3 of the prior state of the art, and with reference to Table 10, below is an explanation of the operation of the example in FIG. 6, according to the prior state of the art, meaning, according to the standard IGMPv3 protocol, the operation of which is described in Table 1.

Router 640 of the prior state of the art only uses one record to store the information of the multicast traffic requested by the hosts in each network interface and relating to a specific multicast group.

As explained in the RFC 3376 mentioned above, these records have a filter mode, that can be of an INCLUDE or EXCLUDE type, along with a list of sources and timers. When the filter mode is an EXCLUDE type, this record also includes a timer called "Group Timer".

Again, in FIG. 6 multicast traffic requests of the three hosts 610, 620 and 630 refer to the same multicast group, that we have called G, and therefore router 640 of the prior state of art will only use one record to manage the traffic requests of the three hosts.

Although the order in which the hosts respond to a General Query message sent by the router is a random order, Table 10 supposes that host 610 responds first, then host 620 and lastly host 630.

In line 1 of Table 10, router 640 receives message IS_IN (S1, S2, S3) from host 610 that wants to receive channels (S1,G), (S2,G) and (S3,G).

Router 640 processes this message and changes to status 2 INCLUDE (S1,S2, S3) in which the router has a record associated to the G multicast group with an INCLUDE filter mode and with the source list {S1,S2, S3}. Router 640 performs the three actions indicated in line 1 of Table 10 to initialise the timers associated with these three sources with the GMI value, that has a default of 260 seconds.

In accordance with Status 2 of line 1 in Table 10, router 640 transmits the multicast traffic of channels (S1,G), (S2,G) and (S3,G) through its network interface 641.

In line 2 of Table 10, router 640 receives the message IS_EX (S3, S4) coming from host 620 which wants to receive the multicast group from group G from all of the sources, except from sources S3 and S4.

Router 640 processes that message IS_EX (S3, S4) according to the operation of Table 1. It specifically uses the process described in line 2 of Table 1 that we have copied below:

| STATUS 1 | MESSAGE | STATUS 2 | ACTIONS |
| --- | --- | --- | --- |
| 2. INCLUDE (A) | IS_EX (B) | EXCLUDE (A * B, B − A) | T(B − A) = 0 DEL(A − B) GT = GMI |

Using this process, the router has to change the INCLUDE filter mode to EXCLUDE and store the sources of group B into the G group record.

Sources from group B that were previously in group A of the INCLUDE record in status 1, meaning that intersection A*B will form the requested list and its associated timers will maintain the value they had. Instead the sources of group B that are not in group A, meaning group B-A, will form the exclude list and its timers initialise at zero using the T(B−A)= 0 action. The router erases the rest of the sources from the initial group A and initialises the Group Timer (GT) with the GMI value.

In line 2 of Table 10, the initial status of the router is INCLUDE (S1, S2, S3). Group A is therefore the group for sources (S1, S2, S3). Group B from message IS_EX (B) is the group of sources (S3, S4).

The intersection of groups A and B is A*B={S3}.

The group of elements from B that are not in A is B−A={S4}.

The final status of the router will be EXCLUDE ({S3}, {S4}), where the requested list only contains source S3 and the exclude list contains source S4 with a timer that initialises at zero in action T(S4)=0.

Sources S1 and S2 are deleted from the record using the DEL (S1, S2) action and the Group Timer initialises with the GMI value using the GT=GMI action.

In status 2 of line 2 of Table 10, router 640 transmits the multicast traffic from group G through its network interface 641. This traffic comes from all of the sources except the sources from the exclude list, meaning the multicast traffic of group G from all of the sources, except source S4.

In line 3 of Table 10, router 640 receives message IS_IN (S2, S5) from host 630 that wants to receive multicast traffic from channels (S2,G) and (S5,G).

Router 640 processes that message IS_IN (S2, S5) according to the operation of Table 1. It specifically uses the process described in line 3 of Table 1 that we have copied below:

| STATUS 1 | MESSAGE | STATUS 2 | ACTIONS |
|---|---|---|---|
| 3. EXCLUDE (X, Y) | IS_IN (A) | EXCLUDE (X + A, Y − A) | T(A) = GMI |

Through this process, the router maintains the EXCLUDE filter mode and adds to the requested list X the group of sources A that it receives in the message IS_IN (A). If any of the sources from group A was in the exclude list it moves to the requested list when the router executes the T(A)=GMI action to initialise the timers from the sources of group A with the GMI value.

In line 3 of Table 10, the initial status of the router is EXCLUDE ({S3}, {S4}), where {S3} is the requested list and {S4} is the exclude list. Group A from message IS_IN (A) is the group of sources (S2, S5).

When sources from A={S2, S5} are added to the requested list, the final status is the EXCLUDE ({S2, S3, S5}, {S4}) status indicated in status column 2 of line 3 in Table 10. The router executes the actions T(S2)=GMI and T(S5)=GMI to initialise the timers of sources S2 and S5.

In status 2 of line 3 of Table 10, router 640 transmits the multicast traffic from group G through its network interface 641. This traffic comes from all of the sources except the sources from the exclude list, meaning the multicast traffic of group G from all of the sources, except source S4.

In line 4 of Table 10, router 640 receives the message ALLOW (S6) from host 630 that also wants to receive multicast traffic from channel (S6,G).

Router 640 processes the ALLOW (S6) message according to the operation of Table 1. It specifically uses the process described in line 9 of Table 1 that we have previously explained through FIG. 7:

| STATUS 1 | MESSAGE | STATUS 2 | ACTIONS |
|---|---|---|---|
| 9. EXCLUDE (X, Y) | ALLOW (A) | EXCLUDE (X + A, Y − A) | T(A) = GMI |

When executing this process in line 4 of Table 10, the router adds source S6 to the requested list and the final status of line 4 is EXCLUDE ({S2, S3, S5, S6}, {S4}) with the S6 timer initialised with the GMI value using action T(S6)=GMI.

In status 2 of line 4 of Table 10, router 640 transmits the multicast traffic from group G through its network interface 641. This traffic comes from all of the sources except the sources from the exclude list, meaning the multicast traffic of group G from all of the sources, except source S4.

In line 5 of Table 10, router 640 receives message BLOCK (S2, S5) from host 630 that wants to stop receiving the traffic from multicast channels (S2,G) and (S5,G).

Router 640 processes that BLOCK (S2, S5) message according to the operation of the process described in line 10 of Table 1 that has been previously explained through FIG. 8:

| STATUS 1 | MESSAGE | STATUS 2 | ACTIONS |
|---|---|---|---|
| 10. EXCLUDE (X, Y) | BLOCK (A) | EXCLUDE (X + (A − Y), Y) | T(A − X − Y) = GT<br>SEND Q(G, A − Y) |

When executing this process in line 5 of Table 10, the router adds sources S2 and S5 to the requested list and the final status of line 5 is EXCLUDE ({S2, S3, S5, S6}, {S4}). The router sends a "Source And Group Specific Query" using the SEND Q (G, {S2,S5}) action to check if there is a host that still wants to receive multicast traffic from channels (S2,G) and (S5,G) and at the same time the router decreases the value of the timers associated to sources S2 and S5 at a value called LMQT, which has a default value of 20 seconds according to protocol IGMPv3.

Since hosts 610 and 620 want to continue receiving traffic from channels (S2,G) and (S5,G), these hosts must send IS_IN or IS_EX messages to the router so that it does not stop transmitting the multicast channels mentioned that hosts 610 and 620 want to receive.

These messages from hosts 610 and 620 have been shown in Table 10 through lines 5a and 5b, respectively. Messages IS_IN (S2) and IS_EX (S3, S4) are similar to those of lines 1 and 2 mentioned above and the information of the initial and final statuses and the router actions of lines 5a and 5b are not explained in detail again.

In line 6 of Table 10, router 640 receives the message TO_IN (S7) from host 620 that has changed its filter mode from the EXCLUDE mode to the INCLUDE mode and that it only wants to receive multicast traffic from channel (S7,G).

Router 640 processes that TO_IN (S7) message according to the process described in line 12 of Table 1:

| STATUS 1 | MESSAGE | STATUS 2 | ACTIONS |
|---|---|---|---|
| 12. EXCLUDE (X, Y) | TO_IN (A) | EXCLUDE (X + A, Y − A) | T(A) = GMI<br>SEND Q(G, X − A)<br>SEND Q(G) |

When router 640 from the prior state of the art receives a TO_IN message to change the filter mode from EXCLUDE to INCLUDE, the final status of the router continues to have an EXCLUDE filter mode. This is true even if the host that sends the message, like host 620 in this case, were the only host that had an EXCLUDE filter mode.

After receiving the TO_IN (A) message the router adds the sources from group A to the requested list X and, in the event that one of the sources from group A is also in exclude list Y, it deletes the sources from group A of exclude list Y.

Then the router initialises the timers from the sources of group A using the GMI value and sends SEND Q(G,X−A) and SEND Q(G) queries.

In line 6 of Table 10, in the final status of the router it adds source S7 to the requested list and the final router status is EXCLUDE ({S3, S7}, {S4}). The router initialises the timer in source S7 with the GMI value and completes the rest of the actions indicated in line 6 of Table 10 by sending a Query Q(G,{S3}) and reducing the value from source S3 to the LMQT value and by sending a Q(G) Query and reducing the value of the Group Timer to the LMQT value.

When hosts 610, 620 and 630 receive the queries they respond by sending the IS_IN messages to the router as indicated in lines 6a, 6b and 6c of Table 10 and the router must process these messages. Although the order in which the hosts respond to the queries is random, we have assumed that it responds to host 610 first, then host 620 and lastly host 630.

Although the three messages of lines 6a, 6b and 6c are IS_IN, router 640 keeps the EXCLUDE status in its network interface 641 until the Group Timer reaches zero. This implies that router 640 continues to transmit multicast traffic through its network interface 641 for all sources except source S4 until the Group Timer reaches zero, even though no host wants to receive this traffic, which presents a useless bandwidth expense in data network 645.

If the LMQT parameter has a default value of 20 seconds, in the example found in FIG. 6, the router continues to transmit multicast traffic from channel (S5,G) during these 20 seconds that no host wants to receive, as well as multicast traffic from any other data sources connected to the data network 660 that are transmitting multicast traffic in group G.

When the Group Timer reaches zero the router 640 changes from EXCLUDE status to INCLUDE status and changes the sources from the requested list in the list of sources keeping the value of its timers.

As shown by comparing the router operation in Table 10 from the prior state of the art with the operation in Table 9, many advantages are achieved. Among these are simplicity, not sending multicast traffic to hosts that do not want to receive it, the deletion of Q(G) and Q(S,G) type queries, reducing the number of messages exchanged by the router and hosts, as well as saving memory and processing capacity in the router when deleting source timers, the requested list and the group timer.

6. Fifth Embodiments of the Present Invention

One of the inconveniences of protocol IGMP is that there is no mechanism to confirm that a router is receiving messages sent by a particular hosts and there is also no mechanism to confirm that a particular host receives a message sent from a router. To address this problem, protocol IGMPv3 uses a parameter called Robustness Variable with a value of 2 which indicates the number of times that the host has to send its messages to the router. Sending all of the messages between the hosts and the router multiple times means duplicating the traffic load in the network and the number of messages that the router and hosts have to process.

In accordance with one embodiment, a router of the present invention solves this problem by sending General Query type messages directed only at the hosts that have not responded to a General Query type message sent previously. This is possible since the router has information stored that identifies each host, like the IP address of each host for example and/or the level 2 address of the network interface used by each host and which is called the "MAC address" in the case of Ethernet networks.

In protocol IGMPv3, General Query messages are sent to the multicast address 224.0.0.1 called "All Systems multicast address", listened to by all network equipments.

To send a query message, for example a General Query type message, to only one host, a router of the present invention can use at least two mechanisms, which are explained below.

A first mechanism includes using the unicast IP address of the host to which the query message is directed as a target IP address for the package contained in the query, instead of using, for example, the multicast IP address 224.0.0.1 This way only the host that has not responded the General Query type message receives a General Query type message again.

A second mechanism includes using a destination multicast IP address, for example, 224.0.0.1, in the IP packet that carries the query that is sent to a host but encapsulating that IP packet in a layer 2 data frame in the OSI model using the layer 2 host address as a destination address of the data frame. For example, an Ethernet data frame that has a destination MAC Address that matches the MAC Address of the host to which the IP packet is sent.

In both mechanisms described, the host that receives the data section carried by the IP package that carries the query message processes the data section and the IP package as if it were an IP package addressed to the multicast address, such as 224.0.0.1. Using any of these two mechanisms, the router can send a query message only to the hosts that have not responded and therefore avoid that all of the hosts send their messages twice. When a host responds to a query that was only sent to it, the router updates the information from the status of this host. The router can also carry the query message many times to the hosts that have not responded to the, for example, General Query, therefore increasing reliability. When a host that has not responded to a general query does not respond to one or more specific queries sent to that host, the router may interpret the non-response to mean that the host does not want to receive multicast traffic and delete the record of the status associated to that host.

7. Sixth Embodiments of the Present Invention

In specifications RFC 4541, "Considerations for Internet Group Management Protocol (IGMP) and Multicast Listener Discover (MLD) Snooping Switches", edited on line by the IETF, M. Christensen et al., Request for Comments 4541, May 2006, the operation of a switch is described that performs a function that is called "IGMP Snooping" which avoids that all multicast data packages have to be sent to all switch ports (the latter is what happens by default when the "IGMP Snooping" function is not used).

With the techniques called "snooping", the switch, which in principle is a level 2 equipment in the OSI ("Open Systems Interconnection") model, does not know or use level 3 protocols like protocol IP, analyzes the IP data packages that contain the messages of the multicast protocols, like, for example, protocol IGMPv3, and creates or updates a table or records with the information of the multicast groups or channels that it must send through each of its ports. This way the switch can use snooping to read the same multicast messages directed to the router.

In a switch that does not include the IGMP snooping function, when that switch receives a data frame that transports a multicast IP package, which means an IP package with an IP address with a multicast destination, that switch transmits that data frame through all of the switch ports because it cannot associate that multicast IP address with a specific port for the switch. On the other hand, a switch that incorporates the IGMPv3 snooping function analyzes all the data sections it receives in each of the ports, detects the data frames that transport IGMPv3 messages and uses algorithms very similar to those of an IGMPv3 router in each of its ports to decide which multicast traffic was requested by each port.

The operation of these algorithms executed by the switch in each of its ports through which it receives data frames that contain IGMPv3 messages is similar to the one described in Table 1 but with the difference that an IGMPv3 snooping switch does not send query messages that are sent by the router. This way, the switch modifies its status table or records according to the IGMPv3 messages that it reads in the data sections. This way, the switch can store the multicast traffic information that the equipment connected to each of its ports wants to receive and send through each of these ports only the multicast channels requested by the equipment that is connected to each port.

A switch according to one embodiment of the present invention is different than a switch that performs the "IGMPv3 snooping" in the prior state of the art in that the switch stores for each switch port, for each multicast group, and for each equipment that sends IGMPv3 or like messages, the information obtained by snooping. In addition, in alternative embodiments of the present invention the snooping switch may be adapted to send query messages. As a result, when the improved switch receives a data section that contains an IGMPv3 or like message through a specific port, referring to a specific multicast group and coming from a specific equipment, the switch updates its status table or records in a way similar to an improved router previously described herein with the difference that it may or may not send query type messages. As such, an improved switch of the present invention may operate in accordance with the operating principles associated with one or more of the processes of Tables 3 through 7, subsets of one or more of the processes of Tables 3 through 7, or combinations thereof, taking into account that the switch may not send query type messages and is limited to reading messages using snooping to update its status table or records. This allows the improved switch to interrupt the traffic of a channel (S,G) when it knows that there is no equipment interested in receiving this channel. It may also employ one or more of the other advantages obtainable by the operating principles of Tables 3 through 7, as previously discussed.

8. Seventh Embodiments of the Present Invention

In the discussion that follows, the name "MAC Address" or "Media Access Control Address" refers to level 2 addresses in the OSI model. In Ethernet technologies, level 2 addresses are called MAC Address. Other names are used in other level 2 technologies. However, below is a general reference of all level 2 addresses with the name "MAC Address".

In alternative embodiments of a router or a switch that operate according to principles and methods previously disclosed herein, a router and/or switch of the present invention can use the MAC Address ("Media Access Control Address") of each network interface of each equipment that sends IGMPv3 or like messages as an identifier for each equipment that requests multicast traffic, instead of, or in addition to, the IP address for that equipment. Using a MAC Address can be convenient in the switches because they have a table or records in which they store in which switch port each network interface is connected which has a specific MAC address.

Like in the case in which the IP address is used to identify the equipment that send IGMPv3 messages, in this case the router or switch operates according to one or more of the operating principles of Tables 3 through 7, with the added difference that the IP address of the equipment sending IGMPv3 or like messages is replaced by the MAC Address of that equipment or uses both identifications: the IP address and the MAC Address.

It is appreciated, however, that a router or switch that operates in accordance with the principles of the present invention may also use as an identifier of each host any other data that allows the router or switch to identify from which host each data package is coming. Different access technologies for data networks can use different identifiers for the hosts. Therefore, for example, wireless technology called WIMAX does not include the MAC address from each host in all data frames sent to each host, rather each host includes an identifying field called CID or "Connection Identifier" in its data sections. Other network technologies, for example mobile networks, can use another type of identifier different for each host.

9. Eighth Embodiments of the Present Invention

In many countries telecommunication service providers are required to allow authorities to access the information exchanged between many parts of its telecommunications network. Implementing a "lawful interception" system of communications can be a prerequisite to operate as a telecommunications operator in these countries. This obligation to allow the interception of communications is also applied to communications through the IP protocol. For example, in the United States of America, the Communications Assistance for Law Enforcement Act, hereinafter called CALEA, requires that telecommunications networks and telecommunication service providers have the means to allow a lawful interception of communications. In December 1997, the Telecom Industry Association or TIA developed the J-SRD-025 standard, which allows telecommunication service providers to fulfil the obligations established by the CALEA. Section 229, paragraph (a) of the CALEA establishes that the Federal Communication Commission can establish the necessary rules so that telecommunication service providers implement the obligations established by the CALEA.

In August 1999, the Federal Communication Commission (hereinafter the FCC) published a rule that obliged telecommunication service providers to allow the interception of communications that use technology with switching packets, like the IP protocol used for the Internet. The FCC established the date of September 2001 as the deadline for telecommunication service providers to implement systems to allow the interception of communication in networks of switching packets.

In 1994, the FCC published a "Notice of Proposed Rulemaking", which establishes that Voice over Internet Protocol (VoIP) services are subject to the obligations of the CALEA.

However, some characteristics of the IP protocol increase the complexity of implementing lawful interception systems of communications in networks of switching packets. While in systems based on switching circuits, data from the communications follow a specific route to their destination, in systems based on switching packets, like IP for example, each data packet can follow a different route to the final destination.

Another difficulty of intercepting communications based on VoIP is the encrypting of data transmitted in data packets. In the last few years computer safety has increased in Internet protocols published by the Internet Engineering Task Force (IETF).

In the year 2000 there was a debate in the IETF on the convenience of taking into account or not the lawful interception of communications when designing communication protocols. The result of this debate was that the IETF decided not to take into account the lawful interception of communications. The reasons for that decision are found explained in the RFC 2804 specifications, called "IETF Policy on Wiretapping", Harald Alvestrand et al., May 2000, published by the IETF. Since most protocols used for Internet communications are designed by the IETF, this decision implies that nearly all protocols used on the Internet are designed without taking into account the lawful interception of communications.

If a telecommunications operator wants to offer its clients the possibility of communicating using multicast technology, in many countries that operator is required to include a system that will allow for the lawful interception of those communications that use multicast technology.

Figure 9:
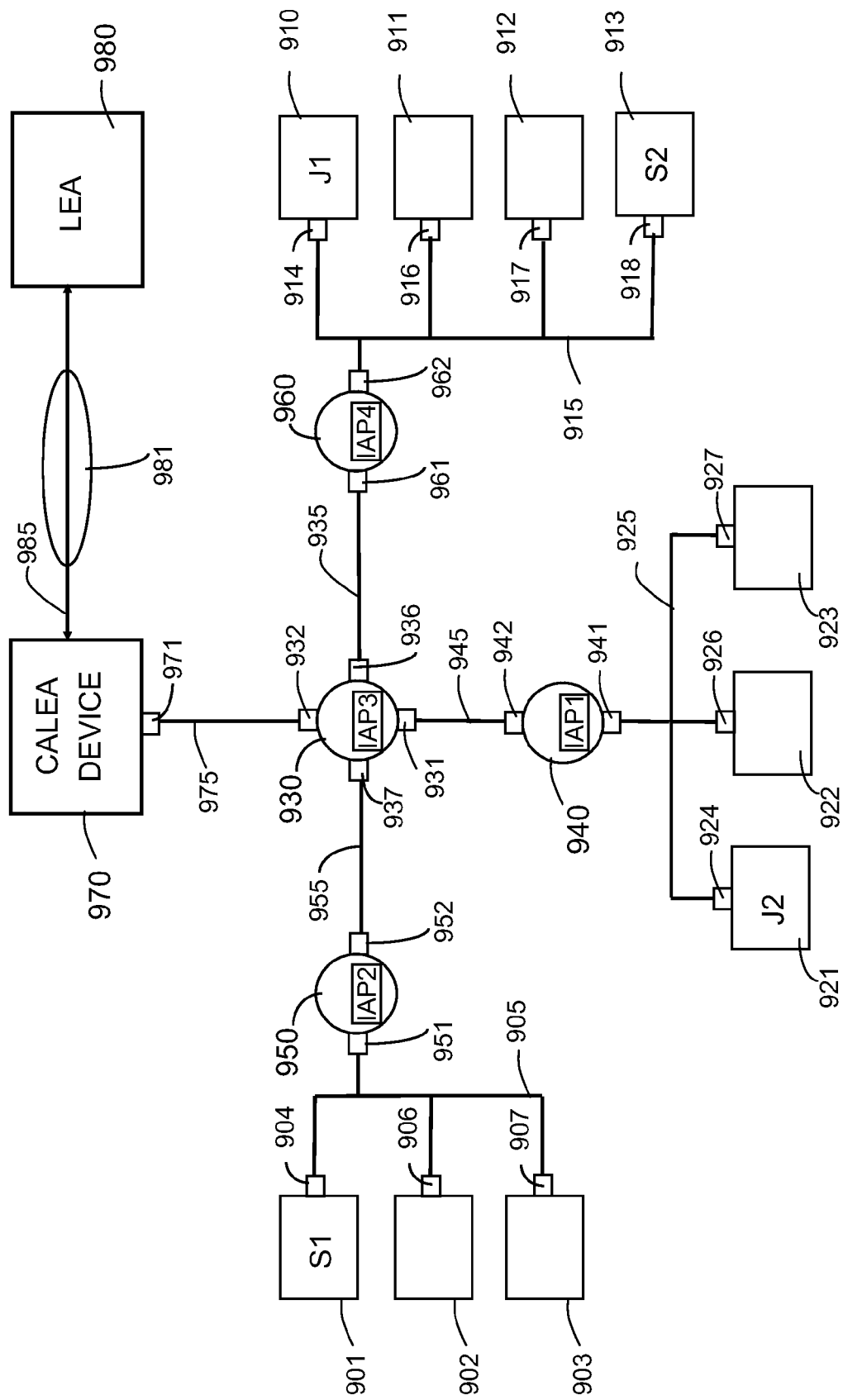
FIG. 9 shows a basic example of a multicast system in a data network, which illustrates the problem solved by various implementations of the present invention.

FIG. 9 shows a system that allows the interception of communications in different improved IGMPv3 or like routers that operate in accordance with the operating principles of one or more of the processes of Tables 3 through 7, as previously described herein.

FIG. 9 shows, by way of example, a data network that contains ten hosts, four multicast routers, and one equipment 970 used to manage the lawful interception of communications, generally known as the "CALEA DEVICE", that typically communicates with other equipment 980, generally known as the LEA. Equipment 970 communicates with equipment 980 via a communication link 985. Equipment 980 typically belongs to an official organisation that has requested the lawful intervention of the communications. Following the naming of the CALEA, this organisation is sometimes known as the "Law Enforcement Agent" or LEA.

The two-way arrow 985 in FIG. 9 represents the communication path between equipment 970 and 980. With this communication the equipment at the ends of the arrow can exchange IP packages. However, this does not imply that both equipment 970 and 980 at the ends of the arrow are directly connected by a physical network, such as an Ethernet. The IP packages exchanged between equipment 970 and 980 via communication path 985 can cross numerous routers and data networks, like the Internet network represented through element 981, on its route from its origin to its destination.

The communication 985 between equipment 970 and equipment 980 can use various methods to exchange information. A standardised method for this exchange of information is described in the ANSI/J-STD-025-B standard, July 2006, developed jointly by the Telecommunications Industry Association (TIA) and the Alliance for Telecommunications Industry Solutions (ATIS).

FIG. 9 shows ten hosts indicated by elements 901, 902, 903, 910, 911, 912, 913, 921, 922, 923, each of which has a network interface indicated by elements 904, 906, 907, 914, 916, 917, 918, 924, 926 and 927, respectively. For explanation purposes, hosts 901, 913, 910 and 921 have also been identified in the using labels S1, S2, J1 and J2 respectively. FIG. 9 also shows three IGMP or like routers, represented by elements 940, 950 and 960. These routers communicate with the hosts using the IGMPv3 or like protocol and with another router 930 using the PIM-SM or like protocol.

Router 940 communicates through its network interface 941 with the three hosts J2, 922 and 923 through a multi-access network 925. Router 950 communicates through its network interface 951 with the three hosts S1, 902 and 903 through a multi-access network 905. Router 960 communicates through its network interface 962 with the four hosts J1, 911, 912 and S2 through the multi-access network 915.

Routers 940, 950 and 960 perform the functions of an IGMPv3 or like router in multi-access networks 925, 905 and 915, respectively, so that the hosts that are connected to these networks can request multicast traffic using the IGMPv3 or like protocol.

The three routers 940, 950 and 960 communicate through their network interfaces 942, 952 and 961, respectively, with router 930 using various network protocols. For example, for multicast communications, the routers can communicate using the PIM-SM protocol, which is the multicast protocol between routers most widespread of present.

In the example shown in FIG. 9, the four hosts S1, S2, J1 and J2 communicate through a multicast communication. Two hosts identified as S1 and S2 are transmitting and receiving multicast data packages from a specific multicast group which we will call G1. Another two hosts, identified as J1 and J2 only receive multicast data packages from the G1 multicast group without transmitting multicast packages in G1 group.

The multicast communication between equipments S1, S2, J1 and J2 can be, for example, a voice communication that uses VoIP technology.

In the example of FIG. 9, equipment 970 receives instructions from equipment 980 to intercept communications from host S2. To perform the lawful interception of communications, each of the 940, 950, 930 and 960 routers preferably have IAP1, IAP2, IAP3 and IAP4 devices or the like, respectively, that receive instructions from equipment 970.

The IAP devices, the abbreviation of "Interception Access Point", or like devices, receive instructions from equipment 970 indicating the equipment to which they must intercept communications. For this they use an identifier of the equipment from which they must intercept communications, like, for example, the IP address of that equipment.

In the case of intercepting communications of host S2, the IAP4 will intercept all IP packages that have as origin or destination IP address the IP address of host S2 and will send a copy of those IP packages to equipment 970.

If the S2 host communicates using unicast packages, the system operates easily. However, in the multicast communication between the four hosts (S1, S2, J1, J2) of FIG. 9 certain problems arise that make it difficult for the lawful interception of communications.

To receive the data packages from the G1 multicast group, the different hosts that participate in the communication can send IGMPv3 messages to their respective routers, whose filter mode can be INCLUDE or EXCLUDE for the G1 multicast group.

In the first case the hosts can send to their IGMPv3 routers, for example, EXCLUDE ({ }, G1) messages, where the list of EXCLUDE data sources is an empty group and therefore indicate to the router that they want to receive all IP data packages sent to the address of the G1 multicast group, despite the source of origin sent by the data package.

In the second case, if, for example, the four participants (S1, S2, J1, J2) know their IP addresses and know that only hosts S1 and S2 will transmit data packages, the hosts can send to their routers INCLUDE ({S1, S2}, G1) messages indicating to the routers that they want to receive the IP data packages sent to the G1 multicast group address coming only from hosts S1 and S2, meaning multicast channels (S1,G1) and (S2,G1).

If the four participants in the multicast communication of FIG. 9 do not want to receive communications from other hosts, they should use INCLUDE type IGMPv3 messages.

However, IGMPv3 routers from the prior state of the art (RFC 3376) do not allow the tracking of the multicast traffic requested by each host connected to a network interface of the IGMPv3 router and only store the multicast traffic group requested by all of the hosts connected to the same router network interface and referring to one same multicast group.

As a result, router 940 of the prior state of the art does not know which of the three hosts, J2, 922 or 923 has sent an IGMPv3 message to receive multicast data packages from group G1, meaning that the router does not know which host is participating in the multicast communication. If, as explained in FIG. 1, there are many DSLAM connected to a switch and each DSLAM offers a connection to many thousands of hosts, the host that is participating in a multicast communication can be any of the thousands of hosts connected to the same network interface of the IGMPv3 router.

In FIG. 9, the same problem exists, even in the same multi-access network 915 where the intercepted S2 host is connected. Router 960 of the prior state of the art does not detect any other host J1 connected to the same network 915 and receiving the multicast data packages sent by host S2 to the G1 multicast group.

The present invention solves these problems through the use of improved routers that track the multicast traffic individually requested by each host according to one or a combination of the processes of Tables 3 through 7 explained above. As such, an improved router 940 knows that the host that sent an IGMPv3 or like message to receive multicast traffic from channels (S1,G1) and (S2, G1) is the J2 host and the IAP1 or like device can send that information to the equipment 970.

Similarly, an improved router 960 knows that there are two hosts, specifically hosts J1 and S2, which have sent IGMPv3 or like messages to receive multicast traffic from the (S1,G1) and (S2, G1) channels and the IAP4 device can send this information to equipment 970.

The improved routers, which operate in accordance with the principles of the present invention, detect and identify all of the hosts participating in a multicast communication and can send such information that identifies them to equipment 970 using, for example, IAP1, IAP2 and IAP4.

The IAP or like devices located inside the routers that communicate with equipment 970 can access the information stored by the routers on the multicast traffic requested at each network interface of the router. The IAP or like device can also send copies of the IP packets to equipment 970 packets that are sent or received by the hosts which equipment 970 indicates as having to intercept.

An improved router 930 of the present invention preferably transmits to equipment 970, information from all IGMPv3 or like routers that participate in a multicast communication for a specific multicast group, like group G1 for example, as already mentioned. The transmission of that information to equipment 970 can be made by router 930, for example, using the IAP3 or like device. Router 930 router can detect which of routers 840, 950 and 960 are participating in a multicast communication that uses a specific multicast group by analyzing the different PIM-SM or like messages received by that router, for example the different JOIN messages like JOIN (S,G) or JOIN (*,G), or PIM-SM messages, like "PIM-Register" in the event router 930 is a Rendezvous Point (RP) router in the multicast domain.

Based on the information from routers 940, 950, 960, that participate in a multicast communication of a specific multicast group, like for example the G1 multicast group, the equipment 970 can request from these routers 940, 950, 960 the information from only the hosts that participate in the multicast communication that uses the G1 multicast group. In this manner, equipment 970 does not need to send the information from group G1 to all of the IGMPv3 or like routers from its network.

10. Ninth Embodiments of the Present Invention

In the foregoing description various embodiments of the present invention are disclosed in use in networks that use management protocols, like, for example, the SNMP protocol.

SNMP is a group of standards for the management of network equipment. SNMP was adopted years ago as a standard for TCP/IP networks and has become the most used tool to manage networks and devices connected to the networks. There are many updates or new versions of the SNMP protocol. In 1995, an update named SNMPv2 was published. In 1998, the latest version of this group of standards was published, named SNMPv3 which improved aspects related to security.

An SNMP management system generally includes the following elements:
- At least a control station or management station, traditionally called "SNMP manager" or "management station". Hereinafter we will use the term control station to refer to this element.
- Various nodes (potentially many), each of which uses an application, traditionally called SNMP agent, to communicate with the control station. Each SNMP agent has access to the setting information of its node and can send messages and receive them from the control station.
- A communication protocol for the communication between the control station and the SNMP.

SNMP agents manage resources from each node by using certain objects that represent these resources. Each object is a variable with data that represents an aspect of the managed node. The group of these objects for a particular node of the network is called "Management Information Base" or MIB. MIBs are standardised for each type of network device. For example, the same MIB can be used for various switches from different manufacturers.

An SNMP control station monitors the operation of particular equipment by recovering the value from the objects contained in the MIB of this equipment. To do this, the SNMP control station communicates with the SNMP agent through the SNMP protocol. An SNMP control station can also modify the value of some objects contained in the MIB of particular equipment by sending a message to the SNMP agent of that equipment to modify those values.

MIBs are specifications that contain definitions to manage and maintain information for a specific type of network equipment so that the network equipment from different manufacturers can be monitored, configured and controlled remotely.

Rules that establish the language used to write the MIBs are established in specifications RFC2578 (McCloghrie et al., Internet Engineering Task Force, Request for Comments 2578, "The structure of Management Information Version 2, SMIv2", April 1999) and specifications RFC2579 (McCloghrie et al., Internet Engineering Task Force, Request for Comments 2579, "Textual Conventions for SMIv2", April 1999). SMIv2 uses a small part of the instructions from a language called Abstract Syntax Notation One (ASN.1). ASN.1 is a formal standardised language and is important in the SNMP protocol for many reasons. Firstly, it is used to establish the syntax for the data. It is also used to establish SNMP protocol messages, also called "Protocol Data Units" (PDUs). Lastly, it is used to establish the MIB.

Usually, to make a new control protocol compatible with an SNMP control system, systems called "SNMP Proxies" are usually used. The function of an SNMP Proxy is to act as an intermediary between the control station that uses the SNMP management system and the new device that uses a different or its own control protocol. To do this, different messages and data from the new control protocol must be converted into SNMP messages and vice-versa, meaning that the messages and data from the SNMP protocol must also convert to the device's own control system.

Both IGMPv3 multicast routers and PIM-SIM multicast routers from the current state of art usually have SNMP agents.

The description of an MIB database for an SNMP agent for PIM-SM routers is described in the document named "Protocol Independent Multicast MIB draft-ietf-pim-mib-v2-

10.txt" edited online by the IETF (R. Sivaramu et al., Internet Engineering Task Force, PIM Working Group, September 2007, currently available on line at ftp://ftp.rfc-editor.org/in-notes/internet-drafts/draft-ieff-pim-mib-v2-10.txt).

The definition of the MIB database of an SNMP agent for IGMPV3 routers is described in the document named "Multicast Group Membership Discovery MIB" edited online by the IETF (J. Chesterfield et al., Internet Engineering Task Force, Magma Working Group, September 2008). FIG. 11 shows a small fragment of the code that establishes this MIB database, which corresponds to a part of the code from an object called "mgmdRouterSrcListTable". This object is a table that contains an entry for each S data sources from each G multicast group from each router network interface that has received IGMP messages to transmit that channel (S, G). The table is made up of a variable number ("SENQUENCE OF" indicates a variable number of elements in SMlv2 language) from the lines called "mgmdRouterSrcListEntry". Each of these lines is made up of the fixed number of fields indicated in the "SEQUENCE" ("SECUENCE" indicates a fixed number of elements in SMlv2 language) sentence explained below.

```
MgmdRouterSrcListEntry ::= SEQUENCE {
    mgmdRouterSrcListAddressType    InetAddressType,
    mgmdRouterSrcListAddress        InetAddress,
    mgmdRouterSrcListIfIndex        InterfaceIndex,
    mgmdRouterSrcListHostAddress    InetAddress,
    mgmdRouterSrcListExpire         TimeTicks}
```

Where:
The field "mgmdRouterSrcListAddressType" indicates the type of IP address (Ipv4 or IPv6) for fields "mgmdRouterSrcListAddress" and "mgmdRouterSrcListHostAddress"
Field "mgmdRouterSrcListAddress" is the IP address of the multicast group.
Field "mgmdRouterSrcListIfIndex" indicates the network interface of the router.
Field "mgmdRouterSrcListHostAddress" indicates the IP address of the data source.
Field "mgmdRouterSrcListExpire" is a timer associated with that data source.

As described in the document named "Multicast Group Membership Discovery MIB", the MIB database stores the information from the multicast data sources and multicast groups from each network interface of an IGMPv3 router and has a similar structure to that of the records used by the IGMPv3 router from the RFC 3376 specifications of the prior state of the art. Therefore, it does not store the information separately from the multicast channels requested by each host; rather, it only stores the group of multicast channels that was requested and/or that each network interface of the router is transmitting.

In accordance with one aspect of the present invention, an improved MIB database of a SNMP agent of an improved IGMP router stores multicast traffic information separately requested from each network interface of the router and referring to each multicast group separately for each host requesting multicast traffic. The structure of the improved MIB database used by the improved SNMP agent is similar to the structure of records used by the improved routers explained above in Section 2.1 and the various other implementations disclosed herein. For example, the improved MIB database that uses the improved SNMP agent of an improved IGMPv3 or like router can store the following information:

(Interface, multicast-address, hostID, group-timer, filter-mode {(source-address, source-timer)})
Where:
interface indicates the network interface of the router through which the router has received the IGMP message.
multicast-address is the IP address of the multicast group.
hostID is an identifier of the host that has sent the IGMP message.
group-timer is the timer named "group timer" or GT explained in the above examples of execution.
{(source-address, source-timer)} is a list of elements (source-address, source-timer), where source-address is the IP address of a data source and source-timer is a timer associated with that data source.
Filter mode can be INCLUDE or EXCLUDE and has the same sense as the one explained above, to indicate whether the sources from the list are INCLUDE or EXCLUDE sources.

This way, an improved SNMP can take advantage of the benefits of an improved router that operates in accordance with one or a combination of the principles and processes previously described in relation to Tables 3 through 7.

To simplify the explanation, and since SMlv2 language is understood by one skilled in the art, the code in SMlv2 language of an improved MIB which may be used by an improved SNMP agent of the present invention is not included.

Figure 10:
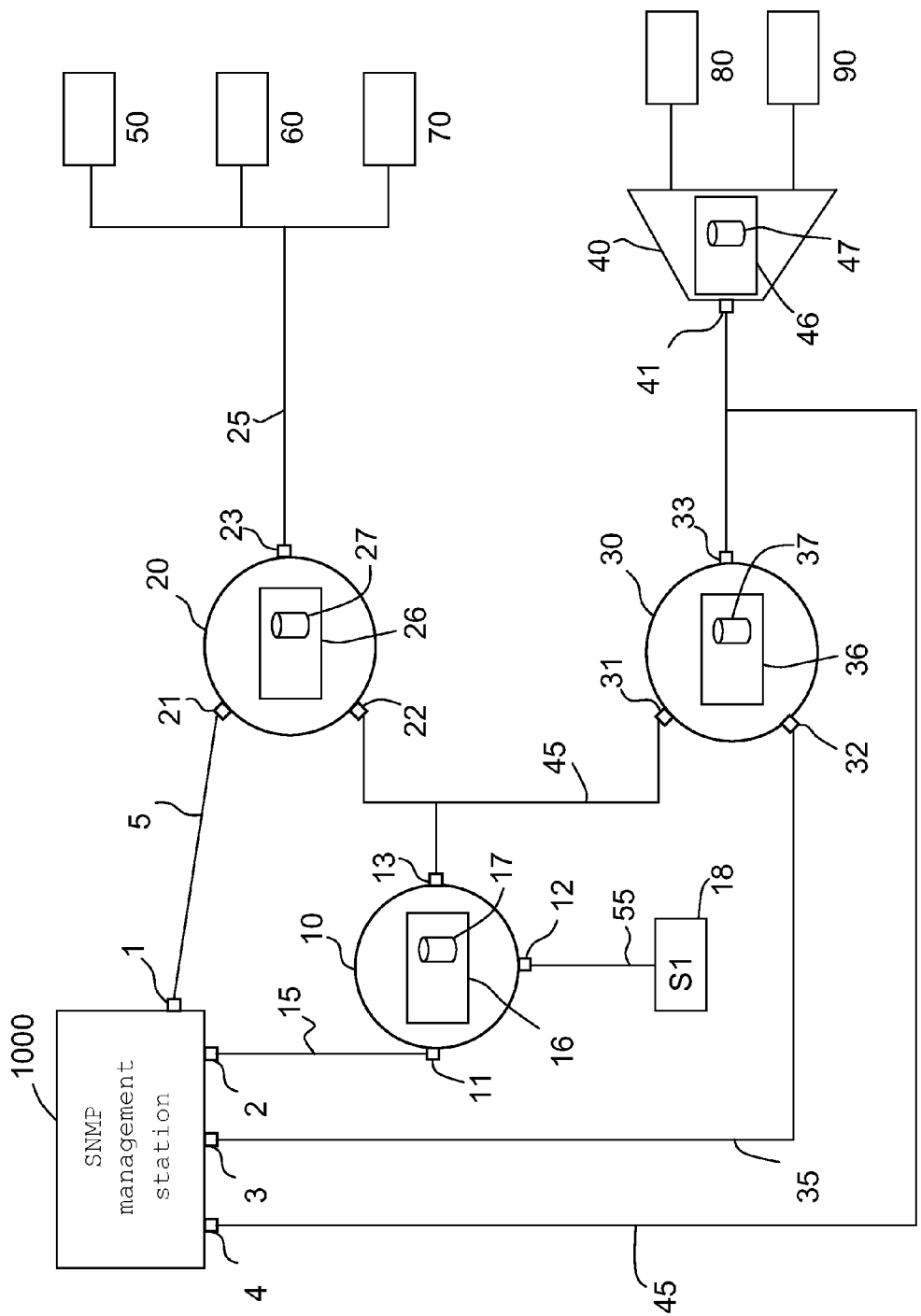
FIG. 10 shows a basic example of a multicast system in a data network, which is used to illustrate the advantages of the various implementations of the present invention with regard to the prior state of the art.

By way of example, FIG. 10 is used to explain many advantages provided by this invention with regard to the prior state of the art.

In the example of FIG. 10 there is a control station or "SNMP management station" 1000 which communicates through SNMP protocol with a PIM-SM router 10 and two IGMP routers 20 and 30. The communication between the control station 1000 and the PIM-SM router is done through network 15. The communication between the control station 1000 and the two IGMP routers 20 and 30 takes place through networks 5 and 35 respectively. The PIM-SM router communicates with the two IGMP routers 20 and 30 through a multi-access network 45 using the PIM-SM protocol.

Router 10 has an SNMP agent 16 that includes an MIB database 17 that stores information related to protocol PIM-SM. A multicast traffic source 18, also indicated as S1, is connected to the PIM-SM router 10 through its network interface 12 and can transmit multicast traffic to the data network.

The two IGMPv3 routers 20 and 30 have SNMP agents 26 and 36, respectively. Each of these SNMP agents stores information relating to the IGMP protocol in its MIB database 27 and 37, respectively.

The IGMP router 30 communicates with an IGMP Proxy 40 that, at the same time, has an SNMP agent 46 that stores information related to the IGMP protocol in an MIB database 47. That IGMP Proxy 40 communicates with two hosts 80 and 90 which send it IGMPv3 messages in which they request multicast groups and multicast channels. The IGMP Proxy 40 groups the information from the multicast groups and channels requested by the hosts 80 and 90 and sends some IGMP messages to the router 30 with the information grouped as established in the RFC 4605 specifications. The IGMP router 20 communicates with three hosts 50, 60 and 70 through a multi-access network 25. Those hosts send IGMPv3 messages to the router 20 in which they request multicast groups and multicast channels. If one of the hosts 50, 60, 70, 80 or 90 sends IGMPv3 messages to receive multicast traffic from the source 18, the different routers 10, 20 and 30 will transmit that requested traffic.

One advantage of the present invention is that it facilitates the measuring of audiences. In FIG. 10, if the IGMP routers 20 and 30 are IGMPv3 routers from the prior state of the art that do not store separately in each network interface the information of the multicast traffic requested by each host, the SNMP agents 26 and 36 and the MIB database 27 and 37, respectively, lack that information and cannot know the number of hosts that receive each multicast channel.

For example, if the three hosts 50, 60 and 70 send IGMPv3 messages to receive a specific channel (S1, G1) issued by the S1 data source, the router 20 only stores information referring to the fact that this channel has been requested to its network interface 23 in communicating with the multi-access network 25, but it does not store information from each host that requests the channel (S1,G1) and therefore does not know the audience, which in this case could vary between one to three hosts.

FIG. 10 only shows three hosts connected to the multi-access network 25. However, it is customary to have a network configuration in which there are many thousands of hosts connected to a DSLAM that works as an IGMP Proxy and many DSLAM are connected to one network interface of an IGMPv3 router. Therefore, measuring audiences can be completely non-viable in IGMPv3 routers of the prior state of the art.

However, if routers 20 and 30 of FIG. 10 are improved IGMPv3 or like routers operating in accordance with one or a combination of the principles and processes of Tables 3 through 7, the improved routers store the information of the multicast traffic requested by each host and therefore know how many hosts receive each multicast channel and can transmit this information to an audience meter or other device for measuring audience volume. For example, improved SNMP agents 26 and 36 can be used to store multicast traffic information in improved MIB databases 27 and 37. That multicast traffic information is requested by each host and sent to the control station 1000 through the SNMP protocol.

In another example, routers 20, 30 can also use a protocol other than the SNMP protocol to transmit to an audience meter the multicast traffic requested by each host since the routers have the information stored in their routing tables. However, the SNMP protocol is usually used since it is the most widely used network management protocol.

Another advantage of the present invention is the ability to control the bandwidth consumed by each host. In FIG. 10, if routers 20 and 30 are IGMPv3 routers from the prior state of the art that do not store separately in each network interface the information of the multicast traffic requested by each host, the SNMP agents 26 and 36 and the MIB database 27 and 37, respectively, lack that information and cannot know the bandwidth requested by each host. As a result, host 70 can perform a type of computer attack which includes requesting hundreds or thousands of multicast channels by sending IGMPv3 messages to collapse multi-access network 25 or router 20. thus impairing or prohibiting hosts 50 and 60 from receiving multicast traffic they have requested.

However, if routers 20 and 30 in the example of FIG. 10 are improved routers that operate in accordance with one or a combination of the principles or processes of Tables 3 through 7, the routers store the information of the multicast traffic requested by each host and can transmit that information to the control station 1000 which can, for example, block or limit the multicast traffic to host 70.

In order to do that, for example, the control station 1000 can communicate with the improved SNMP agents 26 and 36 which have stored in their improved MIB databases 27 and 37, the multicast traffic information requested from each host. The SNMP agents 26, 36 can send the information from the hundreds or thousands of multicast channels requested by the 70 to the control station 1000 using the SNMP protocol and the control station can in response instruct the SNMP agents 26 and 36 to block access to multicast traffic to the host 70.

Another advantage of the present invention is the ability to count the multicast traffic requested by each host or the number of bytes of the multicast traffic transmitted by the router to each host. This counting is useful, for example, in mobile telephone applications where operators charge clients according to the data traffic or number of traffic bytes consumed.

In order to count the traffic of the unicast packages, it can be distinguished from the receiver of the traffic starting with the destination IP address of each unicast package. However, in the multicast data packages the receiver cannot be distinguished by the IP package according to the destination multicast IP address. Similarly to what has previously been explained, the routers of the prior state of the art do not have this information, whereas the improved routers of the present invention do have the multicast traffic information requested by each host and can transmit it to a control station using, for example, the improved SNMP agents mentioned above and the SNMP protocol. To do so, for example, an improved router 20, 30 can count the number of bytes transmitted by each multicast channel (Si, Gi) over a period of time (e.g. one second) and transmit this information to the control station 1000 along with information about which multicast channels are received by each host. From this information, the control station can calculate the number of bytes of multicast traffic received by each host.

In another embodiment, the SNMP protocol may be used to implement lawful interception as explained, for example, in the embodiments described in conjunction with FIG. 8. Using the SNMP protocol, an improved router of the present invention can report to the control station, which hosts are participating in a specific multicast communication. For example, the IAP or like devices explained above can implement the functionality of the improved SNMP agents so that the improved router transmits, through the SNMP protocol, the information of the multicast traffic requested by each host to the control station or to the CALEA DEVICE. This way the control station can know which participants from each multicast communication are using the SNMP protocol that is generally used by all telecommunication operators. This makes it easier for the telecommunications operator to implement CALEA obligations.

11. Tenth Embodiments of the Present Invention

There may be instances when a multicast router in a network transmits a multicast channel (S1, G1) that is, for example, an IP television channel, to hosts in a network where there is always, or nearly always, hosts in the network wishing to receive the multicast channel (S1, G1). In this situation, particularly when there are hundreds or thousands of hosts in the network wishing to receive channel (S1, G1), it may not be desirable or necessary to utilize one or more of the processes of Tables 3 through 7, as previously described herein, to save bandwidth in the network with respect to multicast channel (S1, G1) since the bandwidth savings may be small. As such, in alternative embodiments of the present invention, the network equipment (e.g., router, proxy, switch) may, with respect to channel (S1, G1), be configured to not store for each interface/port and host a record associated with channel (S1, G1). In such embodiments, the network equipment is adapted to continue to store for each interface/port and host at least one or more records relating to the remaining channels and to update its records or tables in accordance with the one or more processes of Tables 3 through 7.

In one embodiment, the network equipment may be manually configured to always transmit one or more channels (e.g., (S1, G1)). In this embodiment the network equipment may store first information of the set of multicast channels and multicast groups that the network equipment always transmits and second information of the set of the multicast channels and multicast groups to which the network equipment applies the one or more processes of the Tables 3 through 7. In other embodiments the network equipment may include executable instructions for initiating the continuous transmission of one or more channels upon determining that a channel is being transmitted by the equipment for a certain percentage of time over a designated time period. In such embodiments the continuous transmission of a channel may be initiated, for example, when the equipment determines that the channel is being transmitted between about 95.0% and about 100% of the time, preferably between about 98% and 100% of the time, and most preferably between about 99% and 100% of the time. The designated time period for evaluating the channel request may vary, for example, between one hour, one day, multiple days, one week, one month, multiple months or a year. In other embodiments the network equipment may use more elaborate algorithms for determining when to continuously transmit a channel. Such algorithms may take into account the bandwidth demand of a channel, bandwidth availability in the network, equipment memory requirements for storing channel records for each host, etc. As an example, when the bandwidth demand of a channel is low and bandwidth availability in the network is high, the threshold for continuously transmitting a channel may be less than in other situations. In such a situation, for example, continuous transmission of a channel may be initiated when the equipment determines that the channel is being requested from hosts in the network between about 90.0% and about 95.0% of the time, or less, over a designated time period.

When a network equipment commences continuous transmission of a channel and stops storing individual host records for that channel, it loses the ability to know when hosts in the network have stopped requesting the channel. In alternative embodiments, the network equipment may include executable instructions that cause the network equipment to query the hosts on a periodic basis (e.g., once an hour, once a day, once a week, etc.) to determine if demand for the channel being continuously transmitted exists and to terminate the continuous transmission when no demand is detected.

In other embodiments, when latency with respect to a particular channel is determined to be low, the network equipment may be configured to use the processes of Table 1 with respect to that channel while using the processes of one or more of Tables 3 through 7 for the remaining channels of the same multicast group address. In one embodiment, the network equipment stores the information of the set of multicast channels and multicast groups to which the router applies the process of Table 1. When a host sends an IGMP or like message to the network equipment, the network equipment checks if the multicast traffic requested by the host is one of the set of multicast channels and multicast groups stored. And if it is, then the network equipment uses the process of Table 1 for this multicast traffic. If the multicast traffic requested by the host is not in the stored set of multicast channels and groups then the network equipment uses one or more of the processes of Tables 3 through 7 to transmit the multicast traffic to the host.

In yet other embodiments, the network equipment may be configured to continuously transmit one or more channels as described above based upon first criteria, to transmit other one or more channels using the processes of Table 1 based upon second criteria, and to transmit the remaining channels using the one or more processes of Tables 3 through 7. In such an embodiment, the network equipment may be manually configured to store first, second and third sets of information relating to the different sets of channels or may include executable instructions for implementing such an operation.

12. Eleventh Embodiments of the Present Invention

In a number of the embodiments described herein, a router or other network equipment, is described as implementing one or more of the processes of Tables 3 through 7. An example of such an implementation, with reference to FIG. 6, may include router 640 using the processes of a first table (e.g., Table 3) for the requests of host 610, the processes of a second table (e.g., Table 6) for the requests of host 620, and the processes of a third table (e.g., Table 7) for the requests of host 630. In alternative embodiments, router 640 may use the processes of Table 1 for one of hosts 610, 620 or 630.

In other embodiments a particular process of one of Tables 3 through 7 may be implemented based on the type of message received. For example, upon receiving an IS_IN(B) type message, the router may implement process 1 (row 1) of Table 3, where upon receiving an ALLOW(A) type message the message may implement process 9 (row 9) of Table 5, and so on.

In this manner, a router or other network equipment according to the teachings of the present invention may be used to optimize the transmission of multicast traffic as applied a wide variety of network systems.

It is important to note that although the preceding disclosure has been divided into sections entitled First, Second, Third, Fourth, Fifth, Sixth, Seventh, Eighth, Ninth, Tenth and Eleventh embodiments, that the scope and breadth of the present invention is not restricted to, or in any way bound, by the organization or titles of the various sections provided herein. These sections and titles are provided only as a means to permit the reader to more easily navigate through the disclosure and for the purpose of clarity. It is to be understood that any one of the many features and methods described in conjunction with any of the embodiments described herein are interchangeable with one or more of the other embodiments and implementations therein. Moreover, it is appreciated that although the embodiments and implementations disclosed herein have been described in conjunction with a variety know protocols, that the breadth and scope of the present invention is in no way limited to any particular type or types of protocols and is considered to encompass any methods or protocols capable of implementing the operating features, principles and processes disclosed herein.

TABLE 1

Operating example of an IGMP router of the state of the art applied by the IGMPv3 protocol.

| STATUS 1 | MESSAGE | STATUS 2 | ACTION |
| --- | --- | --- | --- |
| 1. INCLUDE (A) | IS_IN (B) | INCLUDE (A + B) | T(B) = GMI |
| 2. INCLUDE (A) | IS_EX (B) | EXCLUDE (A * B, B − A) | T(B − A) = 0<br>DEL(A − B)<br>GT = GMI |

TABLE 1-continued

Operating example of an IGMP router of the state of the art applied by the IGMPv3 protocol.

| STATUS 1 | MESSAGE | STATUS 2 | ACTION |
|---|---|---|---|
| 3. EXCLUDE (X, Y) | IS_IN (A) | EXCLUDE (X + A, Y − A) | T(A) = GMI |
| 4. EXCLUDE (X, Y) | IS_EX (A) | EXCLUDE (A − Y, Y * A) | T(A − X − Y) = GMI<br>DEL (X − A)<br>DEL (Y − A)<br>GT = GMI |
| 5. INCLUDE (A) | ALLOW (B) | INCLUDE (A + B) | T(B) = GMI |
| 6. INCLUDE (A) | BLOCK (B) | INCLUDE (A) | SEND Q(G, A * B) |
| 7. INCLUDE (A) | TO_EX (B) | EXCLUDE (A * B, B − A) | T(B − A) = 0<br>DEL (A − B)<br>SEND Q(G, A * B)<br>GT = GMI |
| 8. INCLUDE (A) | TO_IN (B) | INCLUDE (A + B) | T(B) = GMI<br>SEND Q(G, A − B) |
| 9. EXCLUDE (X, Y) | ALLOW (A) | EXCLUDE (X + A, Y − A) | T(A) = GMI |
| 10. EXCLUDE (X, Y) | BLOCK (A) | EXCLUDE (X + (A − Y), Y) | T(A − X − Y) = GT<br>SEND Q(G, A − Y) |
| 11. EXCLUDE (X, Y) | TO_EX (A) | EXCLUDE (A − Y, Y * A) | T(A − X − Y) = GT<br>DEL (X − A)<br>DEL (Y − A)<br>SEND Q(G, A − Y)<br>GT = GMI |
| 12. EXCLUDE (X, Y) | TO_IN (A) | EXCLUDE (X + A, Y − A) | T(A) = GMI<br>SEND Q(G, X − A)<br>SEND Q(G) |

TABLE 2

Operating example of an IGMP router of the state of the art applied by the IGMPv3 protocol, when a host changes channels successively.

| MESSAGE SENT BY THE HOST | SOURCE TRAFFIC TRANSMITTED BY THE ROUTER | ACTIONS PERFORMED BY THE ROUTER |
|---|---|---|
| INCLUDE(S1) | S1 | T(S1) = GMI |
| ALLOW(S2) | S1, S2 | T(S2) = GMI |
| BLOCK(S1) | S1, S2 | T(S1) = LMQT; SEND Q(G, S1) |
| ALLOW(S3) | S1, S2, S3 | T(S3) = GMI |
| BLOCK(S2) | S1, S2, S3 | T(S2) = LMQT; SEND Q(G, S2) |

TABLE 3

Operating example of an improved IGMP router according to an embodiment of the invention.

| STATUS 1 | MESSAGE | STATUS 2 | ACTIONS |
|---|---|---|---|
| 1. INCLUDE (A) | IS_IN (B) | INCLUDE (B) | T(B) = GMI<br>DEL(A − B) |
| 2. INCLUDE (A) | IS_EX (B) | EXCLUDE ({ }, B) | T(B) = 0<br>DEL(A − B)<br>GT = GMI |
| 3. EXCLUDE (X, Y) | IS_IN (A) | INCLUDE (A) | T(A) = GMI<br>DEL(X + Y) − A |
| 4. EXCLUDE (X, Y) | IS_EX (A) | EXCLUDE ({ }, A) | T(A) = 0<br>DEL(X + Y) − A<br>GT = GMI |
| 5. INCLUDE (A) | ALLOW (B) | INCLUDE (A + B) | T(B) = GMI |
| 6. INCLUDE (A) | BLOCK (B) | INCLUDE (A − B) | DEL(B) |
| 7. INCLUDE (A) | TO_EX (B) | EXCLUDE ({ }, B) | T(B) = 0<br>DEL (A − B)<br>GT = GMI |
| 8. INCLUDE (A) | TO_IN (B) | INCLUDE (B) | T(B) = GMI<br>DEL(A − B) |
| 9. EXCLUDE (X, Y) | ALLOW (A) | EXCLUDE (X + A, Y − A) | T(A) = GMI |
| 10. EXCLUDE (X, Y) | BLOCK (A) | EXCLUDE (X − A, Y + A) | T(A) = 0 |
| 11. EXCLUDE (X, Y) | TO_EX (A) | EXCLUDE ({ }, A) | T(A) = 0<br>DEL (X + Y) − A<br>GT = GMI |
| 12. EXCLUDE (X, Y) | TO_IN (A) | INCLUDE (A) | T(A) = GMI<br>DEL (X + Y) − A |

TABLE 4

Operating example of an improved IGMP router according to an embodiment of the invention.

| STATUS 1 | MESSAGE | STATUS 2 | ACTIONS |
|---|---|---|---|
| 1. INCLUDE (A) EXCLUDE (Y) | IS_IN (B) | INCLUDE (B) EXCLUDE (Y) | T(B) = GMI<br>DEL(A − B) |
| 2. INCLUDE (A) EXCLUDE (Y) | IS_EX (B) | INCLUDE (A) EXCLUDE (B) | DEL(Y − B)<br>GT = GMI |
| 3. INCLUDE (A) EXCLUDE (Y) | ALLOWIN (B) | INCLUDE (A + B) EXCLUDE (Y) | T(B) = GMI |
| 4. INCLUDE (A) EXCLUDE (Y) | BLOCKIN (B) | INCLUDE (A − B) EXCLUDE (Y) | DEL(B) |
| 5. INCLUDE (A) EXCLUDE (Y) | ALLOWEX (B) | INCLUDE (A) EXCLUDE (Y − B) | DEL(B) |
| 6. INCLUDE (A) EXCLUDE (Y) | BLOCKEX (B) | INCLUDE (A) EXCLUDE (Y + B) | |

TABLE 5

Operating example of an improved IGMP router according to an embodiment of the invention.

| STATUS 1 | MESSAGE | STATUS 2 | ACTIONS |
|---|---|---|---|
| 1. INCLUDE (A) | IS_IN (B) | INCLUDE (B) | T(B) = GMI<br>DEL(A − B) |
| 2. INCLUDE (A) | IS_EX (B) | EXCLUDE (B) | T(B) = 0<br>DEL(A − B)<br>GT = GMI |
| 3. EXCLUDE (Y) | IS_IN (A) | INCLUDE (A) | T(A) = GMI<br>DEL(Y) − A |
| 4. EXCLUDE (Y) | IS_EX (A) | EXCLUDE (A) | T(A) = 0<br>DEL(Y) − A<br>GT = GMI |
| 5. INCLUDE (A) | ALLOW (B) | INCLUDE (A + B) | T(B) = GMI |
| 6. INCLUDE (A) | BLOCK (B) | INCLUDE (A − B) | DEL(B) |
| 7. INCLUDE (A) | TO_EX (B) | EXCLUDE (B) | T(B) = 0<br>DEL (A − B)<br>GT = GMI |
| 8. INCLUDE (A) | TO_IN (B) | INCLUDE (B) | T(B) = GMI<br>DEL(A − B) |
| 9. EXCLUDE (Y) | ALLOW (A) | EXCLUDE (Y − A) | DEL A |
| 10. EXCLUDE (Y) | BLOCK (A) | EXCLUDE (Y + A) | T(A) = 0 |
| 11. EXCLUDE (Y) | TO_EX (A) | EXCLUDE (A) | T(A) = 0<br>DEL (Y − A)<br>GT = GMI |
| 12. EXCLUDE (Y) | TO_IN (A) | INCLUDE (A) | T(A) = GMI<br>DEL (Y − A) |

TABLE 6 operating example of an improved IGMP router according to an embodiment of the invention.

| | STATUS 1 | MESSAGE | STATUS 2 | ACTIONS |
|---|---|---|---|---|
| 1. | INCLUDE (A) | IS_IN (B) | INCLUDE (B) | DEL(A − B) |
| 2. | INCLUDE (A) | IS_EX (B) | EXCLUDE (B) | DEL(A − B) |
| 3. | EXCLUDE (Y) | IS_IN (A) | INCLUDE (A) | DEL(Y − A) |
| 4. | EXCLUDE (Y) | IS_EX (A) | EXCLUDE (A) | DEL(Y − A) |
| 5. | INCLUDE (A) | ALLOW (B) | INCLUDE (A + B) | |
| 6. | INCLUDE (A) | BLOCK (B) | INCLUDE (A − B) | DEL(B) |
| 7. | INCLUDE (A) | TO_EX (B) | EXCLUDE (B) | DEL(A − B) |
| 8. | INCLUDE (A) | TO_IN (B) | INCLUDE (B) | DEL(A − B) |
| 9. | EXCLUDE (Y) | ALLOW (A) | EXCLUDE (Y − A) | DEL A |
| 10. | EXCLUDE (Y) | BLOCK (A) | EXCLUDE (Y + A) | |
| 11. | EXCLUDE (Y) | TO_EX (A) | EXCLUDE (A) | DEL (Y − A) |
| 12. | EXCLUDE (Y) | TO_IN (A) | INCLUDE (A) | DEL (Y − A) |

TABLE 7

Operating example of an improved IGMP router according to an embodiment of the invention.

| | STATUS 1 | MESSAGE | STATUS 2 | ACTIONS |
|---|---|---|---|---|
| 1. | | IS_IN (B) | INCLUDE (B) | DEL(ALL − B) |
| 2. | | IS_EX (B) | EXCLUDE (B) | DEL(ALL − B) |
| 3. | INCLUDE (A) | ALLOW (B) | INCLUDE (A + B) | |
| 4. | INCLUDE (A) | BLOCK (B) | INCLUDE (A − B) | DEL(B) |
| 5. | EXCLUDE (Y) | ALLOW (A) | EXCLUDE (Y − A) | DEL(A) |
| 6. | EXCLUDE (Y) | BLOCK (A) | EXCLUDE (Y + A) | |
| 7. | | TO_EX (B) | EXCLUDE (B) | DEL(ALL − B) |
| 8. | | TO_IN (B) | INCLUDE (B) | DEL(ALL − B) |

TABLE 8

Message examples from FIG. 6.

| | HOST | MESSAGE | ELEMENT FROM FIG. 6 |
|---|---|---|---|
| 1. | 610 | IS_IN(S1, S2, S3) | 611 |
| 2. | 620 | IS_EX(S3, S4) | 621 |
| 3. | 630 | IS_IN(S2, S5) | 631 |
| 4. | 630 | ALLOW(S6) | 632 |
| 5. | 630 | BLOCK(S2, S5) | 633 |
| 6. | 620 | TO_IN(S7) | 622 |

TABLE 9

Operating example of an improved router from FIG. 6.

| | HOST | STATUS 1 | MESSAGE | STATUS 2 |
|---|---|---|---|---|
| 1. | 610 | — | IS_IN (S1, S2, S3) | 100, 110, 120, 131 INCLUDE(S1, S2, S3) |
| 2. | 620 | — | IS_EX (S3, S4) | 100, 110, 120, 132 EXCLUDE(S3, S4) |
| 3. | 630 | — | IS_IN (S2, S5) | 100, 110, 120, 131 INCLUDE(S2, S5) |
| 4. | 630 | 100, 110, 120, 133 INCLUDE(S2, S5) | ALLOW(S6) | 100, 110, 120, 133 INCLUDE(S2, S5, S6) |
| 5. | 630 | 100, 110, 120, 133 INCLUDE(S2, S5, S6) | BLOCK(S2, S5) | 100, 110, 120, 133 INCLUDE(S6) |
| 6. | 620 | 100, 110, 120, 132 EXCLUDE(S3, S4) | TO_IN(S7) | 100, 110, 120, 132 INCLUDE(S7) |

TABLE 10

Operation example of FIG. 6 with standard IGMPv3.

| | STATUS 1 | MESSAGE | STATUS 2 | ACTIONS |
|---|---|---|---|---|
| 1. | — | IS_IN(S1, S2, S3) | INCLUDE(S1, S2, S3) | T(S1) = GMI<br>T(S2) = GMI<br>T(S3) = GMI |
| 2. | INCLUDE(S1, S2, S3) | IS_EX(S3, S4) | EXCLUDE({S3}, {S4}) | T(S4) = 0<br>DEL (S1, S2)<br>GT = GMI |
| 3. | EXCLUDE({S3}, {S4}) | IS_IN(S2, S5) | EXCLUDE({S2, S3, S5}, {S4}) | T(S2) = GMI<br>T(S5) = GMI |
| 4. | EXCLUDE({S2, S3, S5}, {S4}) | ALLOW(S6) | EXCLUDE({S2, S3, S5, S6}, {S4}) | T(S6) = GMI |
| 5. | EXCLUDE({S2, S3, S5, S6}, {S4}) | BLOCK(S2, S5) | EXCLUDE({S2, S3, S5, S6}, {S4}) | SEND Q(G, {S2, S5})<br>T(S2) = LMQT<br>T(S5) = LMQT |
| | | | RESPONSES FROM THE HOSTS TO QUERY Q(G, {S2, S5}) | |
| 5a. | EXCLUDE({S2, S3, S5, S6}, {S4}) | IS_IN(S1, S2, S3) | EXCLUDE({S1, S2, S3, S5, S6}, {S4}) | T(S1) = GMI<br>T(S2) = GMI<br>T(S3) = GMI |
| 5b. | EXCLUDE({S1, S2, S3, S5, S6}, {S4}) | IS_EX(S3, S4) | EXCLUDE({S3}, {S4}) | T(S4) = 0<br>DEL (S1, S2, S5, S6)<br>GT = GMI |
| 6. | EXCLUDE({S3}, {S4}) | TO_IN(S7) | EXCLUDE({S3, S7}, {S4}) | T(S7) = GMI<br>SEND Q(G, {S3})<br>T(S3) = LMQT<br>SEND Q(G)<br>GT = LMQT |
| | | | RESPONSES FROM THE HOSTS TO QUERIES | |
| 6a. | EXCLUDE({S3, S7}, {S4}) | IS_IN(S1, S2, S3) | EXCLUDE({S1, S2, S3, S7}, {S4}) | T(S1) = GMI<br>T(S2) = GMI<br>T(S3) = GMI |

TABLE 10-continued

Operation example of FIG. 6 with standard IGMPv3.

| STATUS 1 | MESSAGE | STATUS 2 | ACTIONS |
|---|---|---|---|
| 6b. EXCLUDE({S1, S2, S3, S7}, {S4}) | IS_IN(S6) | EXCLUDE({S1, S2, S3, S6, S7}, {S4}) | T(S6) = GMI |
| 6c. EXCLUDE({S1, S2, S3, S6, S7}, {S4}) | IS_IN(S7) | EXCLUDE({S1, S2, S3, S5, S6, S7}, {S4}) | T(S7) = GMI |
| | GT = 0 (GROUP TIMER REACHES ZERO | | |
| EXCLUDE({S1, S2, S3, S5, S6, S7}, {S4}) | | INCLUDE (S1, S2, S3, S4, S6, S7) | |

What is claimed is:

1. A multicast router having one or more downstream network interfaces and situated in a data network system between sources that send multicast packets having as a destination IP address a multicast group address and hosts that request multicast data from the sources, the multicast router configured to communicate with the hosts via a communications protocol based on the IGMP (Internet Group Management Protocol) or the MLD (Multicast Listener Discovery) protocol and storing within a storage medium executable instructions that when executed in the multicast router read information contained in one or more multicast data requests made by the hosts that requests multicast data from the sources and generates from the information for each combination of downstream network interface, multicast group address and host that requests the multicast data an INCLUDE source record or an EXCLUDE source record, the INCLUDE source record or EXCLUDE source record generated to be devoid of source timers and to comprise identifying information of the network interface through which the multicast router has received the multicast data request, the multicast group address from which the multicast data has been requested, identity data of the host from which the multicast data request has been received, and source address information of the source from which the multicast data has been requested.

2. A multicast router according to claim 1, wherein when an EXCLUDE source record is generated the EXCLUDE source record is generated to be devoid of a requested list.

3. A multicast router according to claim 2, wherein when an INCLUDE source record is generated the INCLUDE source record contains the union of all the source lists requested from the host and when an EXCLUDE source record is generated the EXCLUDE source record contains the intersection of all the exclude source lists requested from the host.

4. A multicast router according to claim 2, wherein the multicast router stores executable instructions for analyzing the information contained in the INCLUDE source record or the EXCLUDE source record and, based on the information, limiting the multicast data the multicast router transmits to one or more of the hosts.

5. A multicast router according to claim 2, wherein the multicast router stores executable instructions for analyzing the information contained in the INCLUDE source record or the EXCLUDE source record and, based on the information, adjusting the multicast bandwidth which the multicast router has available for distributing among the various hosts.

6. A multicast router according to claim 1, wherein the multicast router uses a protocol based on the PIM (Protocol Independent Multicast) protocol to request the multicast data sent by the sources.

7. A multicast router according to claim 1, wherein when an INCLUDE source record is generated the INCLUDE source record contains the union of all the source lists requested from the host and when an EXCLUDE source record is generated the EXCLUDE source record contains the intersection of all the exclude source lists requested from the host.

8. A multicast router according to claim 1, wherein the multicast router stores executable instructions for analyzing the information contained in the INCLUDE source record or the EXCLUDE source record and, based on the information, limiting the multicast data the multicast router transmits to one or more of the hosts.

9. A router according to claim 1 wherein the router stores executable instructions for analyzing the information contained in the INCLUDE source record or the EXCLUDE source record and, based on the information, adjusting the multicast bandwidth which the multicast router has available for distributing among the various hosts.

10. A multicast router having one or more downstream network interfaces and situated in a data network system between sources that send multicast packets having as a destination IP address a multicast group address and hosts that request multicast data from the sources, the multicast router configured to communicate with the hosts via a communications protocol based on the IGMP (Internet Group Management Protocol) or the MLD (Multicast Listener Discovery) protocol and storing in a storage medium executable instructions that when executed in the multicast router read information contained in one or more multicast data requests made by the hosts that requests multicast data from the sources and generates for each combination of downstream network interface, multicast group address and host that requests the multicast data an INCLUDE source record or an EXCLUDE source record comprising identifying information of the network interface through which the multicast router has received the multicast data request, the multicast group address from which the multicast data has been requested, identity data of the host from which the multicast data request has been received, and source address information of the source from which the multicast data has been requested, wherein when an INCLUDE source record is generated the INCLUDE source record is generated to be devoid of source timers and wherein when an EXCLUDE source record is generated the EXCLUDE source record is generated to be devoid of a requested list.

11. A multicast router according to claim 10, wherein when an EXCLUDE source record is generated the EXCLUDE source record is generated to be devoid of source timers.

12. A multicast router according to claim 11, wherein when an INCLUDE source record is generated the INCLUDE source record contains the union of all the source lists requested from the host and when an EXCLUDE source record is generated the EXCLUDE source record contains the intersection of all the exclude source lists requested from the host.

13. A multicast router according to claim 11, wherein the multicast router stores executable instructions for analyzing the information contained in the INCLUDE source record or the EXCLUDE source record and, based on the information, limiting the multicast data the multicast router transmits to one or more of the hosts.

14. A multicast router according to claim 11, wherein the multicast router stores executable instructions for analyzing the information contained in the INCLUDE source record or the EXCLUDE source record and, based on the information, adjusting the multicast bandwidth which the multicast router has available for distributing among the various hosts.

15. A multicast router according to claim 10, wherein the multicast router uses a protocol based on the PIM (Protocol Independent Multicast) protocol to request the multicast data sent by the sources.

16. A multicast router according to claim 10, wherein the multicast router stores executable instructions for analyzing the information contained in the INCLUDE source record or the EXCLUDE source record and, based on the information, limiting the multicast data the multicast router transmits to one or more of the hosts.

17. A multicast router according to claim 10, wherein the multicast router stores executable instructions for analyzing the information contained in the INCLUDE source record or the EXCLUDE source record and, based on the information, adjusting the multicast bandwidth which the multicast router has available for distributing among the various hosts.

18. A multicast router according to claim 10, wherein when an INCLUDE source record is generated the INCLUDE source record contains the union of all the source lists requested from the host and when an EXCLUDE source record is generated the EXCLUDE source record contains the intersection of all the exclude source lists requested from the host.

19. A method implemented by executable instructions stored in one or more storage mediums of a multicast router having one or more downstream network interfaces and situated in a data network system between sources that send multicast packets having as a destination IP address a multicast group address and hosts that request multicast data from the sources, the multicast router configured to communicate with the hosts via a communications protocol based on the IGMP (Internet Group Management Protocol) or the MLD (Multicast Listener Discovery) protocol, the method comprising reading information contained in one or more multicast data requests made by the hosts that requests multicast data from the sources and generating from the information for each combination of downstream network interface, multicast group address and host that requests the multicast data an INCLUDE source record or an EXCLUDE source record, the INCLUDE source record or EXCLUDE source record generated to be devoid of source timers and to comprise identifying information of the network interface through which the multicast router has received the multicast data request, the multicast group address from which the multicast data has been requested, identity data of the host from which the multicast data request has been received, and source address information of the source from which the multicast data has been requested.

20. A method according to claim 19, wherein upon an EXCLUDE source record being generated the EXCLUDE source record is generated to be devoid of a requested list.

21. A method according to claim 20, wherein upon an INCLUDE source record being generated the INCLUDE source record contains the union of all the source lists requested from the host and upon an EXCLUDE source record being generated the EXCLUDE source record contains the intersection of all the exclude source lists requested from the host.

22. A method according to claim 20, further comprising analysing in the multicast router the information contained in the INCLUDE source record or the EXCLUDE source record and, based on the information, limiting the multicast data the multicast router transmits to one or more of the hosts.

23. A method according to claim 20, further comprising analysing in the multicast router the information contained in the INCLUDE source record or the EXCLUDE source record and, based on the information, adjusting the multicast bandwidth which the multicast router has available for distributing among the various hosts.

24. A method according to claim 19, wherein upon an INCLUDE source record being generated the INCLUDE source record contains the union of all the source lists requested from the host and upon an EXCLUDE source record being generated the EXCLUDE source record contains the intersection of all the exclude source lists requested from the host.

25. A method according to claim 19, further comprising analysing in the multicast router the information contained in the INCLUDE source record or the EXCLUDE source record and, based on the information, limiting the multicast data the multicast router transmits to one or more of the hosts.

26. A method according to claim 19, further comprising analysing in the multicast router the information contained in the INCLUDE source record or the EXCLUDE source record and, based on the information, adjusting the multicast bandwidth which the multicast router has available for distributing among the various hosts.

27. A method implemented by executable instructions stored in one or more storage mediums of a multicast router having one or more downstream network interfaces and situated in a data network system between sources that send multicast packets having as a destination IP address a multicast group address and hosts that request multicast data from the sources, the multicast router configured to communicate with the hosts via a communications protocol based on the IGMP (Internet Group Management Protocol) or the MLD (Multicast Listener Discovery) protocol, the method comprising reading information contained in one or more multicast data requests made by the hosts that requests multicast data from the sources and generating from the information for each combination of downstream network interface, multicast group address and host that requests the multicast data an INCLUDE source record or an EXCLUDE source record comprising identifying information of the network interface through which the multicast router has received the multicast data request, the multicast group address from which the multicast data has been requested, identity data of the host from which the multicast data request has been received, and source address information of the source from which the multicast data has been requested, wherein upon an INCLUDE source record being generated the INCLUDE source record is generated without source timers and wherein upon an EXCLUDE source record being generated the EXCLUDE source record is generated without a requested list.

28. A method according to claim 27, wherein upon an EXCLUDE source record being generated the EXCLUDE source record is generated to be devoid of source timers.

29. A method according to claim 28, wherein upon an INCLUDE source record being generated the INCLUDE source record contains the union of all the source lists requested from the host and upon an EXCLUDE source record being generated the EXCLUDE source record contains the intersection of all the exclude source lists requested from the host.

30. A method according to claim 28, further comprising analysing in the multicast router the information contained in the INCLUDE source record or the EXCLUDE source record and, based on the information, limiting the multicast data the multicast router transmits to one or more of the hosts.

31. A method according to claim 28, further comprising analysing in the multicast router the information contained in the INCLUDE source record or the EXCLUDE source record and, based on the information, adjusting the multicast bandwidth which the multicast router has available for distributing among the various hosts.

32. A method according to claim 27, wherein upon an INCLUDE source record being generated the INCLUDE source record contains the union of all the source lists requested from the host and upon an EXCLUDE source record being generated the EXCLUDE source record contains the intersection of all the exclude source lists requested from the host.

33. A method according to claim 27, further comprising analysing in the multicast router the information contained in the INCLUDE source record or the EXCLUDE source record and, based on the information, limiting the multicast data the multicast router transmits to one or more of the hosts.

34. A method according to claim 27, further comprising analysing in the multicast router the information contained in the INCLUDE source record or the EXCLUDE source record and, based on the information, adjusting the multicast bandwidth which the multicast router has available for distributing among the various hosts.

* * * * *